US012360816B2

(12) United States Patent
Nagasaki et al.

(10) Patent No.: US 12,360,816 B2
(45) Date of Patent: Jul. 15, 2025

(54) INFORMATION INFRASTRUCTURE MANAGEMENT METHOD, MANAGEMENT SERVER, AND NON-TRANSITORY COMPUTER-READABLE RECORDING MEDIUM FOR MANAGING A COMPUTING MACHINE HAVING A COMPUTATIONAL RESOURCE FOR EXECUTING A WORKFLOW AND A STORAGE RESOURCE COMMUNICABLY COUPLED TO THE COMPUTING MACHINE

(71) Applicant: Hitachi, Ltd., Tokyo (JP)

(72) Inventors: Hideki Nagasaki, Tokyo (JP); Yasuyuki Kambara, Tokyo (JP); Kiminori Sugauchi, Tokyo (JP); Akira Nikaido, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 536 days.

(21) Appl. No.: 17/897,435

(22) Filed: Aug. 29, 2022

(65) Prior Publication Data
US 2023/0185620 A1 Jun. 15, 2023

(30) Foreign Application Priority Data

Dec. 14, 2021 (JP) .................................. 2021-202916

(51) Int. Cl.
G06F 9/46 (2006.01)
G06F 9/48 (2006.01)
G06F 9/50 (2006.01)

(52) U.S. Cl.
CPC .......... *G06F 9/5038* (2013.01); *G06F 9/4887* (2013.01)

(58) Field of Classification Search
CPC ........................... G06F 9/5038; G06F 9/4887
See application file for complete search history.

(56) References Cited

U.S. PATENT DOCUMENTS 9,632,709 B1 4/2017 Basham et al.

*Primary Examiner* — Gregory A Kessler
(74) *Attorney, Agent, or Firm* — Mattingly & Malur, PC

(57) ABSTRACT

A management server calculates a required amount of computational resource required to execute the application based on a processing speed of each application and a computational resource model. When a usage rate of the computational resource within an execution time limit of the workflow exceeds an upper limit, the management server calculates, using the computational resource model, a first executable time during which the application is executable on an available capacity of the computational resource. The management server sets a target execution time of the application in executing the workflow as a first executable time, and adjusts to add an extension time of the target execution time according to the first executable time to a target execution time of another application that does not exceed the computational resource upper limit so as to postpone an end time-of-day of the application and advance a start time-of-day of the other application.

20 Claims, 65 Drawing Sheets

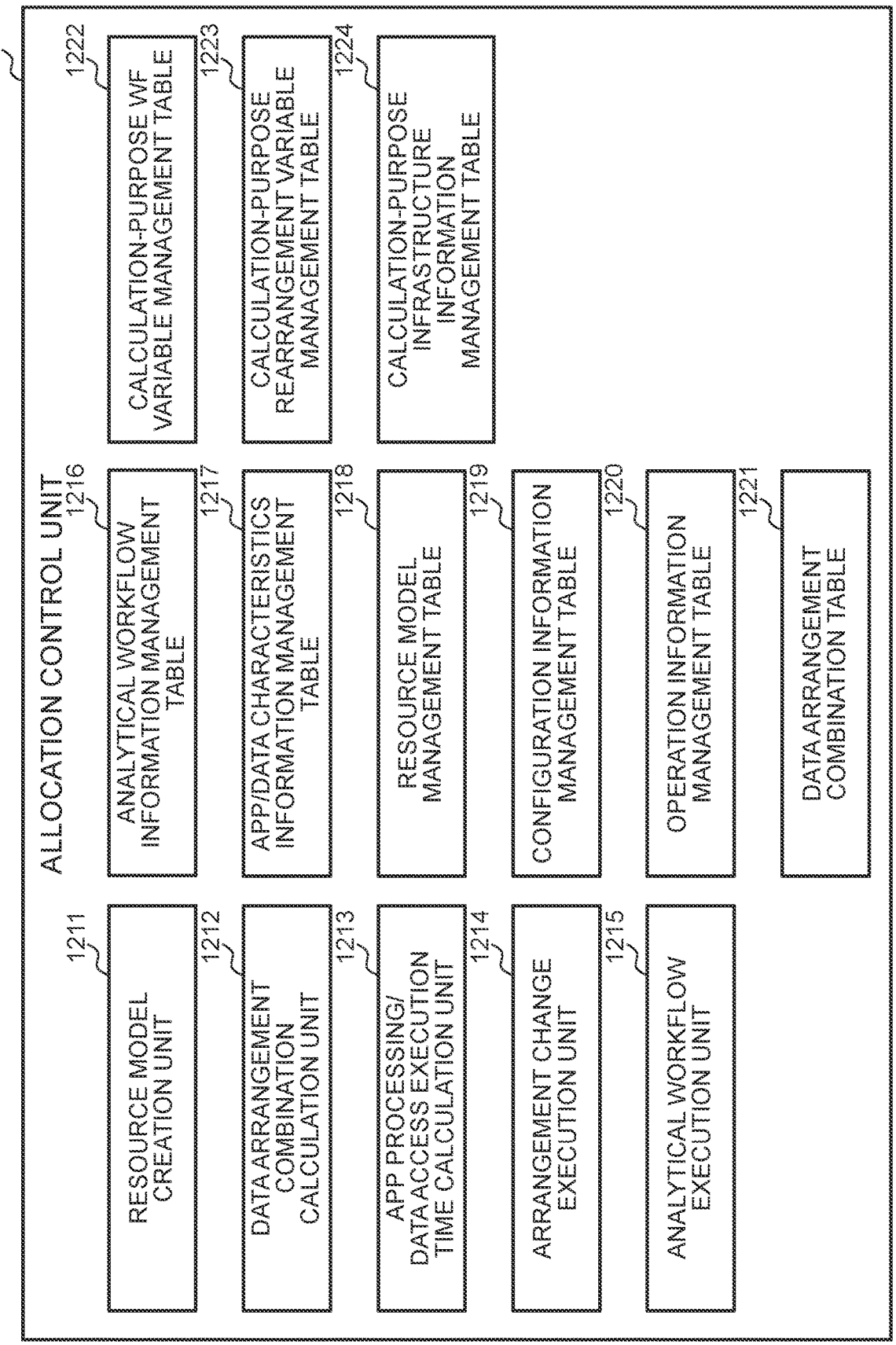

FIG. 4

ANALYTICAL WORKFLOW INFORMATION MANAGEMENT TABLE 1216

| # | TARGET | | | ITEM | VALUE | SOURCE |
|---|---|---|---|---|---|---|
| 1 | WORKFLOW1 | | | WORKFLOW IDENTIFIER | WF1 | Flow-Based Programming Function |
| 2 | | | | EXECUTION TIME LIMIT (MIN.) OF WORKFLOW | 120 min. | Flow-Based Programming Function |
| 3 | | | | ORDER/NUMBER OF TIMES OF EXECUTION OF APPS | App-a = App-c > App-b | Flow-Based Programming Function |
| 4 | | | | ORDER/NUMBER OF TIMES OF FILE ACCESS | App-a: FL0 > FL1 | Flow-Based Programming Function |
| 5 | | APP (CONTAINER) 1 | | APP IDENTIFIER | App-a | Flow-Based Programming Function |
| 6 | | | DATA (FILE) 1 | FILE IDENTIFIER | FL1 | Flow-Based Programming Function |
| 7 | | | DATA (FILE) 2 | ⋮ | ⋮ | ⋮ |
| ⋮ | | ⋮ | ⋮ | ⋮ | ⋮ | ⋮ |
| 21 | | APP (CONTAINER) 2 | | ⋮ | ⋮ | ⋮ |
| ⋮ | | ⋮ | | ⋮ | ⋮ | ⋮ |
| 30 | WORKFLOW2 | | | ⋮ | ⋮ | ⋮ |
| ⋮ | ⋮ | | | ⋮ | ⋮ | ⋮ |

FIG. 5

APP/DATA CHARACTERISTICS INFORMATION MANAGEMENT TABLE 1217

| # | CATEGORY | ITEM | DETAILS | VALUE | SOURCE | ACQUIRED FOR |
|---|---|---|---|---|---|---|
| 1 | APP (CONTAINER) | CONTAINER ID | CONTAINER IDENTIFIER OR CONTAINER NAME | Container1 | Container Management Function | LEARNING/ INFERENCE |
| 2 | | TYPE OF APP | - | Machine LearningX | Container Management Function | LEARNING/ INFERENCE |
| 3 | | LOCATION OF APP | - | On-premise Site #1 | Monitoring Function (DURING LEARNING)/ Flow-Based Programming Function (DURING INFERENCE) | LEARNING/ INFERENCE |
| 4 | | AMOUNT OF DATA INPUT/OUTPUT BY APP (IOPS, MB/S) | - | 1000 IOPS, 100MB/s | Monitoring Function | LEARNING |
| 5 | | NUMBER OF CPU CORES | NUMBER OF CPU CORES ALLOTTED TO EACH CONTAINER | 3 cores | Monitoring Function | LEARNING |
| 6 | | CPU UTILIZATION RATE | CPU UTILIZATION RATE (AVERAGE) OF EACH CONTAINER | 90% (2.7/3 cores) | Monitoring Function | LEARNING |
| 7 | | MEMORY CAPACITY | MEMORY CAPACITY ALLOTTED TO EACH CONTAINER | 0.5 GB | Monitoring Function | LEARNING |
| 8 | | MEMORY UTILIZATION RATE | MEMORY UTILIZATION RATE (AVERAGE) OF EACH CONTAINER | 80% (0.4/0.5 GB) | Monitoring Function | LEARNING |
| 9 | DATA (FILE) | DATA ID | DATA IDENTIFIER OR DATA NAME REFERRED TO BY CONTAINER | FL1 | Data Virtualization Function | LEARNING/ INFERENCE |
| 10 | | DATA ARRANGEMENT INFORMATION | PHYSICAL LOCATION | On-premise Site #1 | Data Virtualization Function | LEARNING/ INFERENCE |
| 11 | | DATA SIZE | - | 100 GB | Monitoring Function | LEARNING/ INFERENCE |
| 12 | | AMOUNT OF USAGE OF INTER-BASE NW DURING DATA ACCESS | - | 60 MB/s | IT Infrastructure Management Function | LEARNING/ INFERENCE |
| 13 | COMMON | APP EXECUTION TIME (ANALYTICAL PROCESSING TIME) | - | 30 min. | Monitoring Function | LEARNING |

FIG. 6

RESOURCE MODEL MANAGEMENT TABLE 1218

| CATEGORY | MODEL NAME | TARGET RESOURCE(x) | TARGET REQUIREMENT/ INDEX(y) | TYPE OF APP | ARRANGEMENT PATTERN | | MODEL FORMULA |
|---|---|---|---|---|---|---|---|
| | | | | | APP (STUBDATA) | DATA (ORIGINALDATA) | |
| APP/ CALCULA- TION RESOURCE MODEL | NUMBER-OF- CPU-CORES MODEL | CPU [Cores] | APP PROCESSING SPEED [MB/s] | Machine LearningX | - | - | y=f1(x) |
| | | | | Business IntelligenceY | - | - | y=f2(x) |
| | | | | ⋮ | ⋮ | ⋮ | ⋮ |
| | MEMORY CAPACITY MODEL | MEMORY [GB] | APP PROCESSING SPEED [MB/s] | | | | |
| | INTRA-BASE COMPUTATION NW BANDWIDTH MODEL | INTRA-BASE COMPUTATION NETWORK BANDWIDTH [MB/s] | APP PROCESSING SPEED [MB/s] | | | | |
| APP/DATA ACCESS CHARACTERISTICS MODEL | | STORAGE IO PERFORMANCE (Sequential Read) [MB/s] | APP PROCESSING SPEED [MB/s] | Machine LearningX | - | - | y=f3(x) |
| | | STORAGE IO PERFORMANCE (Sequential Read) [IOPS] | APP PROCESSING SPEED [MB/s] | ⋮ | ⋮ | ⋮ | ⋮ |
| | | ⋮ | IO PERFORMANCE (Sequential Read) [MB/s] | - | On-prem1 | On-prem1 | y=f4(x) |
| STORAGE PERFOR- MANCE MODEL | INTRA-BASE COMPUTATION- STORAGE PERFORMANCE MODEL | INTRA-BASE COMPUTATION- STORAGE NETWORK BANDWIDTH[MB/s] | | - | On-prem1 | On-prem2 | y=f5(x) |
| | INTER-BASE INTER-STORAGE PERFORMANCE MODEL | INTER-BASE STORAGE NETWORK BANDWIDTH [MB/s] | ⋮ | ⋮ | ⋮ | ⋮ | ⋮ |
| | STORAGE NODE PERFORMANCE MODEL | NUMBER OF STORAGE NODES | | | | | |
| | ⋮ | ⋮ | | | | | |

FIG. 7    CONFIGURATION INFORMATION MANAGEMENT TABLE    1219

| # | TARGET | | | ITEM TO BE MODELED | DETAILS | VALUE |
|---|---|---|---|---|---|---|
| 1 | STORAGE | OVERALL | | NUMBER OF STORAGE CLUSTERS | NUMBER OF CLUSTERS (NUMBER OF BASES) IN ENTIRE SYSTEM | 3 |
| 2 | | BASE1 | | NUMBER OF NODES IN CLUSTER | NUMBER OF STORAGE ENCLOSURES IN CLUSTER | 5 |
| 3 | | | | MAXIMUM CAPACITY OF ONE CLUSTER | MAXIMUM CAPACITY OF CLUSTER | 50 TB |
| 4 | | | | MAXIMUM IO AMOUNT OF ONE CLUSTER | IOPS, AMOUNTS OF RANDOM/SEQUENTIAL WRITE AND READ | Seq.R:5000 IOPS, 1280 MB/s, ... |
| 5 | | | | INTRA-BASE COMPUTATION-STORAGE NETWORK BANDWIDTH | MAXIMUM VALUES OF AMOUNTS OF TRANSMISSION AND RECEPTION BETWEEN COMPUTATION AND STORAGE | 1250 MB/s |
| 6 | | NODE1 | | MAXIMUM LOGICAL CAPACITY OF ONE NODE | MAXIMUM LOGICAL CAPACITY OF STORAGE | 10 TB |
| 7 | | | | MAXIMUM IO AMOUNT OF ONE NODE | IOPS, AMOUNTS OF RANDOM/SEQUENTIAL WRITE AND READ | Seq.R:1000 IOPS, 256 MB/s, ... |
| ... | | NODE2 | | ... | ... | ... |
| ... | | BASE2 | | ... | ... | ... |
| 8 | | BETWEEN BASES 1 AND 2 | | INTER-BASE NETWORK BANDWIDTH | MAXIMUM VALUES OF AMOUNTS OF TRANSMISSION AND RECEPTION BETWEEN BASES (CLUSTERS) | 250 MB/s |
| ... | | | | | | ... |
| 9 | COMPUTATION | OVERALL | | NUMBER OF CONTAINER CLUSTERS | NUMBER OF CLUSTERS (NUMBER OF BASES) IN ENTIRE SYSTEM | 3 |
| 10 | | BASE1 | | NUMBER OF NODES IN CLUSTER | NUMBER OF COMPUTATION NODES IN CLUSTER | 10 |
| 11 | | | | NUMBER OF NODES IN CLUSTER | MAXIMUM VALUES OF AMOUNTS OF TRANSMISSION AND RECEPTION BETWEEN NODES | 1250 MB/s |
| 12 | | NODE1 | | NUMBER OF CPU CORES | NUMBER OF CORES PER NODE | 24 |
| 13 | | | | MEMORY CAPACITY | MAXIMUM MEMORY CAPACITY PER NODE | 512 GB |
| ... | | NODE2 | | ... | ... | ... |
| ... | | BASE2 | | ... | ... | ... |

FIG. 8

OPERATION INFORMATION MANAGEMENT TABLE 1220

| # | TARGET | | ITEM TO BE MODELED | DETAILS | VALUE (AMOUNT OF RESOURCES USED AT EACH TIME (HOUR:MINUTE:SECOND)) | | |
|---|---|---|---|---|---|---|---|
| | | | | | 00:00:00 | 00:01:00 | ... |
| 1 | STORAGE | BASE1 | CAPACITY UTILIZED (IN ONE CLUSTER) | AMOUNT OF USAGE | 40TB | | ... |
| 2 | | BASE1 | IO AMOUNT (IN ONE CLUSTER) | RANDOM/SEQUENTIAL IOPS, WRITE AND READ AMOUNTS | Seq.R: 200 IOPS, 64 MB/s, Seq.W..... | Seq.R: 100 IOPS, 32 MB/s, Seq.W..... | ... |
| 3 | | | INTRA-BASE COMPUTATION-STORAGE NETWORK UTILIZATION AMOUNT | AMOUNTS OF TRANSMISSION AND RECEPTION BETWEEN COMPUTATION AND STORAGE | 50 MB/s | 30 MB/s | ... |
| ... | | BETWEEN BASES 1 AND 2 | | | | | |
| 4 | | | INTER-BASE NETWORK UTILIZATION AMOUNT | AMOUNTS OF TRANSMISSION AND RECEPTION BETWEEN BASES | 3 MB/s | 5 MB/s | ... |
| ... | | | | | | | |
| 5 | COMPUTATION | BASE1 | CPU UTILIZATION AMOUNT (IN ONE CLUSTER) | NUMBER OF CPU CORES BEING CONSUMED | 11 Core | 8 Core | ... |
| 6 | | BASE1 | MEMORY UTILIZATION AMOUNT (IN ONE CLUSTER) | AMOUNT OF MEMORY BEING CONSUMED | 20 GB | 15 GB | ... |
| 7 | | | INTRA-CLUSTER NETWORK UTILIZATION AMOUNT | AMOUNTS OF TRANSMISSION AND RECEPTION BETWEEN NODES | 10 MB/s | 11 MB/s | ... |
| ... | | | | | | | |

FIG. 9
DATA ARRANGEMENT COMBINATION TABLE

| # | DATA1 | DATA2 | DATA3 | DATA4 | DATA5 | DATA6 | ARRANGEMENT FEASIBILITY |
|---|---|---|---|---|---|---|---|
| 1 | On-prem1 | On-prem1 | On-prem1 | On-prem1 | On-prem1 | On-prem1 | Yes |
| 2 | On-prem1 | On-prem1 | On-prem1 | On-prem1 | On-prem1 | On-prem2 | Yes |
| 3 | On-prem1 | On-prem1 | On-prem1 | On-prem1 | On-prem2 | Cloud | No |
| 4 | On-prem2 | On-prem1 | On-prem1 | On-prem1 | On-prem2 | On-prem1 | Yes |
| ⋮ | ⋮ | ⋮ | ⋮ | ⋮ | ⋮ | ⋮ | ⋮ |
| 244 | On-prem2 | On-prem1 | On-prem1 | On-prem1 | On-prem1 | On-prem1 | Yes |
| ⋮ | ⋮ | ⋮ | ⋮ | ⋮ | ⋮ | ⋮ | ⋮ |
| 729 | Cloud | Cloud | Cloud | Cloud | Cloud | Cloud | No |

FIG. 10A

CALCULATION-PURPOSE WF VARIABLE MANAGEMENT TABLE (FORMER PART) ~1222

| # | TARGET | VARIABLE | DESCRIPTION | VALUE |
|---|---|---|---|---|
| 1 | DATA REARRANGEMENT (COMBINATION 1) | - | - | - |
| 2 | DATA REARRANGEMENT (COMBINATION 1) | MULTIPLE WORKFLOWS EXECUTION TIME | - | 180 min. (3h.) |
| 3 | | MULTIPLE WORKFLOWS START TIME-OF-DAY | - | 0:00 |
| 4 | | MULTIPLE WORKFLOWS END TIME-OF-DAY | - | 3:00 |
| 5 | WORKFLOW1 | WORKFLOW EXECUTION TIME | CALCULATED EXECUTION TIME OF WORKFLOW | 120 min. (2h.) |
| 6 | | WORKFLOW START TIME-OF-DAY | START TIME-OF-DAY SET FOR CALCULATION | 0:00 |
| 7 | | WORKFLOW END TIME-OF-DAY | END TIME-OF-DAY SET FOR CALCULATION | 3:00 |
| 8 | APP (CONTAINER) 1 | APP IDENTIFIER | - | App-a |
| 9 | | APP TARGET EXECUTION TIME | - | 60 min. |
| 10 | | APP EXECUTION START TIME-OF-DAY | - | WORKFLOW START +0 min. |
| 11 | | APP EXECUTION END TIME-OF-DAY | - | WORKFLOW START +60 min. |
| 12 | | REQUIRED CPU | - | 2 core |
| 13 | | REQUIRED MEMORY | - | 0.5 GB |
| 14 | | REQUIRED INTRA-BASE COMPUTATION NW BANDWIDTH | - | 10 MB/sec |

FIG. 10B

CALCULATION-PURPOSE WF VARIABLE MANAGEMENT TABLE (LATTER PART)

1222

| # | TARGET | | VARIABLE | DESCRIPTION | VALUE |
|---|---|---|---|---|---|
| 15 | DATA (FILE)1 | | FILE IDENTIFIER | - | F-1 |
| 16 | | | TARGET TIME OF ACCESS FROM APP | - | 60 min. |
| 17 | | | TARGET START TIME-OF-DAY OF ACCESS FROM APP | - | WORKFLOW START +0 min. |
| 18 | | | TARGET END TIME-OF-DAY OF ACCESS FROM APP | - | WORKFLOW START +60 min. |
| 19 | | | REQUIRED INTRA-BASE COMPUTATION-STORAGE NETWORK BANDWIDTH | COMPUTATION-STORAGE NETWORK BANDWIDTH REQUIRED TO ACHIEVE IO PERFORMANCE REQUIRED TO ACCESS FILE WITHIN BASE, REGARDLESS OF WHETHER TARGET FILE IS STUB FILE OR MASTER FILE | 130 MB/sec |
| 20 | | | REQUIRED INTER-BASE STORAGE NETWORK BANDWIDTH | NETWORK BANDWIDTH REQUIRED TO MEET TARGET FILE ACCESS TIME, INCLUDING FILE TRANSFER BETWEEN BASES | 150 MB/sec |
| 21 | | | REQUIRED NUMBER OF STORAGE NODES | NUMBER OF STORAGE NODES REQUIRED TO ACHIEVE IO PERFORMANCE REQUIRED TO ACCESS FILE WITHIN BASE, REGARDLESS OF WHETHER TARGET FILE IS STUB FILE OR MASTER FILE | 0.3 node |
| 22 | | | IO PERFORMANCE UTILIZATION AMOUNT | IO PERFORMANCE OF STORAGE REQUIRED TO ACCESS FILE WITHIN BASE | 100 IOPS, 130 MB/sec |
| ... | | | ... | ... | ... |
| 30 | DATA (FILE)2 | | ... | ... | ... |
| ... | | | ... | ... | ... |
| 80 | APP (CONTAINER)2 | | ... | ... | ... |
| ... | WORKFLOW2 | | | | |
| ... | DATA REARRANGEMENT (COMBINATION 2) | | - | - | - |

FIG. 11

CALCULATION-PURPOSE REARRANGEMENT VARIABLE MANAGEMENT TABLE 1223

| # | TARGET | VARIABLE | DESCRIPTION | VALUE |
|---|---|---|---|---|
| 1 | DATA REARRANGEMENT (COMBINATION 1) | DATA REARRANGEMENT TIME | TIME TAKEN TO MOVE ALL PIECES OF DATA TO BE REARRANGED | 60 min. |
| 2 | | DATA REARRANGEMENT START TIME-OF-DAY | - | 0:00 |
| 3 | | DATA REARRANGEMENT END TIME-OF-DAY | - | 1:00 |
| 4 | INTER-BASE STORAGE NW PATH1 | AMOUNT OF TRANSFER FOR REARRANGEMENT | TOTAL VALUE OF AMOUNT OF DATA TRANSFERRED VIA TARGET NW | 400 GB |
| 5 | | INTER-BASE NETWORK BANDWIDTH | BANDWIDTH OF NW | 150 MB/s |
| 6 | | EXISTING INTER-BASE NETWORK UTILIZATION AMOUNT | AMOUNT OF NW BANDWIDTH CONSUMED BY EXISTING WORKLOAD (AVERAGE) | 15 MB/s |
| 7 | | AMOUNT OF USAGE OF NW BY REARRANGEMENT | AMOUNT OF NW BANDWIDTH CONSUMED BY REARRANGEMENT | 135 MB/s |
| 8 | | NW RESOURCE USAGE RATE | USAGE RATE OF NW RESOURCES CONSUMED BY REARRANGEMENT AND EXISTING WORKLOAD IN COMBINATION | 100% |
| 9 | | SHORTEST REARRANGEMENT TIME | TIME TAKEN TO TRANSFER [AMOUNT OF TRANSFER FOR REARRANGEMENT] USING ALL [INTER-BASE NETWORK BANDWIDTH] (IN THIS CASE, NW RESOURCE USAGE RATE IS EXPECTED TO BE 100%) | 49 min |
| 10 | INTER-BASE STORAGE NW PATH2 | ⋮ | ⋮ | ⋮ |
| ⋮ | | ⋮ | ⋮ | ⋮ |
| 21 | DATA REARRANGEMENT (COMBINATION 2) | ⋮ | ⋮ | ⋮ |
| ⋮ | | ⋮ | ⋮ | ⋮ |

FIG. 12 CALCULATION-PURPOSE INFRASTRUCTURE INFORMATION MANAGEMENT TABLE 1224

| # | TARGET | | | ITEM | VALUE |
|---|---|---|---|---|---|
| 1 | DATA REARRANGEMENT (COMBINATION 1) | BASE1 | WF1 | COMPUTATION CLUSTER | COMPUTATION CONSUMPTION AMOUNT | CPU UTILIZATION AMOUNT | [TIME-OF-DAY] — [UTILIZATION AMOUNT] 00:00:00 — 2 core (APP 1) 01:00:00 — 1 core (APP 2)... |
| | | | | | | MEMORY UTILIZATION AMOUNT | 00:00:00 — 0.5 GB 01:00:00 — 0.4 GB... |
| | | | | | | INTRA-CLUSTER NETWORK UTILIZATION AMOUNT | 00:00:00 — 10 MB/sec 01:00:00 — 4 MB/sec... |
| | | | STORAGE CLUSTER | STORAGE CONSUMPTION AMOUNT | NUMBER OF STORAGE NODES FOR IO | 00:00:00 — 0.3 NODE (APP 1 -> FILE 1) 00:30:00 — 0.6 NODE (APP 1 -> FILE 2)... |
| | | | | | IO PERFORMANCE UTILIZATION AMOUNT | 00:00:00 — 200IOPS, 100MB/s (APP 1 -> FILE 1) 00:30:00 — 300IOPS, 200MB/s (APP 1 -> FILE 2)... |
| | | | | | INTRA-BASE COMPUTATION-STORAGE NETWORK UTILIZATION AMOUNT | 00:00:00 — 100MB/sec 00:30:00 — 200MB/sec... |
| | | EXISTING WORKLOAD | COMPUTATION CLUSTER | COMPUTATION CONSUMPTION AMOUNT | ⋮ | ⋮ |
| | | | STORAGE CLUSTER | STORAGE CONSUMPTION AMOUNT | ⋮ | ⋮ |
| 2 | | BASE2 | WF1 | INTER-STORAGE NETWORK | NETWORK CONSUMPTION AMOUNT | INTER-BASE STORAGE NETWORK UTILIZATION AMOUNT | 00:00:00 — 10MB/sec 00:30:00 — 200MB/sec... |
| ⋮ | | BETWEEN BASES 1 AND 2 | | ⋮ | ⋮ | ⋮ | ⋮ |
| | | BETWEEN BASES 2 AND 3 | | ⋮ | ⋮ | | |
| | DATA REARRANGEMENT (COMBINATION 2) | | | | | | |

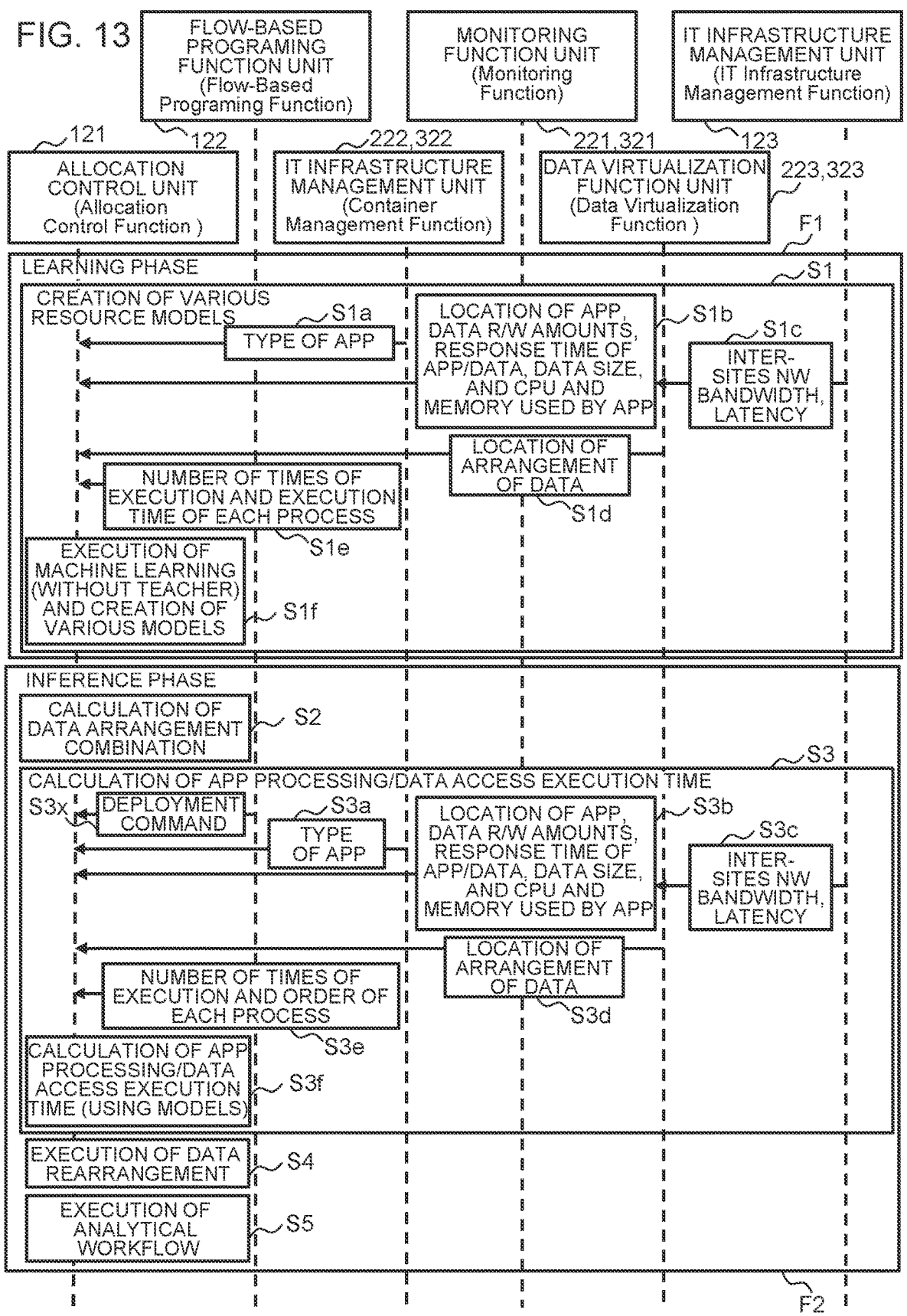

FIG. 15

| # | TYPE OF APP | LOCATION OF APP (BASE) | LOCATION OF DATA (BASE) |
|---|---|---|---|
| 1 | APP(MachineLearningX) | ON-PREMISE#1 | ON-PREMISE#1 |
| 2 | | ON-PREMISE#1 | ON-PREMISE#2 |
| 3 | | ON-PREMISE#1 | CLOUD |
| 4 | | ON-PREMISE#2 | ON-PREMISE#1 |
| ⋮ | ⋮ | ⋮ | ⋮ |
| 10 | APP2(MachineLearningY) | ON-PREMISE#1 | ON-PREMISE#1 |
| ⋮ | ⋮ | ⋮ | ⋮ |

INFORMATION INFRASTRUCTURE MANAGEMENT METHOD, MANAGEMENT SERVER, AND NON-TRANSITORY COMPUTER-READABLE RECORDING MEDIUM FOR MANAGING A COMPUTING MACHINE HAVING A COMPUTATIONAL RESOURCE FOR EXECUTING A WORKFLOW AND A STORAGE RESOURCE COMMUNICABLY COUPLED TO THE COMPUTING MACHINE

CROSS REFERENCES TO RELATED APPLICATION

This application claims priority based on Japanese patent applications, No. 2021-202916 filed on Dec. 14, 2021, the entire contents of which are incorporated herein by reference.

BACKGROUND

The present disclosure relates to an information infrastructure management method, a management server of an information infrastructure, and an information infrastructure management program.

DESCRIPTION OF THE RELATED ART

Recent years have seen rapid growth in data management market targeted for cooperation systems such as hybrid clouds and multi-clouds in which a plurality of bases (on-premises, public clouds, etc.) cooperate with one another. For example, in a hybrid cloud environment, deployment of applications to be used (software run by the applications to be used) and arrangement of data used by the applications to be used (data utilization through data transfer, data copy, etc.) are executed in each base, with factors such as costs, performance, and security taken into account. For example, in U.S. Pat. No. 9,632,709, data is arranged in units of a dataset using metadata as a clue.

Generally, it takes a processing time to execute an analytical workflow (a series of analytical processes combining applications and data) in an information infrastructure. Completing the execution of all analytical workflows in an information infrastructure within a time specified by an analyst requires correctly predicting the execution time from the order of execution of the applications and appropriately allocating the information infrastructure (arranging resources).

However, conventional scheduling functions of information infrastructures including computation and storage provide no way to know when execution of an analytical application starts and when it ends, and thus do not allow prediction of the execution time of the application. Specifically, the conventional scheduling functions for information infrastructures leave no other option but to arrange the resources to running application and usage data based only on the index of a resource consumption frequency per unit time, such as a usage rate of a central processing unit (CPU) and an input/output per second (IOPS). In addition, even when a certain process is consuming a large amount of resources, there is no information for determining whether this is appropriate.

Thus, the above-described related art does not take the total time from preparation of data to completion of the analytical workflow into account, and therefore cannot correctly predict the execution time of the application or appropriately arrange the resources.

The present disclosure has been contrived in view of this situation, and one of objects thereof is to appropriately arrange resources in an information infrastructure.

SUMMARY

One aspect of the present disclosure to solve this problem is an information infrastructure management method that manages a computing machine having a computational resource for executing a workflow and a storage resource communicably coupled to the computing machine. In this method, a management server having a processor and a memory has a workflow editing function of creating the workflow based on an order of execution and a number of times of execution of applications executed in the workflow, an order of execution and a number of times of execution of data access from the applications to data stored in the storage resource, and a result of editing of an execution time limit of the workflow by a user.

The method includes the following processes executed by the management server:

acquiring, from the workflow editing function, an order of execution and a number of times of execution of the applications and an order of execution and a number of times of execution of data access from the applications; and for each of the applications:

calculating a processing speed of the application by dividing a total data size of the data access by a processing time of the application;

inputting the calculated processing speed into a computational resource model that models a relationship between the processing speed and an amount of the computational resource used, to thereby calculate a required amount of the computational resource required to execute the application;

when a usage rate of the computational resource based on the required amount and an existing load on the computational resource within the execution time limit exceeds a computational resource upper limit, inputting an available capacity of the computational resource obtained by subtracting the existing load from an upper limit amount of the computational resource into the computational resource model, to thereby calculate a first executable time during which the application is executable based on the available capacity of the computational resource; and setting a target execution time of the application in executing the workflow as the first executable time, and making an adjustment of adding an extension time of the target execution time according to the first executable time to a target execution time of another of the applications that does not exceed the computational resource upper limit so as to postpone an end time-of-day of the application and advance a start time-of-day of the other application.

According to one aspect of the present disclosure, resources can be appropriately arranged in an information infrastructure.

BRIEF DESCRIPTION OF THE DRAWINGS

FIG. 3 is a diagram showing an example of the configuration of an allocation control unit;

FIG. 4 is a table showing an example of the configuration of an analytical workflow information management table;

FIG. 5 is a table showing an example of the configuration of an app/data characteristics information management table;

FIG. 6 is a table showing an example of the configuration of a resource model management table;

FIG. 7 is a table showing an example of the configuration of a configuration information management table;

FIG. 8 is a table showing an example of the configuration of an operation information management table;

FIG. 9 is a table showing an example of the configuration of a data arrangement combination table;

FIG. 10A is a table showing an example of the configuration of a calculation-purpose WF variable management table (former part);

FIG. 10B is a table showing an example of the configuration of a calculation-purpose WF variable management table (latter part);

FIG. 11 is a table showing an example of the configuration of a calculation-purpose rearrangement variable management table;

FIG. 12 is a table showing an example of the configuration of a calculation-purpose infrastructure information management table;

FIG. 13 is a sequence chart showing an example of overall processing of a data optimal arrangement process according to the embodiment;

FIG. 15 is a table showing an example of combinations of arrangement patterns of apps and data by type of app when actually measuring resource operation information;

DESCRIPTION OF EMBODIMENT

Figure 1:
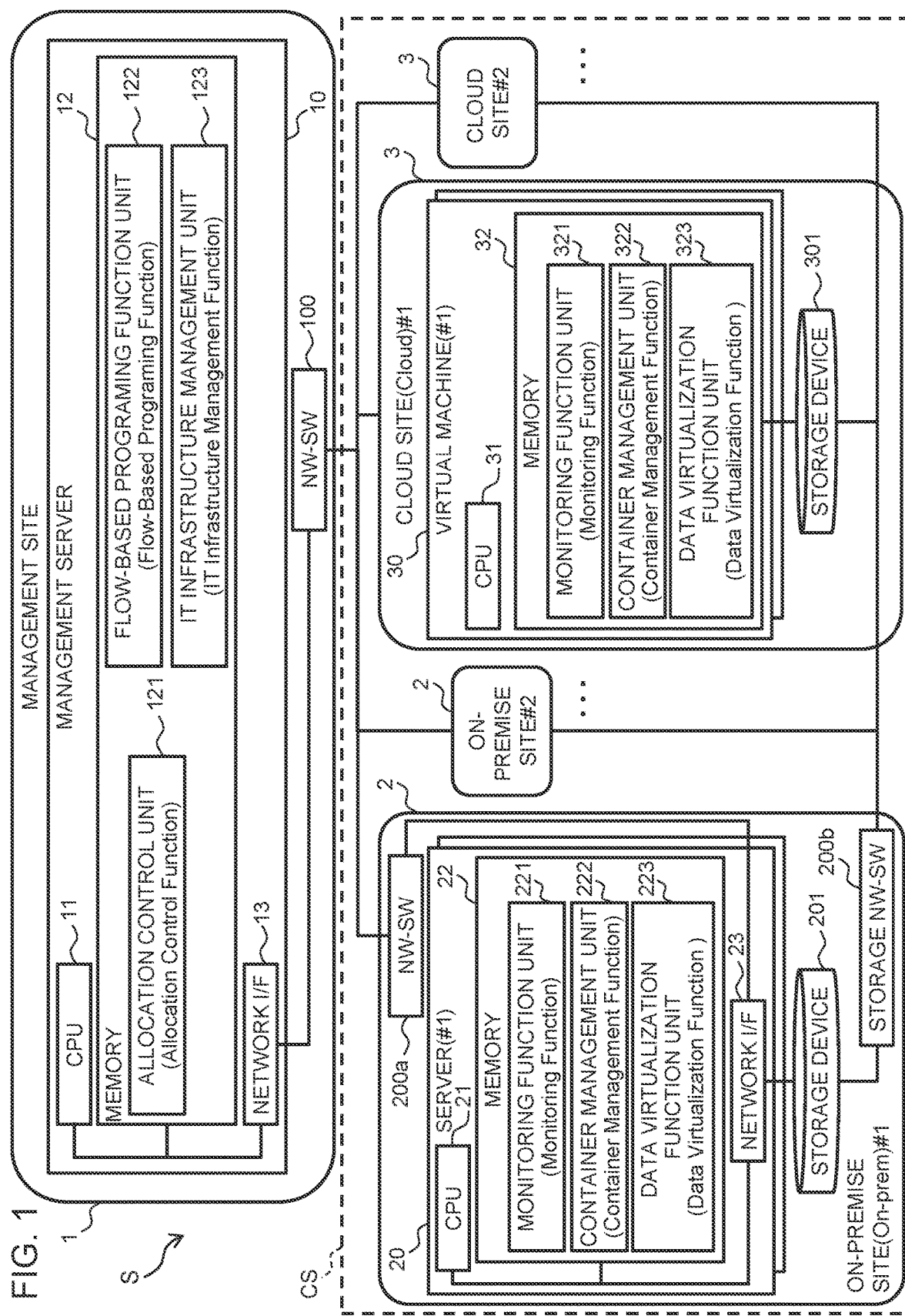
FIG. 1 is a diagram showing an example of the configuration of an entire system according to an embodiment.

An embodiment of the present disclosure will be described below with reference to the drawings. The embodiment to be descried below, including the drawings, is merely an example and does not limit the disclosure according to the claims. All elements and their combinations described in the embodiment are not necessarily essential to the solutions adopted by the disclosure. Depiction and description of components that are essential to the configuration of the disclosure but are commonly known may be omitted.

In the following description, programs may be installed in an apparatus such as a computing machine, or may be provided in, for example, a recording medium (e.g., a non-transitory recording medium) that a program distribution server or a computing machine can read. In the following description, two or more programs may be realized as one program, or one program may be realized as two or more programs.

In the following description, there is one or more central processing units (CPUs). The processor is not limited to a microprocessor represented by a CPU but may also be other type of processor, such as a graphics processing unit (GPU). The CPU may be a single-core CPU or may be a multi-core CPU. Further, the CPU can be substituted by a processor in a broad sense, such as a hardware circuit that performs some or all of processes (e.g., a field-programmable gate array (FPGA) or an application-specific integrated circuit (ASIC)).

In the following description, information will be described in the form of a table, like "xxx table," but information may be data having any structure. Therefore, "xxx table" can be rephrased as "xxx information." Further, in the following description, the configuration of each table is one example, and one table may be divided into two or more tables or the whole or part of two or more tables may be combined into one table.

In the following description, identification numbers are used as identification information on various targets. However, other types of identification information (e.g., identifiers including an alphabet or a sign) than identification numbers may be adopted. In the following description, "#Y" represents number Y; for example, "XXX#Y" represents XXX identified by number Y.

In the following description, when the same type of elements are described without a distinction made therebetween, a reference sign (or a common sign among reference signs) is used, and when the same type of elements are described with a distinction made therebetween, identification numbers (or reference signs) of the elements may be used. The number of each element shown in the drawings is one example and the number is not limited to that shown in the drawings.

In the following description, a cooperation system is a hybrid cloud, but this is merely one example of an information infrastructure in which an analytical workflow is executed. Thus, the information infrastructure in which an analytical workflow is executed may be either a system having a single base or a cooperation system in which multiple bases cooperate with one another. A computation unit (computational resource) of each base may be either an on-premise server or a virtual machine. For example, the cooperation system is not limited to a hybrid cloud and may also be a multi-cloud.

In the following description, data Dx and file FLx are synonyms.

(Configuration of Entire System S)

FIG. 1 is a diagram showing an example of the configuration of an entire system S according to an embodiment. The entire system S includes, in its configuration, bases that are a management site 1, one or more on-premise sites 2, and one or more cloud sites 3. In the management site 1, a management server 10 and a network switch (NW-SW) 100 are arranged.

In the on-premise site 2, one or more on-premise servers 20, one or more storage devices 201, an NW-SW 200*a*, and a storage NW-SW 200*b* are arranged. A plurality of servers 20 within the same base as a whole constitutes one cluster, and the individual servers 20 represent nodes.

In the cloud site 3, one or more virtual machines 30 built on physical machines, and a storage device 301 provided as a storage service realized through virtualization of a storage are arranged. A plurality of virtual machines 30 within the same base as a whole constitutes one cluster, and the individual virtual machines 30 represent nodes.

The management server 10, the server 20, and the virtual machine 30 are coupled to one another through the NW-SWs 100, 200*a* and a network. The storage devices 201, 301 are coupled to each other through the storage NW-SW 200*b* and the network.

The management server 10 manages a cooperation system CS that includes the server 20 and the virtual machine 30 in its configuration. The management server 10 includes a CPU 11, a memory 12, and a network interface (I/F) 13 in its configuration. The CPU 11 realizes various functional units by executing programs in cooperation with the memory 12.

In the memory 12, an allocation control unit 121, a flow-based programing function unit 122, and an IT infrastructure management unit 123 are stored as functional units realized by the CPU 11.

The allocation control unit 121 performs calculations for determining bases (the on-premise sites 2, the cloud sites 3) in which pieces of data in an analytical workflow executed in the cooperation system CS are to be arranged, and outputs a command to execute the arrangement of the pieces of data to the destinations of arrangement determined by the calculations.

The flow-based programing function unit 122 provides a workflow editor called a flow-based programing function that has a function of allowing a user to couple applications and data to one another on a user interface (UI) and define an analytical workflow. The IT infrastructure management unit 123 integrally manages and monitors various pieces of information equipment constituting an information infrastructure that is arranged at each remote base of the on-premise sites 2 and the cloud sites 3.

The server 20 includes a CPU 21, a memory 22, and a network I/F 23 in its configuration. The CPU 21 realizes various functional units by executing programs in cooperation with the memory 22. In the memory 22, a monitoring function unit 221, a container management unit 222, and a data virtualization function unit 223 are stored as functional units realized by the CPU 21.

The monitoring function unit 221 links a container application (hereinafter abbreviated as an "app") and operation information on an IT infrastructure etc. to each other so as to be monitorable. The container management unit 222 is an execution infrastructure for apps. The data virtualization function unit 223 builds a storage network in cooperation with other data virtualization function units 223, 323 and executes data arrangement between different storage devices 201, 301. Further, the data virtualization function unit 223 stubs (virtualizes) files or volumes in cooperation with other data virtualization function units 223, 323 and transfers the actual data in the background. In addition, the data virtualization function unit 223 manages a relationship between the storage devices 201, 301 and positions where data is arranged.

The virtual machine 30 includes a CPU 31 and a memory 32 in its configuration. The CPU 31 realizes various function units by executing programs in cooperation with the memory 32. In the memory 32, a monitoring function unit 321, a container management unit 322, and a data virtualization function unit 323 are stored as functional units realized by the CPU 31. The monitoring function unit 321, the container management unit 322, and the data virtualization function unit 323 have the same functions as the monitoring function unit 221, the container management unit 222, and the data virtualization function unit 223, respectively.

The virtual machine 30 is not limited to a container virtual server and may also be a hypervisor virtual server, and apps running on the server 20 and the virtual machine 30 are not limited to container apps.

(Configuration of Storage Device 201)

Figure 2:
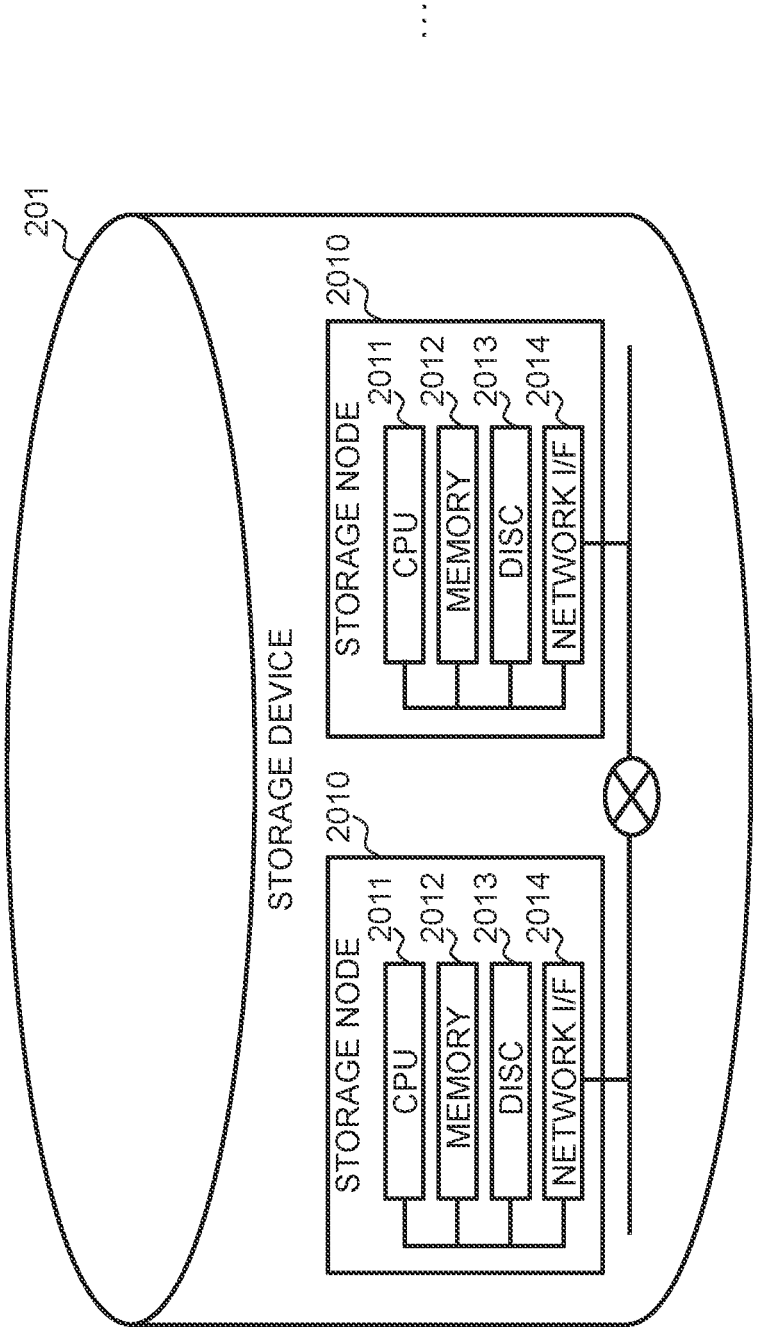
FIG. 2 is a diagram showing an example of the configuration of a storage device.

FIG. 2 is a diagram showing an example of the configuration of the storage device 201. The storage device 201 includes, in its configuration, one or more storage nodes 2010 that are communicably coupled to one another. Each storage node 2010 includes a CPU 2011, a memory 2012, a disc 2013, and a network I/F 2014 in its configuration. The CPU 2011, by itself or together with the CPU 2011 of another storage node 2010, manages the disc 2013, which is a physical storage medium, and provides a storage area for the server 20 in cooperation with the memory 2012.

The storage device 301 provides the same function as the storage device 201 through virtualization of a storage.

(Configuration of Allocation Control Unit 121)

FIG. 3 is a diagram showing an example of the configuration of the allocation control unit 121. The allocation control unit 121 has, as functional units that are realized as the CPU 11 executes programs, a resource model creation unit 1211, a data arrangement combination calculation unit 1212, an app processing/data access execution time calculation unit 1213, an arrangement change execution unit 1214, and an analytical workflow execution unit 1215.

The allocation control unit 121 stores, as various pieces of information, an analytical workflow information management table 1216, an app/data characteristics information management table 1217, a resource model management table 1218, a configuration information management table 1219, an operation information management table 1220, a data arrangement combination table 1221, a calculation-purpose workflow (WF) variable management table 1222, a calculation-purpose rearrangement variable management table 1223, and a calculation-purpose infrastructure information management table 1224.

(Configuration of Analytical Workflow Information Management Table 1216)

FIG. 4 is a table showing an example of the configuration of the analytical workflow information management table 1216. The analytical workflow information management table 1216 is a table that manages information on an analytical workflow to be executed in the cooperation system CS. The analytical workflow information management table 1216 has items "target," "item," "value," and "source." "Target" manages information about apps (apps (containers)) executed in the corresponding analytical workflow and data (data files) used in the corresponding analytical workflow.

For example, in lines #1 to #4 of the analytical workflow information management table 1216, as "items" of "workflow 1," their "values," and "sources" that are origins of output of information, values and sources corresponding to "workflow identifier," "execution time limit (min.) of workflow," "order/number of times of execution of app," and "order/number of times of execution of file access" are stored. Lines #1 to #4 show: the workflow 1 identified by "WF1" has an execution time limit of 120 minutes; apps "App-a" and "App-b" are concurrently executed once and then an app "App-c" is executed once; the app "App-a" accesses a file "FL0" once and then accesses a file "FL1" once; and the origin of output of these pieces of information is the "flow-based programing function" (flow-based programing function unit 122).

(Configuration of App/Data Characteristics Information Management Table 1217)

FIG. 5 is a table showing an example of the configuration of the app/data characteristics information management table 1217. The app/data characteristics information management table 1217 is a table that manages attribute information on apps and data in an analytical workflow to be executed in the cooperation system CS. The app/data characteristics information management table 1217 has items "category," "item," "details," "value," "source," and "acquired for."

"Category" shows whether the target is a container app (app (container)) or a data file (data (file)) or both of them (common). "Item" lists specific items of identification information such as the IDs and types of targets shown in "category" and characteristics information about execution of an app such as amounts of data input/output by the app and the number of CPU cores. "Details" is description of each "item." "Value" is a specific value that each "item" assumes. "Source" is an origin of output of the value of each "item." "Acquired for" shows whether each "item" is acquired in a "learning phase" or an "inference phase," to be described later, or in both of them.

For example, in line #3 of the app/data characteristics information management table 1217, as the "item" of the "app (container)" and its "value," "source," and "acquired for," values "location of app," "on-premise site #1," "monitoring function (during learning)/flow-based programing function (during inference)," "learning/inference" are stored. Line #3 shows that "location of app" of "app (container)" is information acquired and output during the learning phase and during the inference phase, and that it is acquired and output by the "monitoring function" during the learning phase and acquired and output by the "flow-based programing function" during the inference phase.

(Configuration of Resource Model Management Table 1218)

FIG. 6 is a table showing an example of the configuration of the resource model management table 1218. The resource model management table 1218 is a table that manages resource models created in the learning phase to be described later. The resource model management table 1218 has items "category," "model name," "target resource (x)," "target requirement/index (y)," "type of app," "arrangement pattern," and "model formula." "Arrangement pattern" has items "app (stub data)" and "data (original data)."

"Category" shows the category of the corresponding resource model. "Model name" is the name of the corresponding resource model. "Target resource (x)" shows a resource that is a target of the corresponding resource model and gives an explanatory variable x of the corresponding resource model. "Target requirement/index (y)" is an evaluation index of the corresponding resource and is an objective variable y of the corresponding resource model. "Type of app" shows the type of an application to which the corresponding resource model is applied.

"App (stub data)" of "arrangement pattern" shows a base where the corresponding application is arranged. "Data (original data)" of "arrangement pattern" shows a base where data input and output by the corresponding application is arranged. When the base of "app (stub data)" and the base of "data (original data)" are different from each other, the original data in the base of "data (original data)" is, in the base of "app (stub data)," stub data that has been stubbed.

"Model formula" shows a formula expressing the corresponding resource model.

For example, the first line of the resource model management table 1218 shows that the resource model "number-of-CPU-cores model" of "app/computational resource model" is a resource model that has "CPU [cores]" (number x of CPU cores) as "target resource (x)" and "app processing speed [MB/s]" as "target requirement/index (y)" and is represented by a model formula "y=f1 (x)" applied to the type of app called "MachineLearningX."

(Configuration of Configuration Information Management Table 1219)

FIG. 7 is a table showing an example of the configuration of the configuration information management table 1219. The configuration information management table 1219 is a table that manages configuration information collected as an IT infrastructure model=specification information on hardware in a target environment.

The configuration information management table 1219 has items "target," "item to be modeled," "details," and "value." "Target" shows a place of application of the corresponding resource along with the type "storage" (storage resource) or "computation" (computational resource). "Item to be modeled" shows an item indicating specification information of which description is given in "details," and a specific value of this item is stored in "value." For example, line #1 of the configuration information management table 1219 shows that, for the entire storage as a target, "number of storage clusters" is "3" as the number of clusters (number of bases) in the entire system.

(Configuration of Operation Information Management Table 1220)

FIG. 8 is a table showing an example of the configuration of the operation information management table 1220. The operation information management table 1220 is a table that manages operation information collected as an IT infrastructure model=log information on a usage status of hardware in a target environment.

The operation information management table 1220 has items "target," "item to be modeled," "details," and "value." "Value" is further divided into parts showing "amount of resources used at each time (hour:minute:second)." "Target" shows a place of application of the corresponding resource along with the type "storage" (storage resource) or "computation" (computational resource). "Item to be modeled" shows an item indicating operation information of which description is given in "details," and a specific value of this item is stored in "value." For example, line #1 of the operation information management table 1220 shows that, for the storage of a base 1 as a target, the capacity utilized (in one cluster) is "40 TB." Further, according to line #2 of the operation information management table 1220, for the storage of the base 1 as a target, random/sequential read/write amounts (speeds) and read amounts (speed) at each time are shown.

(Configuration of Data Arrangement Combination Table 1221)

FIG. 9 is a table showing an example of the configuration of the data arrangement combination table 1221. The data arrangement combination table 1221 is a table that manages combinations of arrangement patterns in which pieces of data used in a target analytical workflow are arranged in bases. Six pieces of data, data 1 to data 6, are used in the target analytical workflow, and the data arrangement combination table 1221 manages patterns in which these pieces of data are arranged in bases constituting the cooperation system CS and the feasibility of these arrangements. For example, line #1 of the data arrangement combination table 1221 shows that a pattern in which all the pieces of data, the data 1 to the data 6, are arranged in the on-prem1 (on-premise site #1) is feasible (Yes).

Other Tables

FIGS. 10A and 10B are a table showing an example of the configuration of the calculation-purpose WF variable management table 1222. FIG. 11 is a table showing an example of the configuration of the calculation-purpose rearrangement variable management table 1223. FIG. 12 is a table showing an example of the configuration of the calculation-purpose infrastructure information management table 1224. The calculation-purpose WF variable management table 1222 is a table that temporarily manages work variables of a workflow. The calculation-purpose rearrangement variable management table 1223 is a table that temporarily manages work variables of data arrangement variables. The calculation-purpose infrastructure information management table 1224 is a table that temporarily manages infrastructure information.

(Optimal Dispersion Process of Virtual Datasets Relating to Analytical Workflow)

In the following, an optimal dispersion process of virtual datasets relating to an analytical workflow according to the embodiment will be described. The following description assumes that applications appearing in the analytical workflow run across multiple bases (sites) and that data to be used can be cross-referenced between sites through the data virtualization functions (data virtualization function units 223, 323).

(Overall Processing of Data Optimal Arrangement Process)

FIG. 13 is a sequence chart showing an example of the overall processing of the data optimal arrangement process according to the embodiment. The data optimal arrangement process is roughly divided into a learning phase F1 in which various resource models are created, and an inference phase F2 in which an operation status of each type of resource is inferred using the various resource models created in the learning phase F1, and arrangement of data to be used in the analytical workflow is determined based on the result of inference.

The learning phase F1 includes S1: creation of various resource models. In S1: creation of various resource models, the allocation control unit 121 collects the type of an app from the container management units 222, 322 (S1*a*); collects the location of the app, r/w amount of data, app/data response time, data size, and operation statuses of computational resources and storage resources such as a CPU and a memory used by the app (S1*b*); collects the operation status of network resources such as a network (NW) bandwidth between sites and a latency from the IT infrastructure management unit 123 (S1*c*); collects information on the location of arrangement of data from the data virtualization function units 223, 323 (S1*d*); and collects information such as the number of times of execution and the execution time of each process from the flow-based programing function unit 122 (S1*e*). Then, the allocation control unit 121 learns the various pieces of information collected in S1*a* to S1*e* and creates various resource models (S1*f*).

The inference phase F2 includes S2: calculation of data arrangement combination, S3: calculation of app processing/data access execution time, S4: execution of data rearrangement, and S5: execution of analytical workflow.

In S3: calculation of app processing/data access execution time, the flow-based programing function unit 122 gives a command to the allocation control unit 121 to deploy the data in the combination of arrangement of bases calculated in S2: calculation of data arrangement combination (S3*x*). Then, the allocation control unit 121 collects the same pieces of information as in S1*a* to S1*e*. Specifically, the allocation control unit 121 collects the type of app from the container management units 222, 322 (S3*a*); collects the location of app, r/w amount of data, app/data response time, data size, and operation statuses of computational resources and storage resources such as a CPU and a memory used by the app from the monitoring function units 221, 321 (S3*b*); collects the operation status of network resources such as an intersite NW bandwidth and a latency from the IT infrastructure management unit 123 (S3*c*); collects information on the location of arrangement of data from the data virtualization function units 223, 323 (S3*d*); and collects information such as the number of times of execution and the execution time of each process from the flow-based programing function unit 122 (S3*e*). Then, the allocation control unit 121 calculates the app processing/data access execution time from the various pieces of information collected in S3*a* to S3*e* using the various resource models created in S1*f* (S3*f*).

(Processing in Learning Phase)

Figure 14:
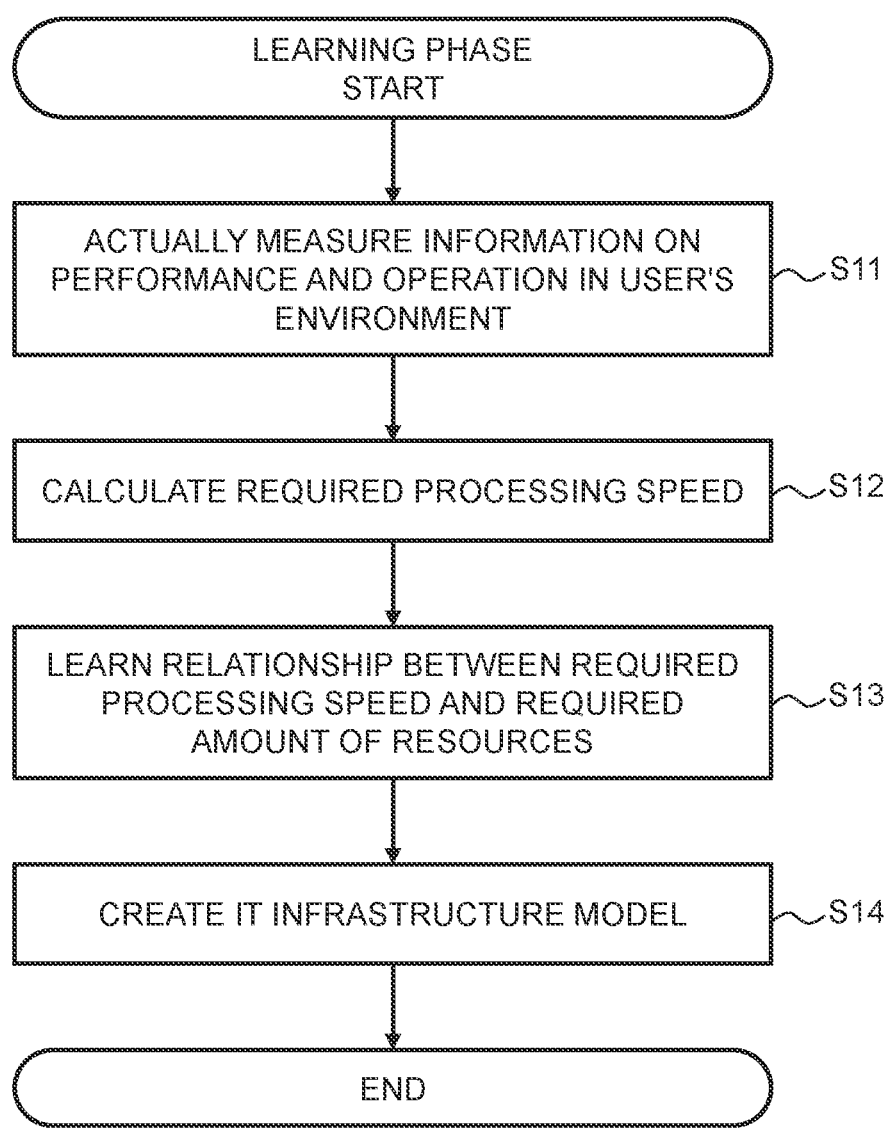
FIG. 14 is a flowchart showing an example of processing in a learning phase.

Next, the learning phase will be described. FIG. 14 is a flowchart showing an example of processing in the learning phase. S11 to S13 of the learning phase shown in FIG. 14 correspond to S1: creation of various resource models (FIG. 13). A resource model is a model for obtaining an amount of hardware resources required to achieve a processing speed required to execute an app. Resource models are created by the allocation control unit 121 of the management server 10.

In S1: creation of various resource models, before a user executes the actual processing of an analytical workflow, the allocation control unit 121 executes a target app beforehand using a small amount of data and creates a model. The model is created based on a result of actually measuring the processing speed and the resource operation information in a combination of arrangement patterns of apps and data for each type of app. In S1: creation of various resource models, commonly known technologies such as a statistic regression formula and machine learning are used in creating models.

First, in S11, the resource model creation unit 1211 (FIG. 3) of the allocation control unit 121 executes actual measurement of information on performance and operation in the user's environment. The resource model creation unit 1211 collects resource operation information required to create various resource models from various sources and registers the information in the app/data characteristics information management table 1217 (FIG. 5). Among the pieces of information collected here, the usage amount of each type of resource is, for example, an average of usage amounts acquired at unit time intervals. Examples of the types of apps and the combinations of data arrangement patterns when collecting the information required to create various resource models are shown in FIG. 15.

Next, in S12, the resource model creation unit 1211 calculates a required processing speed of the app. The required processing speed of the app refers to a speed required for the app to access certain data and execute a series of analytical processes within a predetermined time. As shown by the following Formula (1), the actually measured value of the required processing speed of the app is calculated based on "execution time of app (analytical processing time)" and "amount of data input/output by app."

$$\text{(Actually measured value of) required processing speed of app (byte/sec)} = \text{amount of data input/output by app (byte)} / \text{execution time of app (sec)} \quad (1)$$

Next, in S13, the resource model creation unit 1211 estimates the relationship between the required processing speed of the app and the required amount of resources and creates a relationship model. For example, in an example where a model is statistically created, the required processing speed of the app (y) and the amount of resources used (x) are plotted in an XY-plane and a linear or non-linear regression formula is created by a least-square method or the like. The resource models to be created in S13 are models of correlations between the execution performance of the app and the performance of access from the app to data on one hand and hardware resources on the other hand, and include an "app/computational resource model," an "app/data access characteristics model," and a "storage performance model." The resource model creation unit 1211 registers the created models in the resource model management table 1218 (FIG. 6).

The "app/computational resource model" models the amounts of CPU and memory required for required performance that is required for calculation processing of the app. The "app/computational resource model" is created for each app by learning the relationship between the processing speed of the app and the CPU and the memory consumed by the app.

Figure 16:
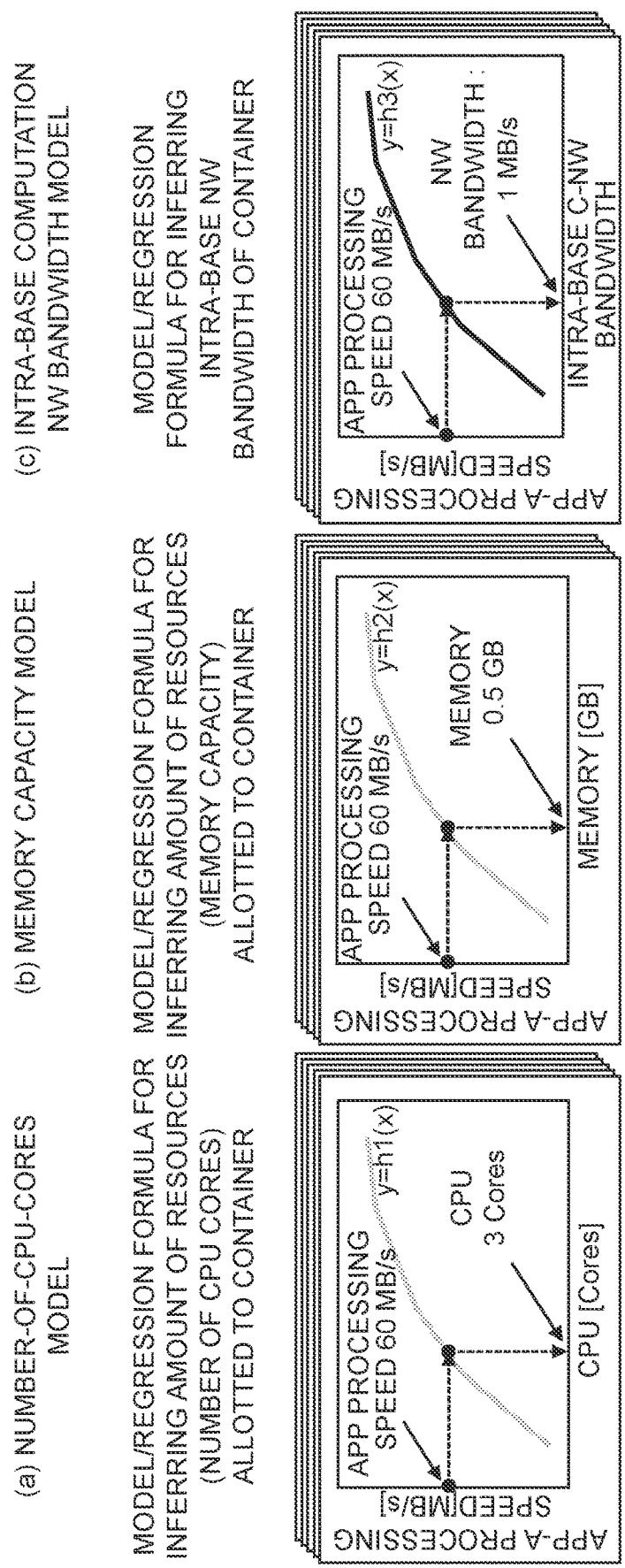
FIG. 16 is a chart showing examples of app/computational resource models.

The "number-of-CPU-cores model" shown in FIG. 16 (a) is a model/regression formula that infers an amount of resources (number of CPU cores) allotted to a container from the app processing speed. For example, this model is represented by y=h1 (x), with y being the app processing speed and x being the number of CPU cores.

The "memory capacity model" shown in FIG. 16 (b) is a model/regression formula that infers an amount of resources (memory capacity) allotted to a container from the app processing speed. For example, this model is represented by y=h2 (x), with y being the app processing speed and x being the memory capacity.

The "intra-base computation NW bandwidth model" shown in FIG. 16 (c) is a model/regression formula that infers an intra-base computation NW bandwidth of a container from the app processing speed. For example, this model is represented by y=h3 (x), with y being the app processing speed and x being the intra-base computation NW bandwidth of the container.

The "app/data access characteristics model" models the required 10 performance of storage (required storage performance) for the access processing speed from the app to data. The "app/data access characteristics model" is created for each app by learning the relationship between the processing speed of the app and the storage performance required by the app.

Figure 17:
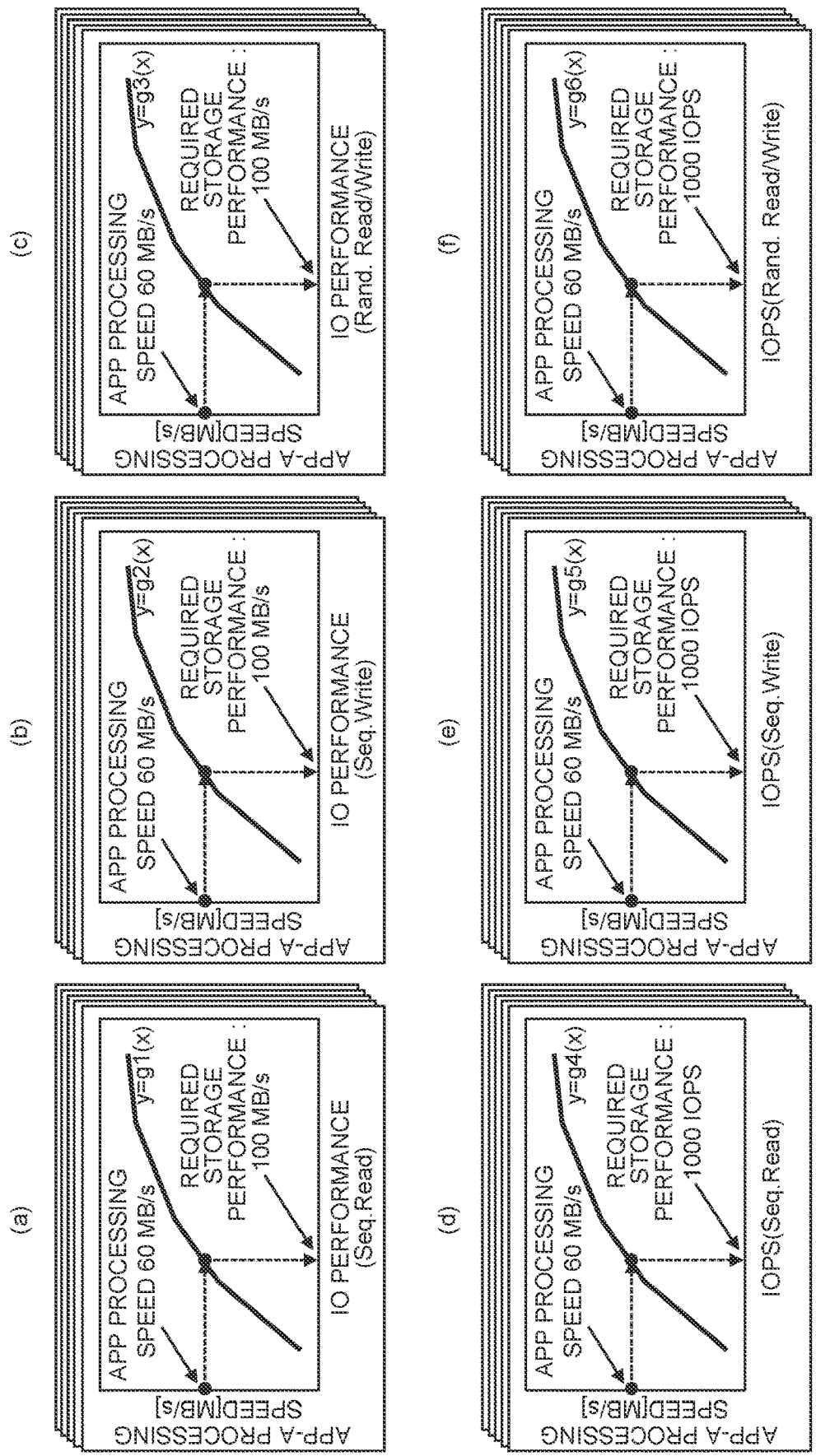
FIG. 17 is a chart showing examples of app/data access characteristics models.

The "storage IO performance (seq. read) (sequential read speed) model" shown in FIG. 17 (a) is a model/regression formula that infers storage IO performance (sequential read speed) from the app processing speed. For example, this model is represented by y=g1 (x), with y being the app processing speed and x being the storage IO performance (sequential read speed).

The "storage IO performance (seq. write) (sequential write speed) model" shown in FIG. 17 (b) is a model/regression formula that infers the storage IO performance (sequential write speed) from the app processing speed. For example, this model is represented by y=g2 (x), with y being the app processing speed and x being the storage IO performance (sequential write speed).

The "storage IO performance (rand. read/write) (random read/write speed) model" shown in FIG. 17 (c) is a model/regression formula that infers storage IO performance (random read/write speed) from the app processing speed. For example, this model is represented by y=g3 (x), with y being the app processing speed and x being the storage IO performance (random read/write speed).

The "storage IOPS (seq. read) (sequential read speed) model" shown in FIG. 17 (d) is a model/regression formula that infers storage an IOPS (sequential read speed) from the app processing speed. For example, this model is represented by y=g4 (x), with y being the app processing speed and x being the storage IOPS (sequential read speed).

The "storage IOPS (seq. write) (sequential write speed) model" shown in FIG. 17 (e) is a model/regression formula that infers a storage IOPS (sequential write speed) from the app processing speed. For example, this model is represented by y=g5 (x), with y being the app processing speed and x being the storage IOPS (sequential write speed).

The "storage IOPS (rand. read/write) (random read/write speed) model" shown in FIG. 17 (f) is a model/regression formula that infers a storage IOPS (random read/write speed) from the app processing speed. For example, this model is represented by y=g6 (x), with y being the app processing speed and x being the storage IOPS (random read/write speed).

The "storage performance model" models the required amount of hardware resources for the desired storage IO performance (required storage performance). The "storage performance model" is created for each base or pair of bases by learning the relationship of the required amount of hardware resources of storage for the desired storage IO performance (required storage performance).

Figure 18:
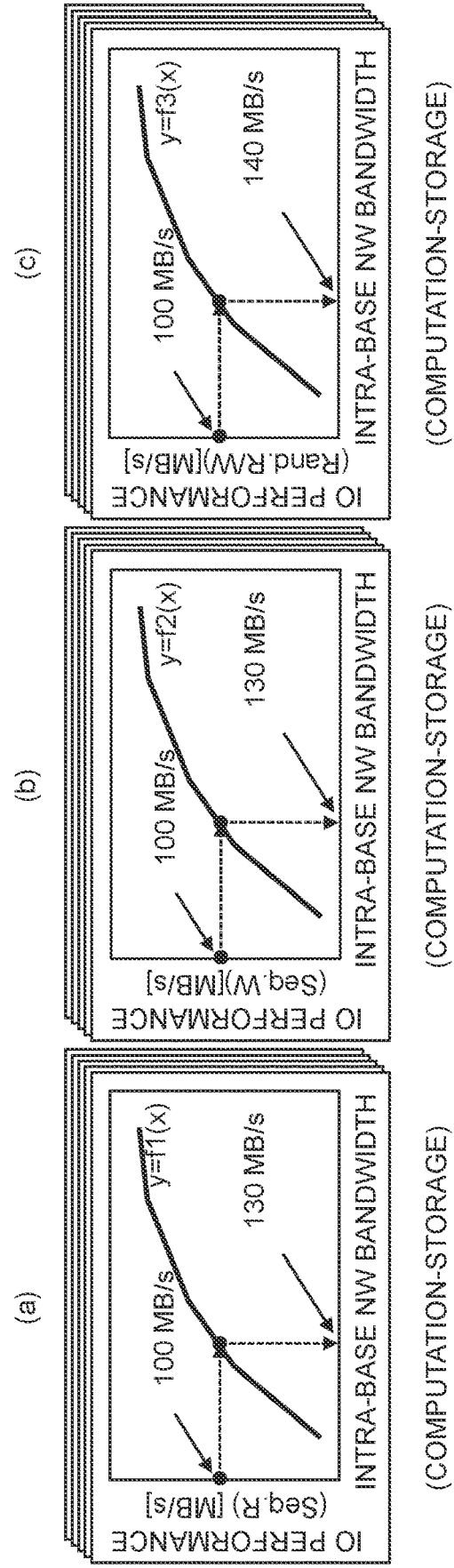
FIG. 18 is a chart showing examples of storage performance models (intra-base computation-storage)

The "intra-base NW bandwidth (computation-storage) model" shown in FIG. 18 (a) is a model/regression formula that infers an intra-base NW bandwidth (computation-storage) from the storage IO performance (seq. read). For example, this model is represented by y=f1 (x), with y being the storage IO performance (seq. read) and y being the intra-base NW bandwidth (computation-storage).

The "intra-base NW bandwidth (computation-storage) model" shown in FIG. 18 (b) is a model/regression formula that infers an intra-base NW bandwidth (computation-storage) from the storage IO performance (seq. write). For example, this model is represented by y=f2 (x), with y being the storage IO performance (seq. write) and x being the intra-base NW bandwidth (computation-storage).

The "intra-base NW bandwidth (computation-storage) model" shown in FIG. 18 (c) is a model/regression formula that infers an intra-base NW bandwidth (computation-storage) from the storage IO performance (rand. read/write). For example, this model is represented by y=f3 (x), with y being the storage IO performance (rand. read/write) and x being the intra-base NW bandwidth (computation-storage).

The "intra-base NW bandwidth (computation-storage) models" shown in FIG. 18 (a) to (c) are created for each base.

Figure 19:
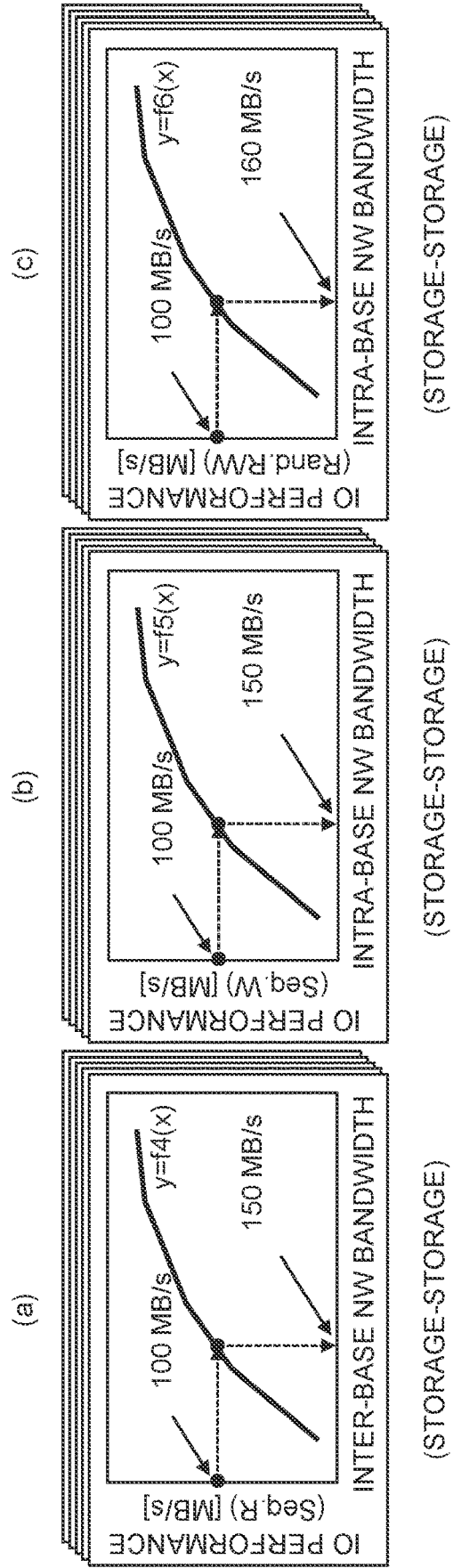
FIG. 19 is a chart showing examples of storage performance models (inter-base inter-storage)

The "intra-base NW bandwidth (storage-storage) model" shown in FIG. 19 (a) is a model/regression formula that infers an intra-base NW bandwidth (storage-storage) from the storage IO performance (seq. read). For example, this model is represented by y=f4 (x), with y being the storage IO performance (seq. read) and x being the intra-base NW bandwidth (storage-storage).

The "intra-base NW bandwidth (storage-storage) model" shown in FIG. 19 (b) is a model/regression formula that infers an intra-base NW bandwidth (storage-storage) from the storage IO performance (seq. write). For example, this model is represented by y=f5 (x), with y being the storage IO performance (seq. write) and x being the intra-base NW bandwidth (storage-storage). The "intra-base NW bandwidth (storage-storage) model" shown in FIG. 19 (b) is created for each pair of bases.

The "intra-base NW bandwidth (storage-storage) model" shown in FIG. 19 (c) is a model/regression formula that infers an intra-base NW bandwidth (storage-storage) from the storage IO performance (rand. read/write). For example, this model is represented by y=f6 (x), with y being the storage IO performance (rand. read/write) and x being the intra-base NW bandwidth (storage-storage).

The "intra-base NW bandwidth (storage-storage) models" shown in FIG. 19 (a) to (c) are created for each pair of bases.

Figure 20:
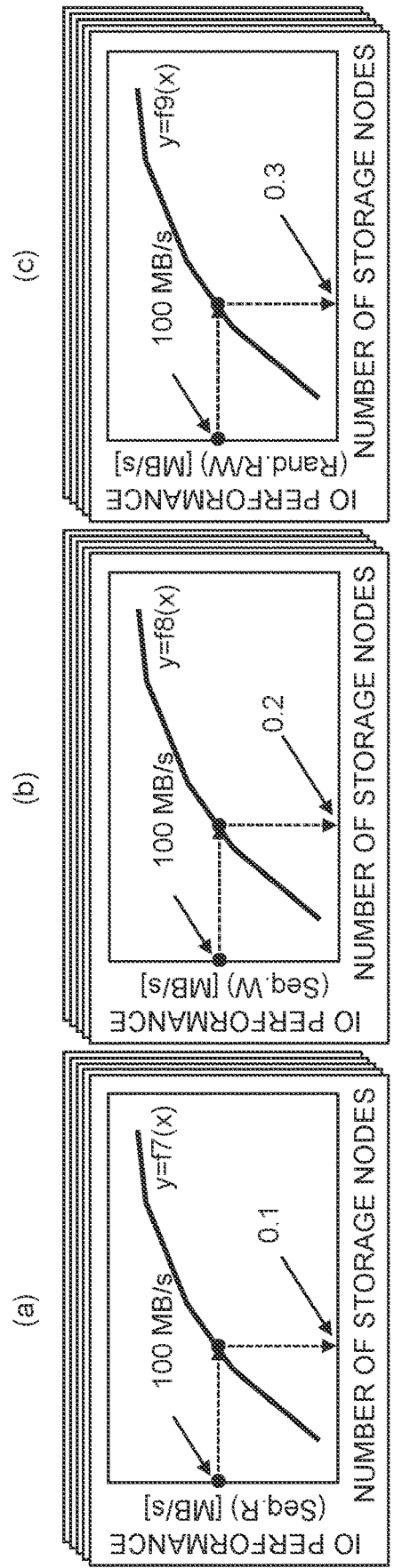
FIG. 20 is a chart showing examples of storage performance models (number of storage nodes)

The "number-of-storage-nodes model" shown in FIG. 20 (a) is a model/regression formula that infers a number of storage nodes from the storage IO performance (seq. read).

For example, this model is represented by y=f7 (x), with y being the storage IO performance (seq. read) and x being the number of storage nodes.

The "number-of-storage-nodes model" shown in FIG. 20 (*b*) is a model/regression formula that infers a number of storage nodes from the storage IO performance (seq. write). For example, this model is represented by y=f8 (x), with y being the storage IO performance (seq. write) and x being the number of storage nodes.

The "number-of-storage-nodes model" shown in FIG. 20 (*c*) is a model/regression formula that infers a number of storage nodes from the storage IO performance (rand. read/write). For example, this model is represented by y=f9 (x), with y being the storage IO performance (rand. read/write) and x being the number of storage nodes.

The "number-of-storage-nodes models" shown in FIG. 20 (*a*) to (*c*) are created for each storage device.

Next, in S14, the resource model creation unit 1211 creates the configuration information management table 1219 and the operation information management table 1220. (These tables will be collectively referred to as an "IT infrastructure model".) The configuration information management table 1219 and the operation information management table 1220 summarize collected actually measured values that serve as a basis in creating the resource models created in S13.

(Inference Phase)

Next, the inference phase will be described.

(Overview of Processing in Inference Phase)

Figure 21:
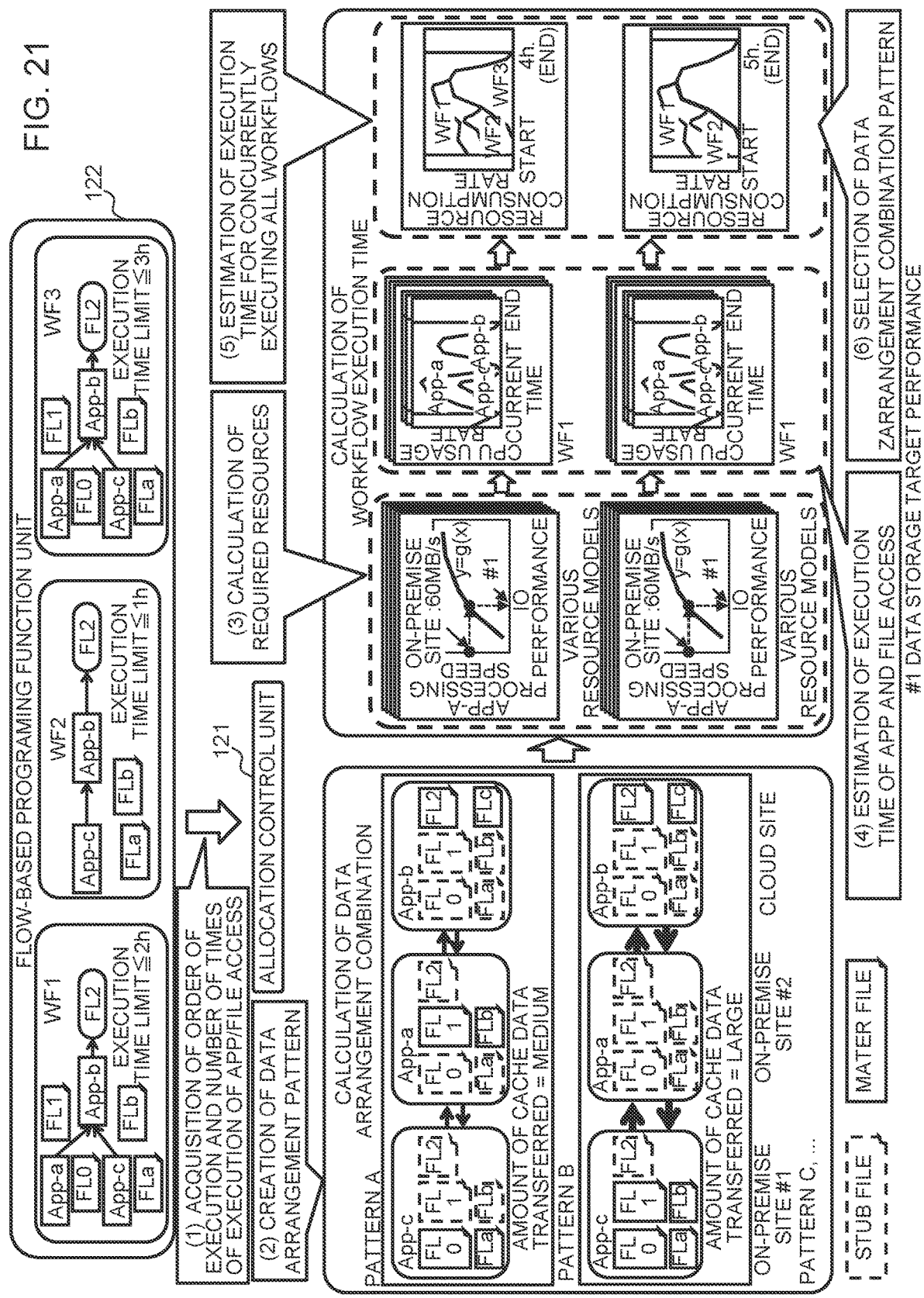
FIG. 21 is a chart for describing an overview of processing in an inference phase.

Before describing the processing flow in the inference phase, an overview of the processing will be described. FIG. 21 is a chart for describing an overview of the processing in the inference phase. FIG. 21 is a chart for describing an overview of the calculation of app processing/data access execution time in the inference phase.

For example, a case will be considered where the flow-based programing function unit 122 executes three workflows (WFs (analytical workflows)), a WF1, a WF2, and a WF3, as shown at an upper part of FIG. 21. The bases include three bases, on-premise sites #1 and #2 and a cloud site.

For the WF1, the execution time limit from the start to the end of processing is within three hours. In the WF1, an application a (App-a) executes processing using a FL (file) 0 and outputs the execution result to an FL1, while an application c (App-c) concurrently executes processing using an FLa and outputs the execution result to an FLb. Then, an application b (App-b) executes processing using the FL1 and the FLb and outputs the execution result to the FL2, which ends the processing.

For the WF2, the execution time limit from the start to the end of processing is within one hour. In the WF2, an application c (App-c) executes processing using an FLa and outputs the execution result to an FLb. Then, an application b (App-b) executes processing using the FLb and outputs the execution result to an FL2.

For the WF3, the execution time limit from the start to the end of processing is within three hours. In the WF3, an application a (App-a) executes processing using an FL1 and outputs the execution result to the FL1, while an application c (App-c) concurrently executes processing using an FLb and outputs the execution result to an FLc. Then, an application b (App-b) executes processing using the FL1 and the FLc and outputs the execution result to an FL2, which ends the processing.

To estimate the execution time in the case of executing the three workflows WF1 to WF3 at the same time, the allocation control unit 121 executes processing that is roughly divided into the following processes (1) to (5).

(1) Acquisition of Order of Execution, Number of Times of Execution, Etc. of App/File Access The allocation control unit 121 acquires information on the analytical workflow, such as the order of execution and the number of times of execution of the app and file access (see "item" in FIG. 4), and app/data characteristics information (see "item" corresponding to "inference" in "acquired for" in FIG. 5) from the flow-based programing function unit 122.

(2) Creation of Data Arrangement Pattern

Next, the allocation control unit 121 creates all patterns of combinations of data arrangement in which the applications and data files are arranged in the on-premise site #1, the on-premise site #2, and the cloud site. In FIG. 21, those of the files FLx arranged in the bases that are indicated by dashed lines are stub files and those indicated by solid lines are master files (original data). When an app within a base inputs into and outputs from a stub file, transfer of cache data of an original file present in another base occurs. Thus, as the number of times of accessing a stub file increases, the amount of cache data transferred increases.

For example, in pattern A shown in FIG. 21, the application c, the FL0, and the FLa are arranged in the on-premise site #1, the application a, the FL1, and the FLb are arranged in the on-premise site #2, and the application b, the FL2 and the FLc are arranged in the cloud site. In pattern B, the application c, the FL0, the FL1, the Fla, and the FLb are arranged in the on-premise site #1, the application a is arranged in the on-premise site #2, and the application b, the FL2, and the FLc are arranged in the cloud site.

(3) Calculation of Required Amount of Resources

Next, the allocation control unit 121 calculates index values including the required app processing speed from key performance indicators (KPIs) such as the processing time of each app and the data size. Then, the allocation control unit 121 applies these index values for each app into the various resource models created in the learning phase and thereby infers the required amounts of resources for computation, storage, and network for each app, such as the number of CPU cores and the required storage IO performance.

(4) Estimation of Execution Time of App and File Access

Next, the allocation control unit 121 calculates the execution time (a start time-of-day and an end time-of-day) of each app and the execution time (a start time-of-day and an end time-of-day) of file access in each workflow in each data arrangement pattern from the inferred required amount of resources of each app, the resource consumption rate of each app, and the number of times of execution and the order of execution.

(5) Calculation of Workflow Execution Time

Then, the allocation control unit 121 estimates the execution time in the case of concurrently executing all the workflows WF1 to WF3 based on the estimated execution time (the start time-of-day and the end time-of-day) of each app and execution time of file access in each workflow. For example, in FIG. 21, the allocation control unit 121 estimates the execution time of all the workflows to be four hours in pattern A and to be five hours in pattern B.

For example, when pattern A and pattern B are compared, in pattern B, the files that the application a arranged in the on-premise site #2 accesses are all present in the on-premise site #1 that is another base. In Pattern B, therefore, compared with pattern A, the amount of cache data transferred is larger, and achieving the same app processing speed (60 MB/s)

requires higher IO performance (while the data storage target performance in pattern A is 100 MB/s, it is 150 MB/s in pattern B). Thus, it can be seen that if the IO performance is the same, in pattern A, execution of the three workflows, the WF1, the WF2, and the WF3, is completed in four hours, whereas in pattern B, it takes five hours to complete the execution of all the workflows.

(6) Determination of Data Arrangement Pattern

Finally, for those execution times that exceed the user-specified execution time limit among the estimated execution times of all the workflows in the respective data arrangement patterns, the allocation control unit 121 adjusts the start and end times-of-day of execution of each workflow, each app in each workflow, and data access of each app such that the resource utilization rate does not exceed 100%. Then, the allocation control unit 121 selects, from among data arrangement patterns in which the resource utilization rate does not exceed 100% after the adjustment, a data arrangement pattern that leads to the lowest average of the utilization rates of all resources in all bases. Here, in association with the selection of the data arrangement pattern, the execution time of all the workflows as well as the start and end times-of-day of execution of each app and data access of each app are also determined.

(Processing in Inference Phase)

Figure 22:
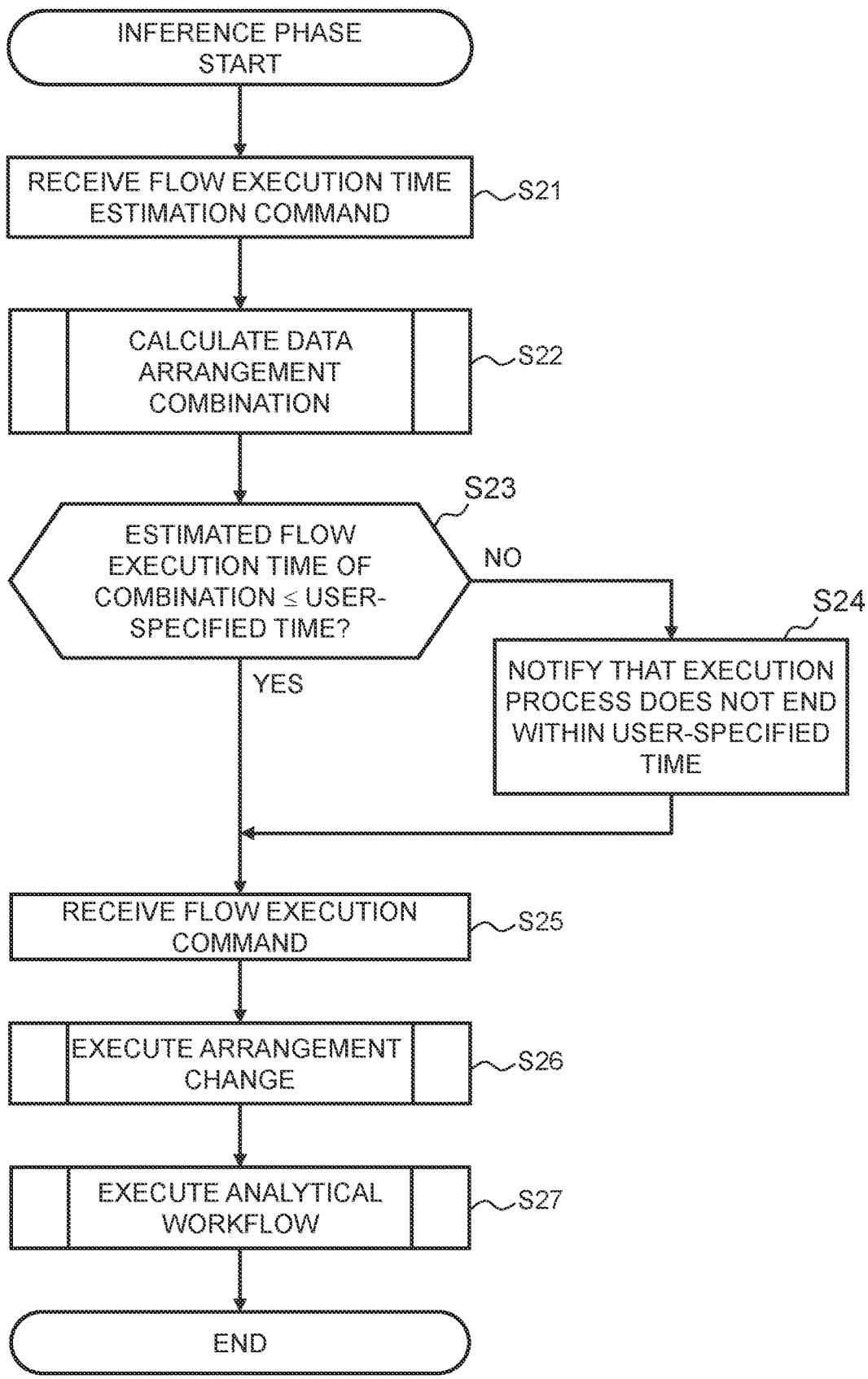
FIG. 22 is a flowchart showing an example of processing in the inference phase.

In the following, the processing flow of the inference phase will be described. FIG. 22 is a flowchart showing an example of the processing in the inference phase. S22 of the inference phase shown in FIG. 22 corresponds to S2: calculation of data arrangement combination and S3: calculation of app processing/data access execution time (FIG. 13). S26 of the inference phase corresponds to S4: execution of data rearrangement (FIG. 13). S27 of the inference phase corresponds to S5: execution of analytical workflow (FIG. 13).

First in S21, the allocation control unit 121 receives a flow execution time estimation command from the user. Next, in S22, the data arrangement combination calculation unit 1212 (FIG. 3) of the allocation control unit 121 calculates all patterns of data arrangement combinations, and the app processing/data access execution time calculation unit 1213 (FIG. 3) estimates the execution time of the analytical workflow in each pattern of the data arrangement combination.

In the calculation of the data arrangement combination, an arrangement of apps and an arrangement of master files are determined. Here, when transfer of caches between sites occurs frequently, this causes a problem that the performance of data access from the app degrades. Therefore, the position where the master file is arranged is adjusted such that the processing ends within a specified time. An example of the detailed processing of the calculation of data arrangement combinations will be described later with reference to FIG. 23.

Next, in S23, the allocation control unit 121 determines whether the estimated flow execution time in the combination of data arrangement selected in S22 is equal to or shorter than the user-specified time. When the estimated flow execution time in the combination of data arrangement selected in S22 is equal to or shorter than the user-specified time (S23: YES), the allocation control unit 121 proceeds with the processing to step S25, and when the estimated flow execution time exceeds the user-specified time (S23: NO), the allocation control unit 121 proceeds with the processing to step S24.

In S24, the allocation control unit 121 notifies to the user through an output apparatus (not shown) that the execution process does not end within the specified time. In S25, the allocation control unit 121 receives a flow execution command from the user.

In S26, the arrangement change execution unit 1214 executes an arrangement change. An example of the detailed processing of execution of an arrangement change will be described later with reference to FIG. 63. Next, in S27, the analytical workflow execution unit 1215 executes an analytical workflow. An example of the detailed processing of execution of an analytical workflow will be described later with reference to FIG. 64.

(Detailed Processing of S22: Calculation of Data Arrangement Combination (FIG. 22))

Figure 23:
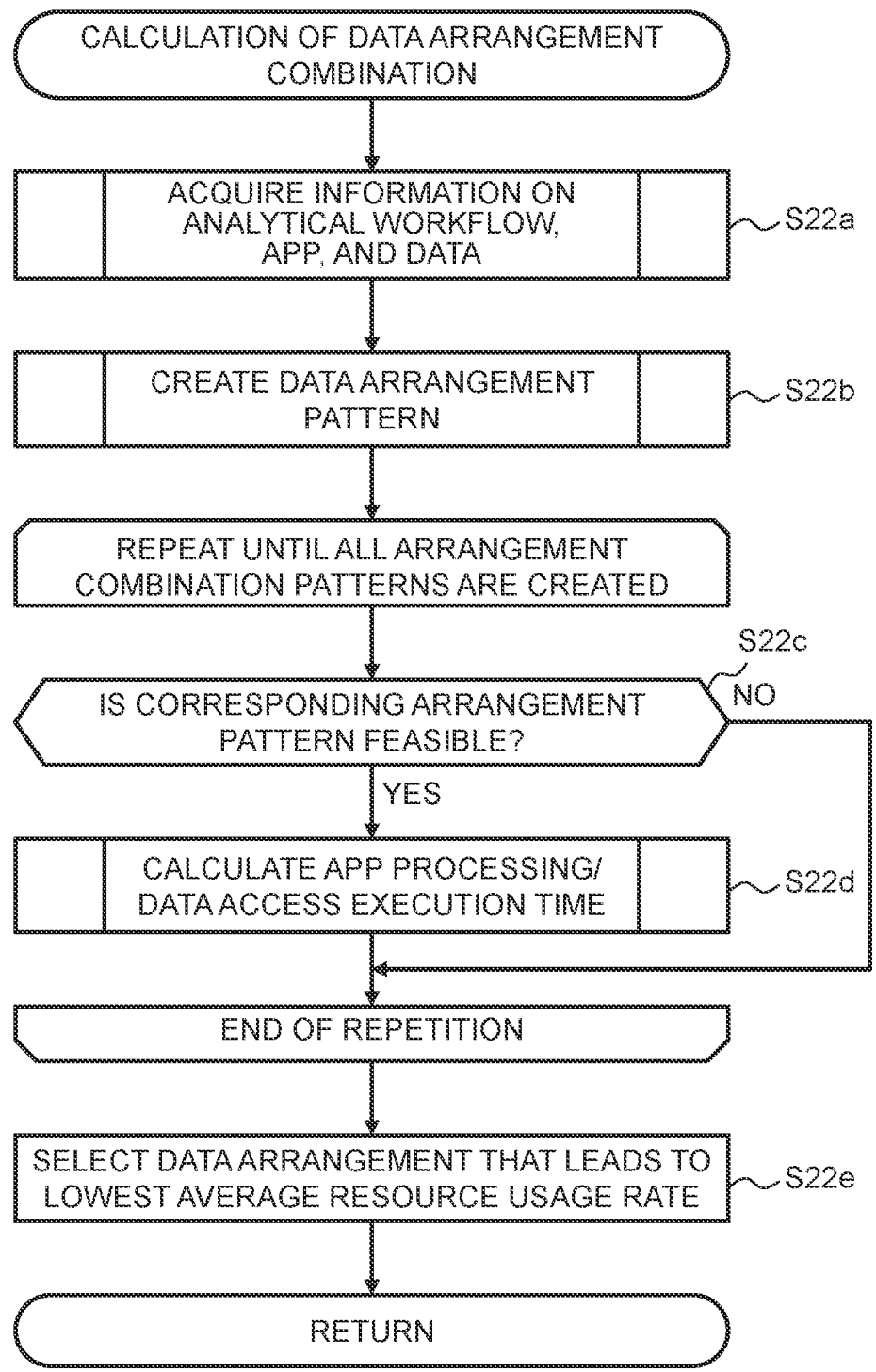
FIG. 23 is a flowchart showing an example of detailed processing of a calculation of a data arrangement combination.

FIG. 23 is a flowchart showing an example of the detailed processing of S22: calculation of data arrangement combination.

First, in S22a, the data arrangement combination calculation unit 1212 (FIG. 3) executes acquisition of information on analytical workflow/app/data. In the acquisition of information on analytical workflow/app/data, the allocation control unit 121 acquires a location where an app in each workflow is planned to be executed and a location of arrangement of data. The detailed processing of S22a will be described later with reference to FIG. 24.

Next, in S22b, the data arrangement combination calculation unit 1212 executes creation of data arrangement patterns. In the creation of data arrangement patterns, the allocation control unit 121 creates all combinations of locations of arrangement of data. The detailed processing of S22b will be described later with reference to FIG. 25.

Next, the data arrangement combination calculation unit 1212 executes the loop process of S22c to S22d for all the data arrangement patterns created in S22b. In S22c, the allocation control unit 121 determines whether the data arrangement pattern currently undergoing the loop process is feasible. When the data arrangement pattern currently undergoing the loop process is "feasible (Yes)," the data arrangement combination calculation unit 1212 proceeds with the processing to S22d, and when the pattern is "infeasible (No)," the data arrangement combination calculation unit 1212 continues the loop process for the next data arrangement pattern or, when the loop process for all the data arrangement patterns has ended, proceeds with the processing to S22e.

In S22d, the app processing/data access execution time calculation unit 1213 (FIG. 3) executes a calculation of app processing/data access execution time. In S22d, the app processing/data access execution time calculation unit 1213 simulates the execution time of the workflow in the data arrangement pattern that has been determined as "feasible (Yes)" in S22c. The detailed processing of S22d will be described later with reference to FIG. 27.

When the loop process of S22c to S22d for all the data arrangement patterns ends, in S22e, after calculating the execution times in all the data arrangement combinations, the data arrangement combination calculation unit 1212 selects a pattern of data arrangement that leads to the lowest usage rate among averages of resource usage rates (average resource usage rates) in all the patterns of data arrangement derived from pieces of information stored in the calculation-purpose WF variable management table 1222 (FIGS. 10A and 10B), the calculation-purpose rearrangement variable management table 1223 (FIG. 11), and the calculation-purpose infrastructure information management table 1224 (FIG. 12).

(Detailed Processing of S22a: Acquisition of Information on Analytical Workflow/App/Data (FIG. 23))

Figure 24:
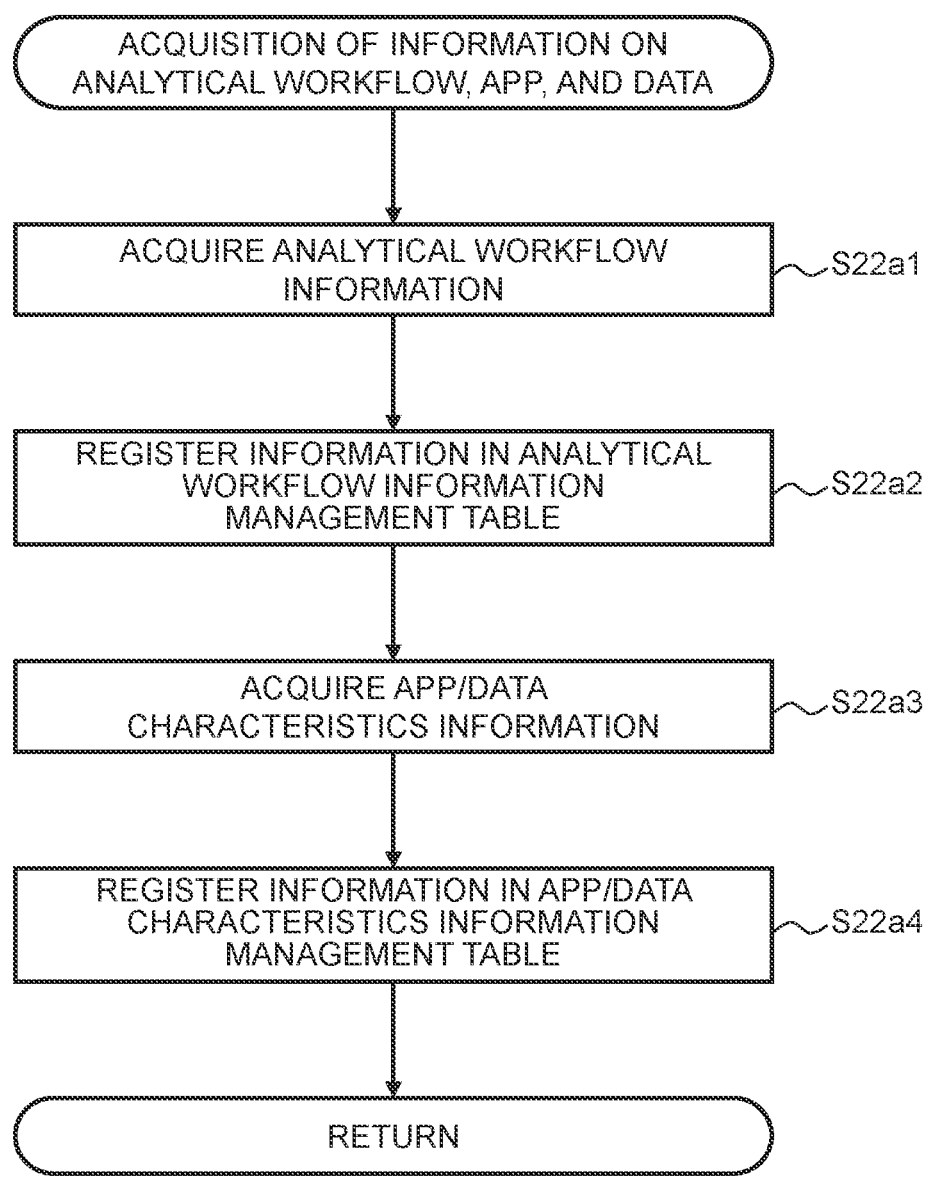
FIG. 24 is a flowchart showing an example of detailed processing of acquisition of information on analytical workflow/app/data.

FIG. 24 is a flowchart showing an example of the detailed processing of S22a: acquisition of information on analytical workflow/app/data.

First, in S22a1, the data arrangement combination calculation unit 1212 (FIG. 3) acquires information on an analytical workflow including apps in the analytical workflow and the order of execution, the number of times of execution, etc. of file access by the apps from the workflow editor (flow-based programing function unit 122) Next, in S22a2, the data arrangement combination calculation unit 1212 registers the data acquired in S22a1 in the analytical workflow information management table 1216 (FIG. 4).

Next, in S22a3, the data arrangement combination calculation unit 1212 acquires app/data characteristics information required for inference from various sources other than the workflow editor (see FIG. 5). In S22a3, in the app/data characteristics information management table 1217 (FIG. 5), the values corresponding to "category" and "item" for which "acquired for" is "inference" are acquired from "source" of each base. Next, in S22a4, the data arrangement combination calculation unit 1212 registers the data acquired in S22a3 in the app/data characteristics information management table 1217 (FIG. 5). Further, the data arrangement combination calculation unit 1212 registers the execution start time-of-day of the workflow as 0:00 (deployment execution time-of-day) and the end time-of-day thereof as the start time-of-day+the execution time limit in the calculation-purpose WF variable management table 1222 (FIGS. 10A and 10B).

(Detailed Processing of S22b: Creation of Data Arrangement Pattern (FIG. 23))

Figure 25:
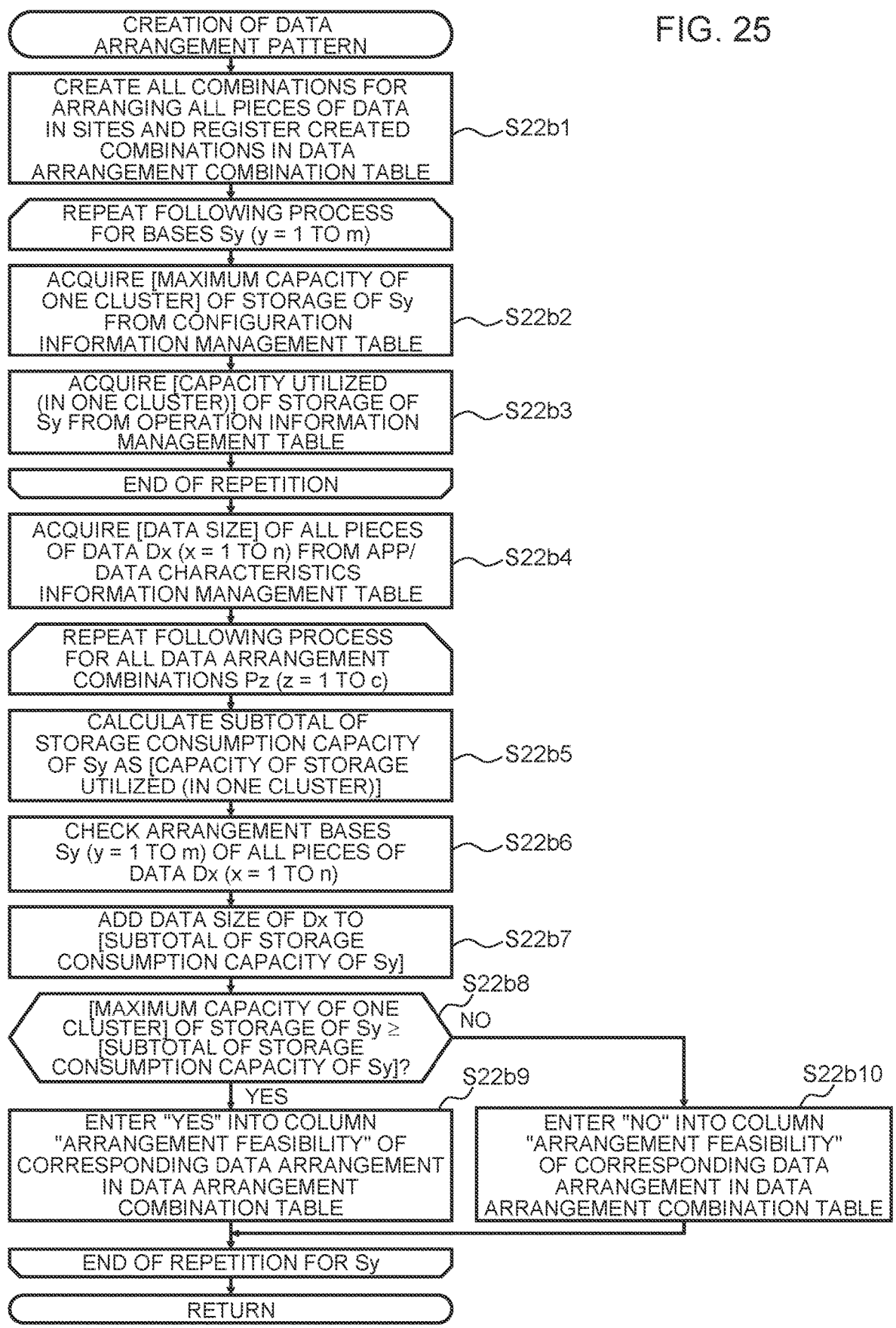
FIG. 25 is a flowchart showing an example of detailed processing of creation of data arrangement patterns.

FIG. 25 is a flowchart showing an example of the detailed processing of S22b: creation of data arrangement pattern. In S22b, all arrangement combinations (arrangement patterns) of file data to be arranged in the bases are created. Those of the arrangement combinations in which the data capacity exceeds the storage capacity of the base are regarded as infeasible combinations.

First, in S22b1, the data arrangement combination calculation unit 1212 creates all combinations (data arrangement patterns Pz (z=1 to c)) in which all pieces of data Dx (x=1 to n) are each arranged in one of all bases Sy (y=1 to m), and registers the created combinations in the data arrangement combination table 1221 (FIG. 9).

Next, the data arrangement combination calculation unit 1212 repeatedly executes the loop process of S22b2 to S22b3 for all the bases Sy (y=1 to m). In S22b2, the data arrangement combination calculation unit 1212 acquires the value of "maximum capacity of one cluster" of the storage of the base Sy from the configuration information management table 1219 (FIG. 7). Next, in S22b3, the data arrangement combination calculation unit 1212 acquires the value of "capacity utilized (in one cluster)" of the storage of the base Sy from the operation information management table 1220 (FIG. 8).

When the loop process of S22b2 to S22b3 ends, in S22b4, the data arrangement combination calculation unit 1212 acquires the values of "data size" of all the pieces of data Dx (x=1 to n) from the app/data characteristics information management table 1217. Next, in S22b5, the data arrangement combination calculation unit 1212 repeatedly executes the loop process of S22b5 to S22b10 for all the data arrangement patterns Pz (z=1 to c).

In S22b5, the data arrangement combination calculation unit 1212 calculates: subtotal of storage consumption capacity of base Sy=capacity of storage utilized (in one cluster) of base Sy. Next, in S22b6, the data arrangement combination calculation unit 1212 checks the arrangement bases of all the pieces of data Dx in the data arrangement pattern Pz being processed. Next, in S22b7, the data arrangement combination calculation unit 1212 adds the data size of the data Dx of which the arrangement has been checked in S22b6 to the subtotal of the storage consumption capacity of each base Sy.

Next, in S22b8, the data arrangement combination calculation unit 1212 determines whether [maximum capacity of one cluster] of storage of base Sy≥[subtotal of storage consumption capacity of base Sy]. When [maximum capacity of one cluster] of storage of base Sy≥[subtotal of storage consumption capacity of base Sy] (i.e., the data capacity is equal to or smaller than the storage capacity of the base), the data arrangement combination calculation unit 1212 proceeds with the processing to S22b9, and when [maximum capacity of one cluster] of storage of base Sy<[subtotal of storage consumption capacity of base Sy], the data arrangement combination calculation unit 1212 proceeds with the processing to S22b10.

In S22b9, the data arrangement combination calculation unit 1212 enters "Yes (feasible)" into the column [arrangement feasibility] of the corresponding data arrangement in the data arrangement combination table 1221 (FIG. 9). On the other hand, in S22b10, the data arrangement combination calculation unit 1212 enters "No (infeasible)" into the column [arrangement feasibility] of the corresponding data arrangement in the data arrangement combination table 1221.

(Overview of Processing of Calculation of App Processing/Data Access Execution Time)

Figure 26:
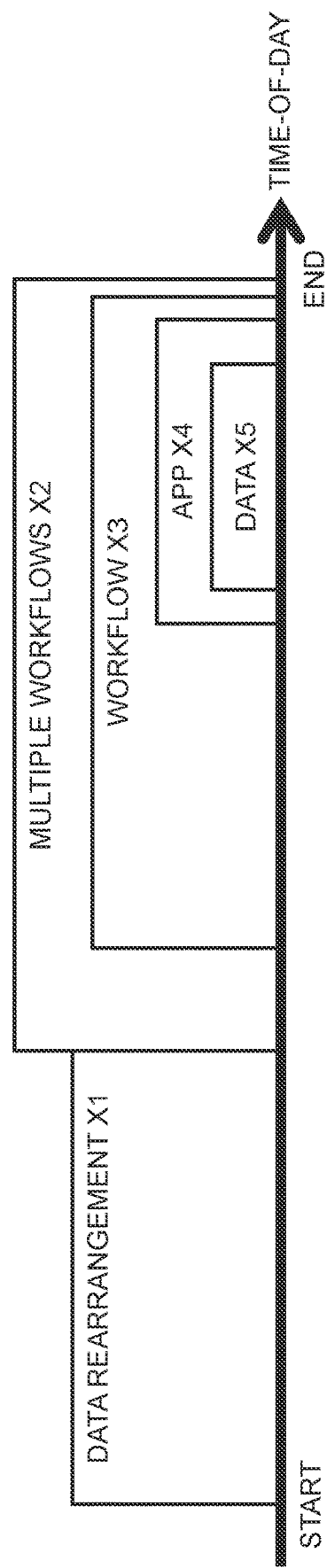
FIG. 26 is a chart for describing an overview of processing of a calculation of app processing/data access execution time.

Before describing the detailed processing of S22d: calculation of app processing/data access execution time (FIG. 23), an overview of the processing will be described. FIG. 26 is a chart for describing an overview of the processing of S22d: calculation of app processing/data access execution time.

As shown in FIG. 26, since there are elements in multiple tiers for which allocation of the execution time of the analytical workflow is adjusted, the execution time is adjusted by the following procedure (step 1) to (step 4). In the analytical workflow, first, rearrangement of data to the bases is executed and then apps in the analytical workflow and file access are executed. The elements in adjustment of time allocation will be referred to as a data rearrangement X1, multiple workflows X2, a workflow X3 in the multiple workflows X2, an app X4 in the workflow X3, and data X5 accessed by the app X4.

(Step 1) Determination of Initial Values

The execution time of the data rearrangement X1 is set to the shortest time calculated from the amount of resources and the amount of transfer in the environment where the analytical workflow is executed. The execution time of the workflow X3 is set to the execution time limit of the workflow X3 as specified by the user. The execution time of the multiple workflows X2 is set to the execution time of the longest workflow X3. The execution times of the app X4 and the data X5 are set to times obtained by equally dividing the execution time of the workflow X3 between the app X4 and the data X5.

(Step 2) Adjustment of Allocation Among Multiple Apps

The execution times of the app X4 and the data X5 are adjusted such that the resource usage rates do not exceed 100% within the execution time of one workflow X3. If one of the resource usage rates exceeds 100% even once during the execution time of one workflow (during the execution times of all apps and data access), the workflow does not end within the specified execution time limit. Therefore, a target execution time of an app that exceeds 100% is extended and instead a target execution time of an app of which the resource usage rate is lowest is shortened, and the resource usage amount is calculated again. This will be described in detail later with reference to FIG. 40.

(Step 3) Adjustment of Allocation Among Multiple Workflows

The allocation of time for the data rearrangement and the multiple workflows is fixed. To reduce the number of concurrent execution of workflows X3, the execution start time-of-day of one of the workflows X3 is postponed (the execution time is shortened). Following the change in the execution time of the workflow X3, the execution times of the app X4 and the data X5 are adjusted such that the resource usage rates do not exceed 100%.

(Step 4) Adjustment of Allocation for Data Rearrangement and Workflow

The execution end time-of-day of the data rearrangement X1 is postponed (the execution time is extended) to reduce the resource usage rates. Following the change in the execution time of the data rearrangement X1, the execution start time-of-day of the multiple workflows X2 is postponed (the execution time is shortened). Following the change in the execution time of the multiple workflows X2, the execution start time-of-day of the workflow X3 is postponed (the execution time is shortened). Following the change in the execution time of the workflow X3, the app X4 and the data X5 are adjusted such that the resource usage rates do not exceed 100%.

(Detailed Processing of S22d: Calculation of App Processing/Data Access Execution Time (FIG. 23))

Figure 27:
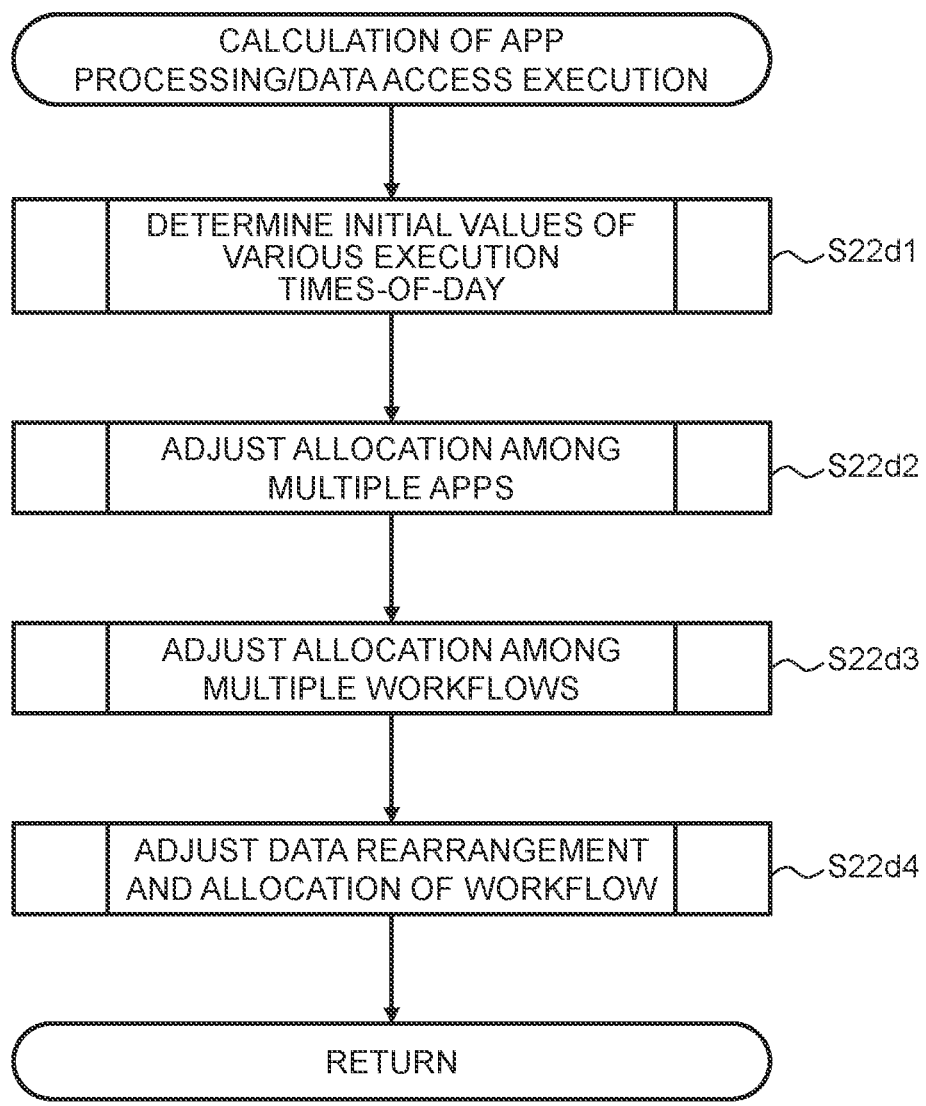
FIG. 27 is a flowchart showing an example of detailed processing of the calculation of app processing/data access execution time.

FIG. 27 is a flowchart showing an example of the detailed processing of S22d: calculation of app processing/data access execution time.

First, in S22d1, the app processing/data access execution time calculation unit 1213 (FIG. 3) determines initial values of various execution times-of-day. The detailed processing of S22d1 will be described later with reference to FIG. 28. Next, in S22d2, the app processing/data access execution time calculation unit 1213 adjusts allocation among multiple apps. The detailed processing of S22d2 will be described later with reference to FIG. 40.

Next, in S22d3, the app processing/data access execution time calculation unit 1213 adjusts allocation among multiple workflows. The detailed processing of S22d3 will be described later with reference to FIG. 54. Next, in S22d4, the app processing/data access execution time calculation unit 1213 adjusts data rearrangement/allocation of workflow. The detailed processing of S22d4 will be described later with reference to FIG. 59.

(Detailed Processing of S22d1: Determination of Initial Values of Various Execution Times-of-Day (FIG. 27))

Figure 28:
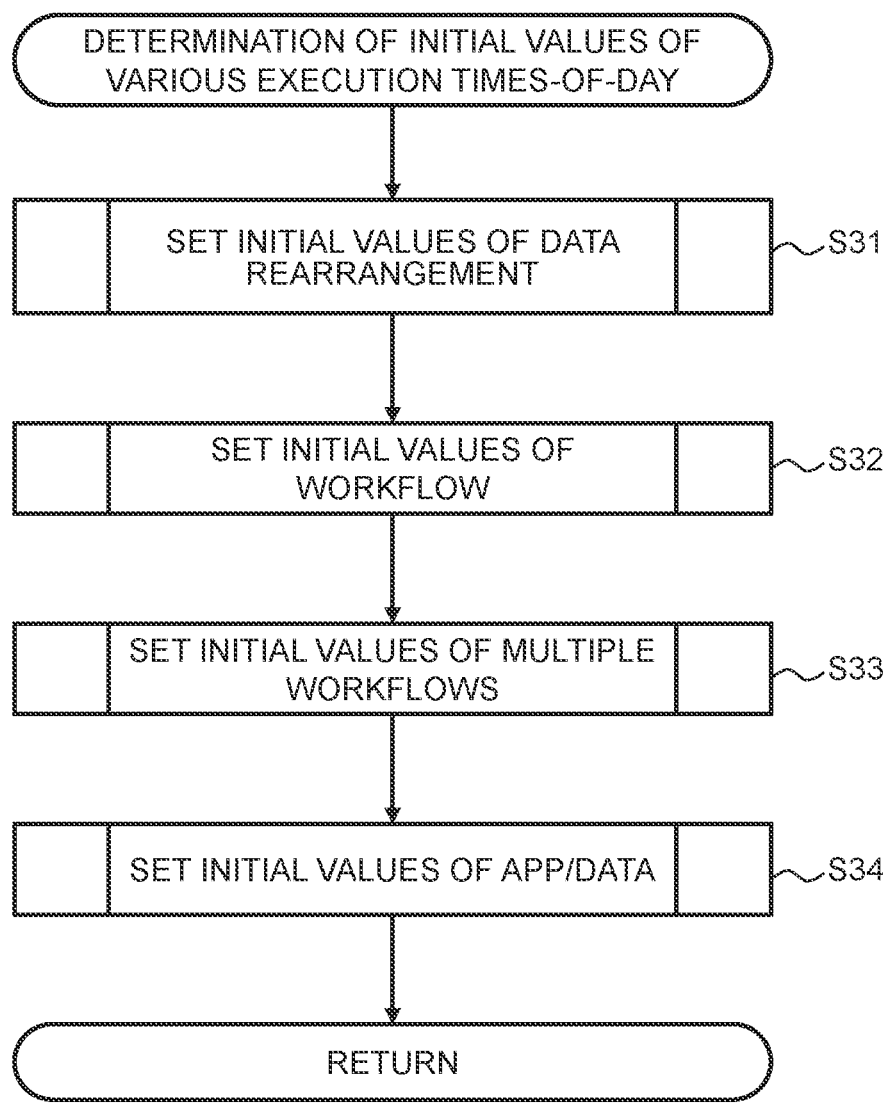
FIG. 28 is a flowchart showing an example of detailed processing of determination of initial values of various execution times-of-day.

FIG. 28 is a flowchart showing an example of the detailed processing of S22d1: determination of initial values of various execution times-of-day.

First, in S31, the app processing/data access execution time calculation unit 1213 (FIG. 3) sets initial values of data rearrangement. The detailed processing of S31 will be described later with reference to FIG. 30. Next, in S32, the app processing/data access execution time calculation unit 1213 sets initial values of a workflow. The detailed processing of S32 will be described later with reference to FIG. 40. Next, in S33, the app processing/data access execution time calculation unit 1213 sets initial values of multiple workflows. The detailed processing of S33 will be described later with reference to FIG. 34. Next, in S34, the app processing/ data access execution time calculation unit 1213 sets initial values of app/data. The detailed processing of S34 will be described later with reference to FIG. 36.

(Overview of Processing of S31: Setting of Initial Values of Data Rearrangement (FIG. 28))

Figure 29:
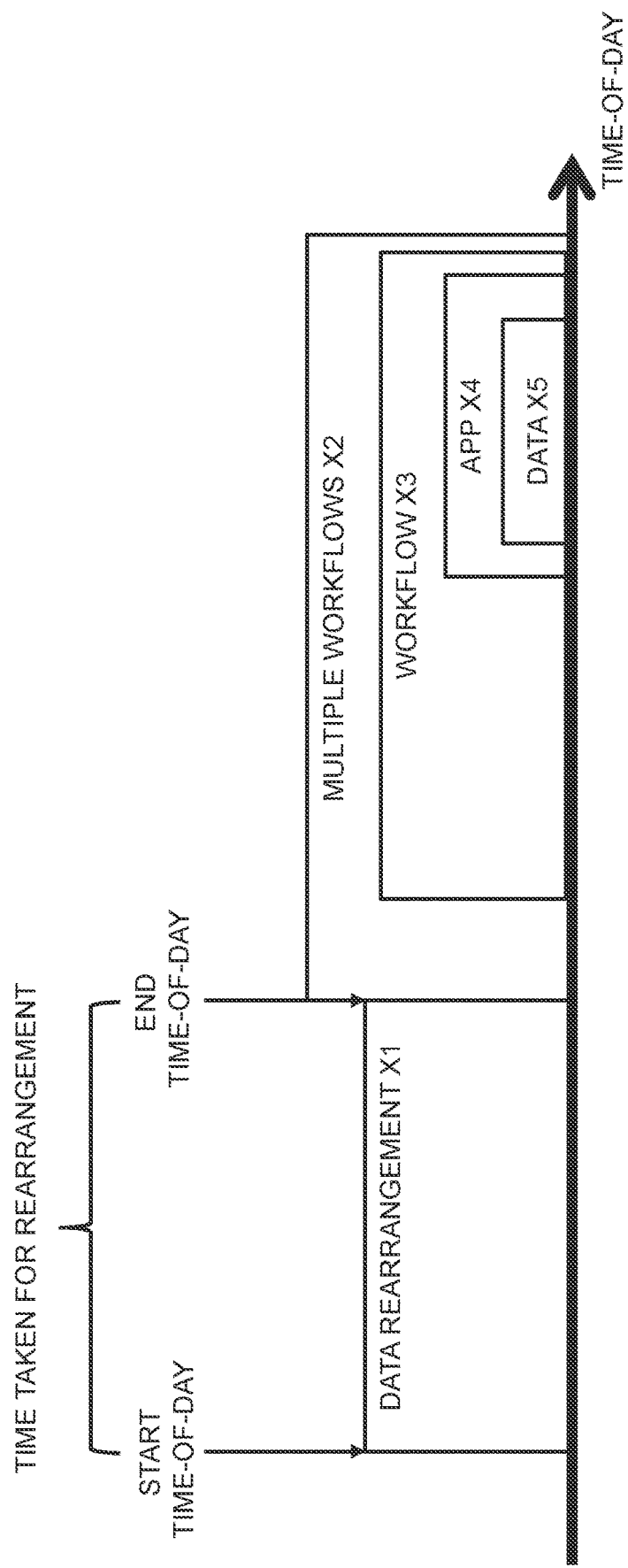
FIG. 29 is a chart for describing an overview of processing of setting of initial values of data rearrangement.

Before describing the detailed processing of S31: setting of initial values of data rearrangement, an overview of the processing will be described. FIG. 29 is a chart for describing an overview of the processing of S31: setting of initial values of data rearrangement.

When a base where data for which the execution time is to be calculated is actually arranged at the current time differs from a pattern of data arrangement combination used in considering an optimal arrangement, the data needs to be rearranged, and an execution time of the data rearrangement X1 involving transferring the data between bases is required. As shown in FIG. 29, the execution time of the data rearrangement X1 is from the start time-of-day to the end time-of-day of data transfer for data rearrangement. As already described, the execution time of the data rearrangement X1 is the shortest time calculated from the amount of resources and the amount of transfer in the environment where the analytical workflow is executed.

(Detailed Processing of S31: Setting of Initial Values of Data Rearrangement (FIG. 28))

Figure 30:
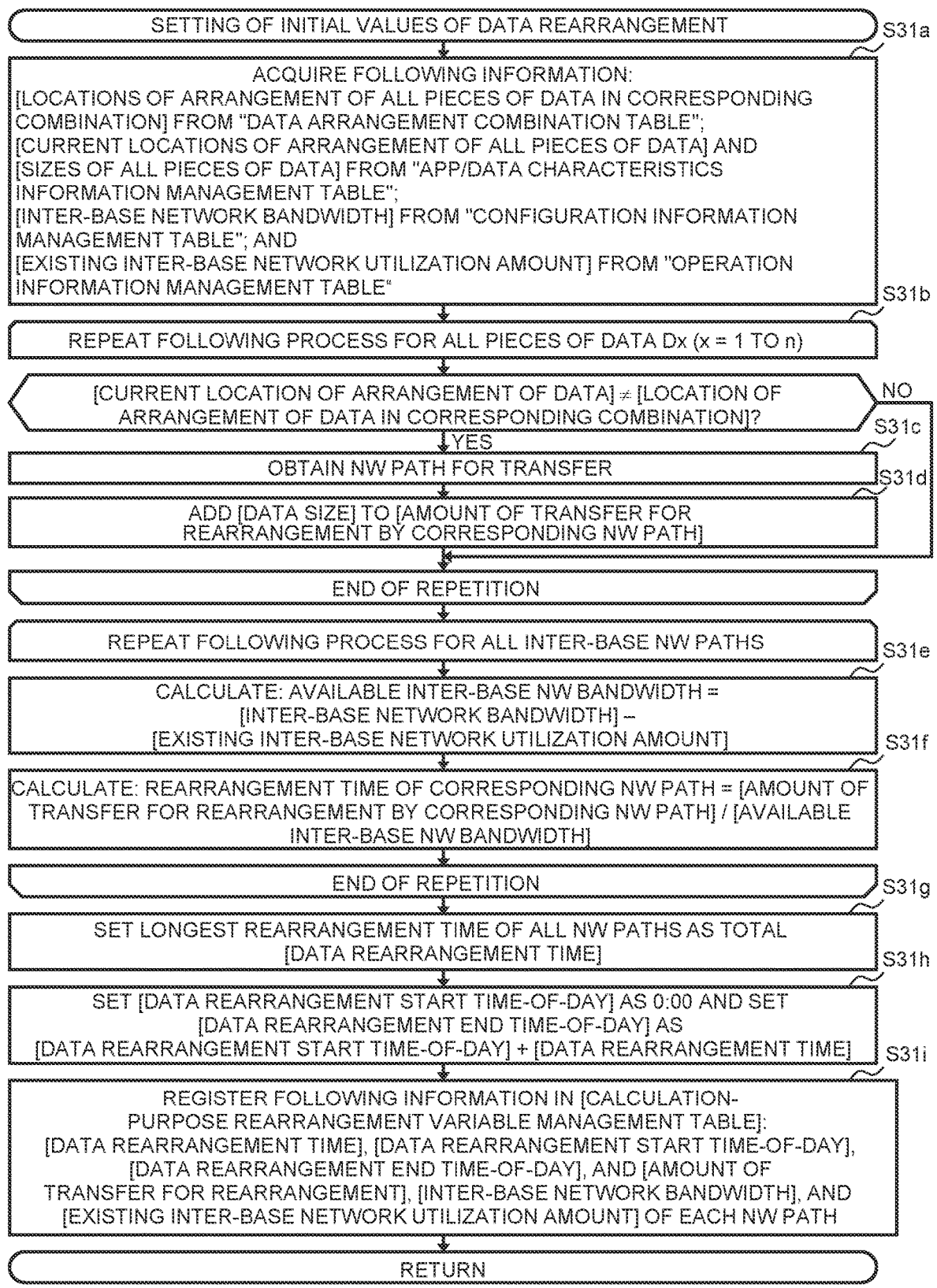
FIG. 30 is a flowchart showing an example of detailed processing of the setting of initial values of data rearrangement.

FIG. 30 is a flowchart showing an example of the detailed processing of S31: setting of initial values of data rearrangement.

First, in S31a, the app processing/data access execution time calculation unit 1213 acquires the following information. The app processing/data access execution time calculation unit 1213 acquires locations of arrangement of all the pieces of data in the corresponding combination from the data arrangement combination table 1221 (FIG. 9), [current locations of arrangement of all pieces of data] and [sizes of all pieces of data] from the app/data characteristics information management table 1217 (FIG. 5), [inter-base network bandwidth] from the configuration information management table 1219 (FIG. 7), and [existing inter-base network utilization amount] from the operation information management table 1220.

Next, the app processing/data access execution time calculation unit 1213 executes the loop process of S31b to S31d for all the pieces of data Dx (x=1 to n). In the loop process of S31b to S31d, the amount of data transferred in the case of rearranging all the pieces of data from [current locations of arrangement of data] to [locations of arrangement of data in corresponding combination] of the data arrangement combination table 1221 (FIG. 9) is calculated.

In S31b, the app processing/data access execution time calculation unit 1213 determines whether [current location of arrangement of data] # [location of arrangement of data in corresponding combination]. When [current location of arrangement of data] # [location of arrangement of data in corresponding combination] (S31b: YES), the app processing/data access execution time calculation unit 1213 proceeds with the processing to S31c. On the other hand, when [current location of arrangement of data]=[location of arrangement of data in corresponding combination] (S31b: NO) the app processing/data access execution time calculation unit 1213 skips S31c and S31d and performs the loop process on the next piece of data Dx or, when the loop process for all the pieces of data Dx has ended, ends the loop process.

In S31c, the app processing/data access execution time calculation unit 1213 obtains an NW path for transferring all the pieces of data from [current locations of arrangement of data] to [locations of arrangement of data in corresponding combination]. Next, in S31*d*, the app processing/data access execution time calculation unit 1213 adds the [data size] of the data to be transferred to [amount of transfer for rearrangement by corresponding NW path] obtained in S31*c*.

When the loop process of S31*b* to S31*d* ends, the app processing/data access execution time calculation unit 1213 executes the loop process of S31*e* to S31*f* for NW paths between all the bases. In the loop process of S31*e* to S31*f*, the transfer time (rearrangement time) in the case of rearranging all the pieces of data from [current locations of arrangement of data] to [locations of arrangement of data in corresponding combination] of the data arrangement combination table 1221 (FIG. 9) is calculated.

In S31*e*, the app processing/data access execution time calculation unit 1213 calculates: available inter-base NW bandwidth=[inter-base network bandwidth]−[existing inter-base network utilization amount]. In S31*e*, a currently available bandwidth of the inter-base network bandwidth is calculated.

Next, in S31*f*, the app processing/data access execution time calculation unit 1213 calculates: rearrangement time of corresponding NW path=[amount of transfer for rearrangement by corresponding NW path]/[available inter-base NW bandwidth]. The [amount of transfer for rearrangement by corresponding NW path] is the one calculated by the loop process of S31*b* to S31*d*. The [available inter-base NW bandwidth] is the one calculated in S31*e*.

When the loop process of S31*e* to S31*f* ends, in S31*g*, the app processing/data access execution time calculation unit 1213 sets the longest rearrangement time of all the NW paths as a total [data rearrangement time]. Next, in S31*h*, the app processing/data access execution time calculation unit 1213 sets: [data rearrangement start time-of-day]=0:00 and [data rearrangement end time-of-day]=[data rearrangement start time-of-day]+[data rearrangement time].

Next, in S31*i*, the app processing/data access execution time calculation unit 1213 registers the following information in the calculation-purpose rearrangement variable management table 1223 (FIG. 11). The app processing/data access execution time calculation unit 1213 registers, in the calculation-purpose rearrangement variable management table 1223, [data rearrangement time] (calculated in S31*g*), [data rearrangement start time-of-day] (set in S31*h*), [data rearrangement end time-of-day] (set in S31*h*), [amount of transfer for rearrangement] of each NW path (calculated by the loop process of S31*b* to S31*d*), [inter-base network bandwidth] (acquired in S31*a*), and [existing inter-base network utilization amount] (acquired in S31*a*).

(Overview of Processing of S32: Setting of Initial Values of Workflow (FIG. 28))

Figure 31:
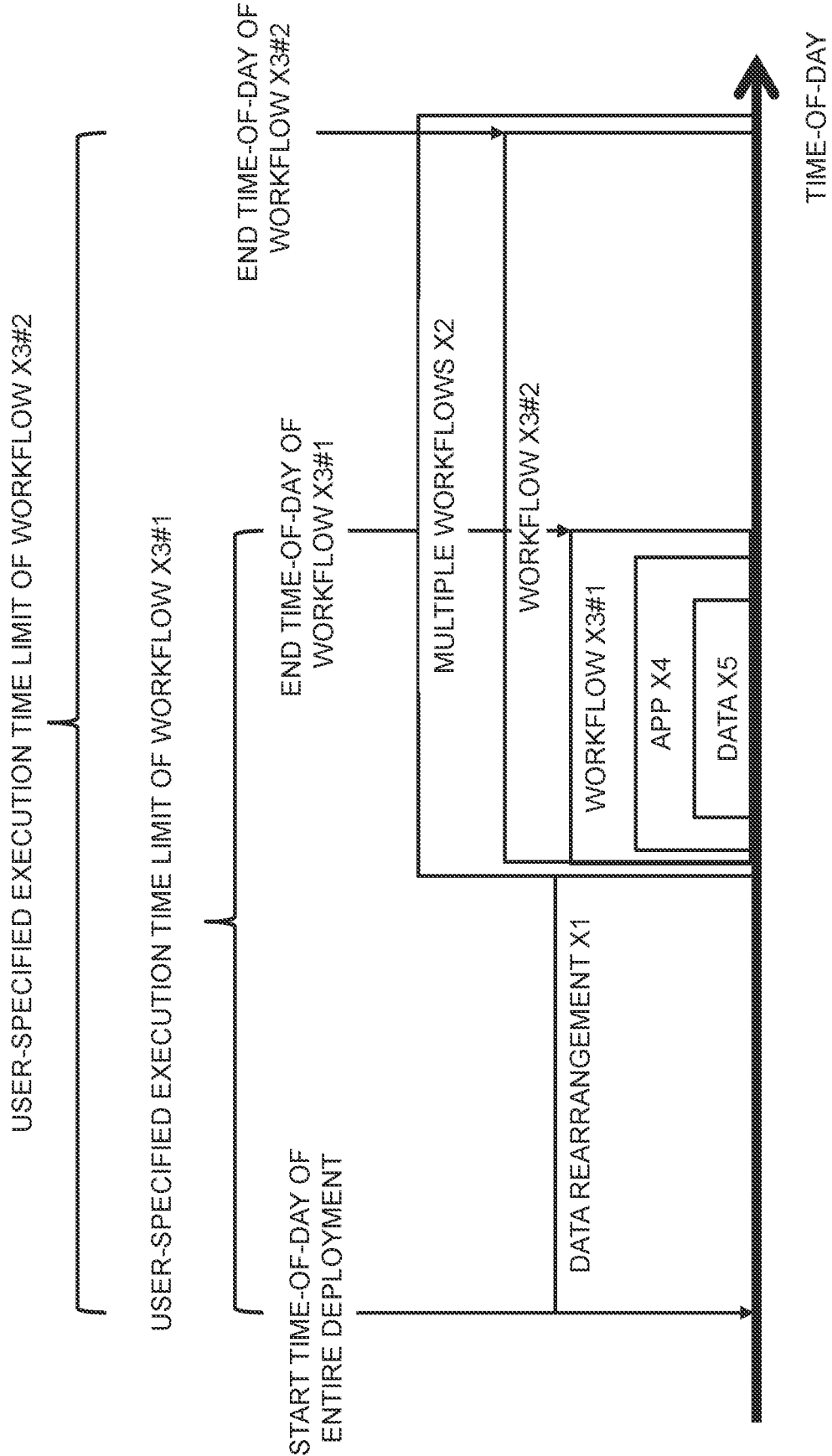
FIG. 31 is a chart for describing an overview of processing of setting of initial values of a workflow.

Before describing the detailed processing of S32: setting of initial values of workflow, an overview of the processing will be described. FIG. 31 is a chart for describing an overview of the processing of S32: setting of initial values of workflow.

Since each of the workflows X3 has a user-specified execution time limit, as shown in FIG. 31, the execution end time-of-day of the workflow X3 from the deployment start time-of-day of the entire analytical workflow to the execution time limit is determined regardless of the execution start time-of-day of the workflow X3.

(Detailed Processing of S32: Setting of Initial Values of Workflow (FIG. 28))

Figure 32:
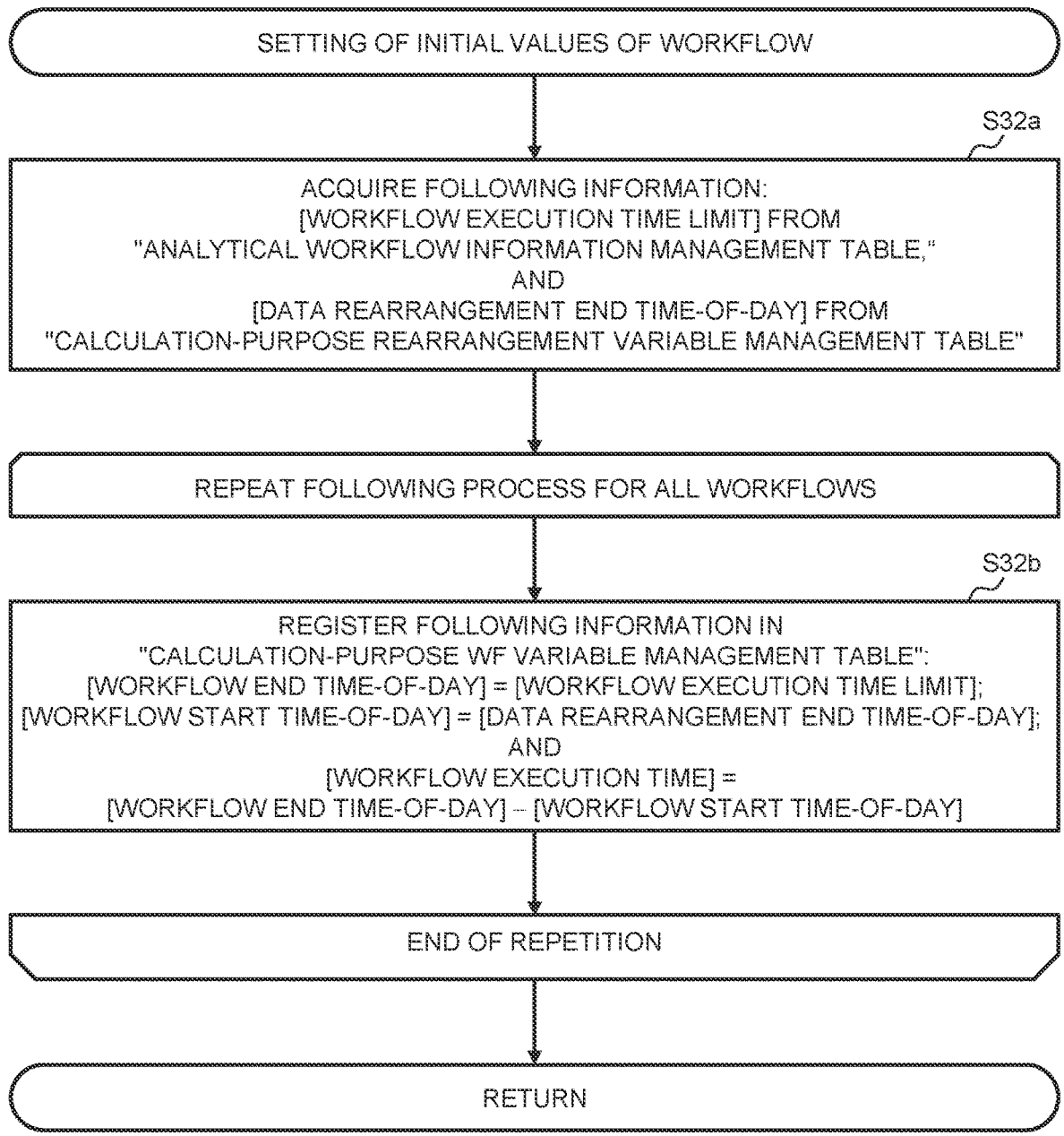
FIG. 32 is a flowchart showing an example of detailed processing of the setting of initial values of a workflow.

FIG. 32 is a flowchart showing an example of detailed processing of S32: setting of initial values of workflow.

First, in S32*a*, the app processing/data access execution time calculation unit 1213 acquires the following information. The app processing/data access execution time calculation unit 1213 acquires [workflow execution time limit] from the analytical workflow information management table 1216 (FIG. 4) and [data rearrangement end time-of-day] from the calculation-purpose rearrangement variable management table 1223 (FIG. 11).

Next, the app processing/data access execution time calculation unit 1213 executes the loop process of S32*b* for all workflows. In S32*b*, the app processing/data access execution time calculation unit 1213 registers the following information in the calculation-purpose WF variable management table 1222 (FIGS. 10A and 10B). The app processing/data access execution time calculation unit 1213 registers, in the calculation-purpose WF variable management table 1222, [workflow end time-of-day]=[workflow execution time limit], [workflow start time-of-day]=[data rearrangement end time-of-day], and [workflow execution time]=[workflow end time-of-day]−[workflow start time-of-day].

(Overview of Processing of S33: Setting of Initial Values of Multiple Workflows (FIG. 28))

Figure 33:
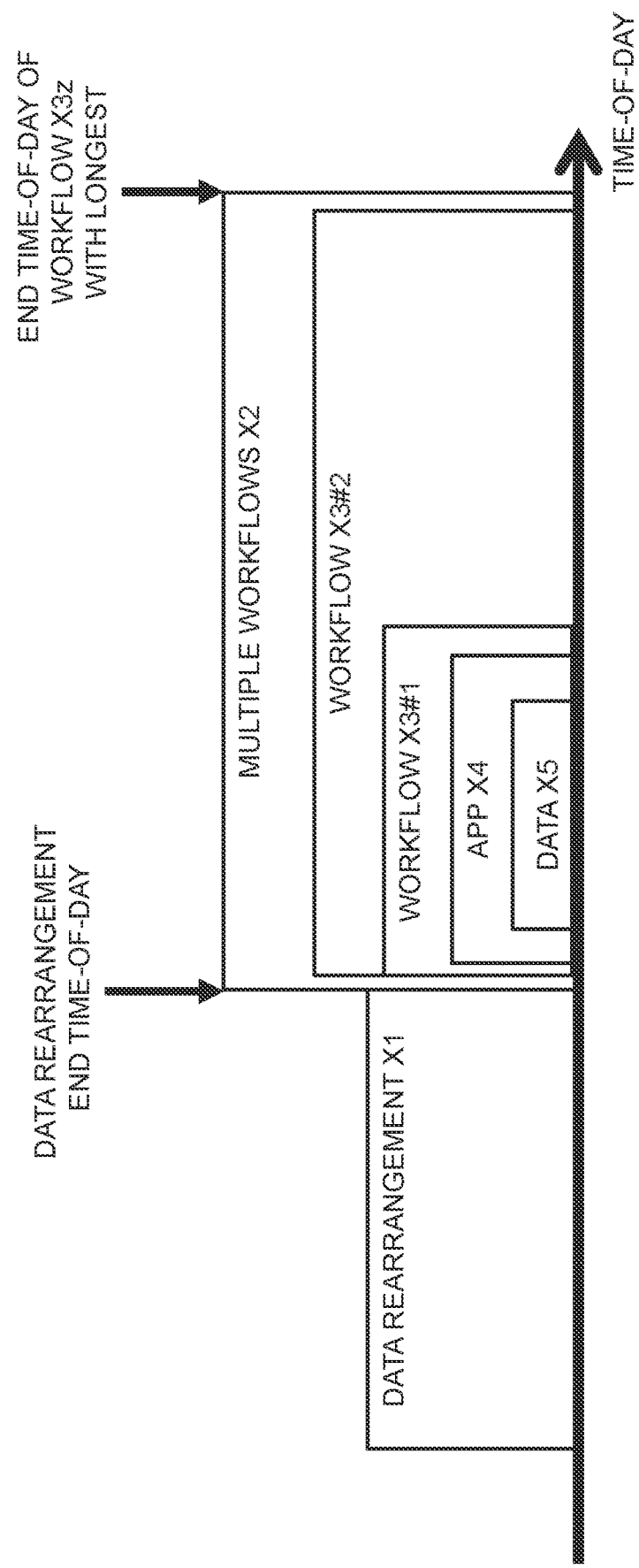
FIG. 33 is a chart for describing an overview of processing of setting of initial values of multiple workflows.

Before describing the detailed processing of S33: setting of initial values of multiple workflows, an overview of the processing will be described. FIG. 33 is a chart for describing an overview of the processing of S33: setting of initial values of multiple workflows.

As shown in FIG. 33, the execution time of the multiple workflows X2 is determined such that the execution end time-of-day of the last workflow X3 having the longest user-specified execution time limit matches the execution end time-of-day of the multiple workflows X2. Specifically, the following are set: execution start time-of-day of multiple workflows X2=execution end time-of-day of data rearrangement X1; execution end time-of-day of multiple workflows X2=execution end time-of-day of last workflow X3; and execution time of multiple workflows X2=execution end time-of-day of multiple workflows X2−execution start time-of-day of multiple workflows X2.

(Detailed Processing of S33: Setting of Initial Values of Multiple Workflows (FIG. 28))

Figure 34:
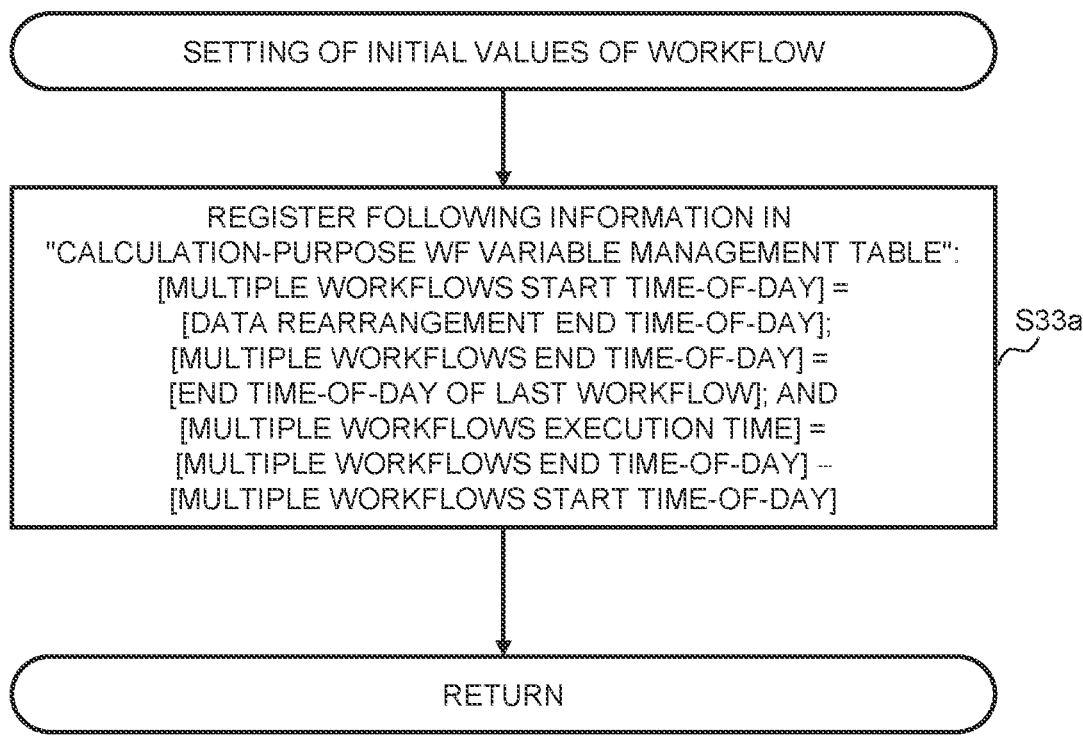
FIG. 34 is a flowchart showing an example of detailed processing of the setting of initial values of multiple workflows.

FIG. 34 is a flowchart showing an example of the detailed processing of S33: setting of initial values of multiple workflows.

In S33*a*, the app processing/data access execution time calculation unit 1213 registers the following information in the calculation-purpose WF variable management table 1222. The app processing/data access execution time calculation unit 1213 registers, in the calculation-purpose WF variable management table 1222, [multiple workflows start time-of-day]=[data rearrangement end time-of-day], [multiple workflows end time-of-day]=[end time-of-day of last workflow], [multiple workflows execution time]=[multiple workflows end time-of-day]−[multiple workflows start time-of-day].

(Overview of Processing of S34: Setting of Initial Values of App/Data (FIG. 28))

Figure 35:
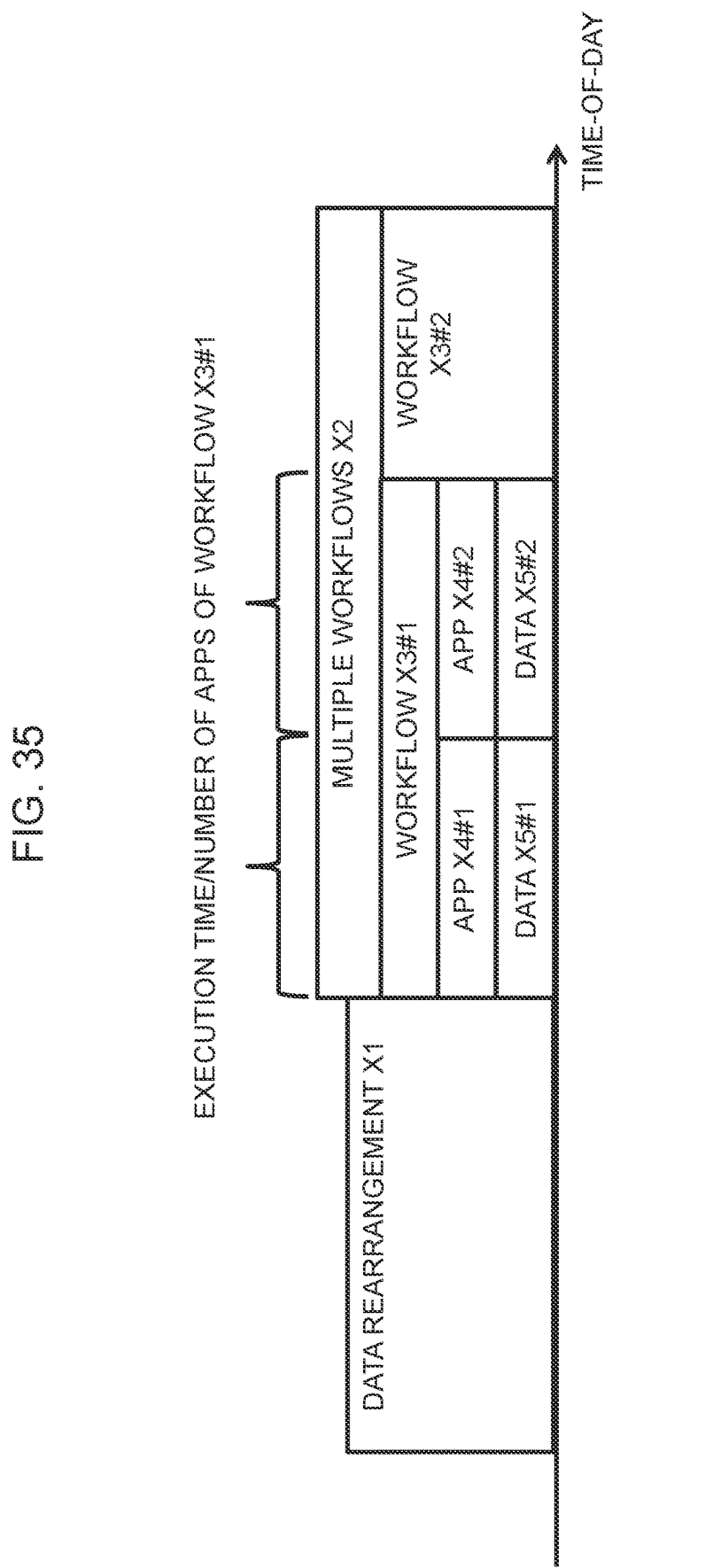
FIG. 35 is a chart for describing an overview of processing of setting of initial values of app/data.

Before describing the detailed processing of S34: setting of initial values of app/data, an overview of the processing will be described. FIG. 35 is a chart for describing an overview of the processing of S34: setting of initial values of app/data.

The execution time of each app X4 is found out from the execution time limit of the multiple workflows X2 (the execution end time-of-day of the multiple workflow X2). In the first time, a result of dividing the execution time of the multiple workflows X2 by the number of apps is used as a target execution time of each app X4. In this case, those apps that can be concurrently executed are allotted the same execution time window. Since it cannot be predicted at which timing an app will access the data, a target access time from the app to the data is set to be the same as the target execution time of the app.

(Detailed Processing of S34: Setting of Initial Values of App/Data (FIG. 28))

Figure 36:
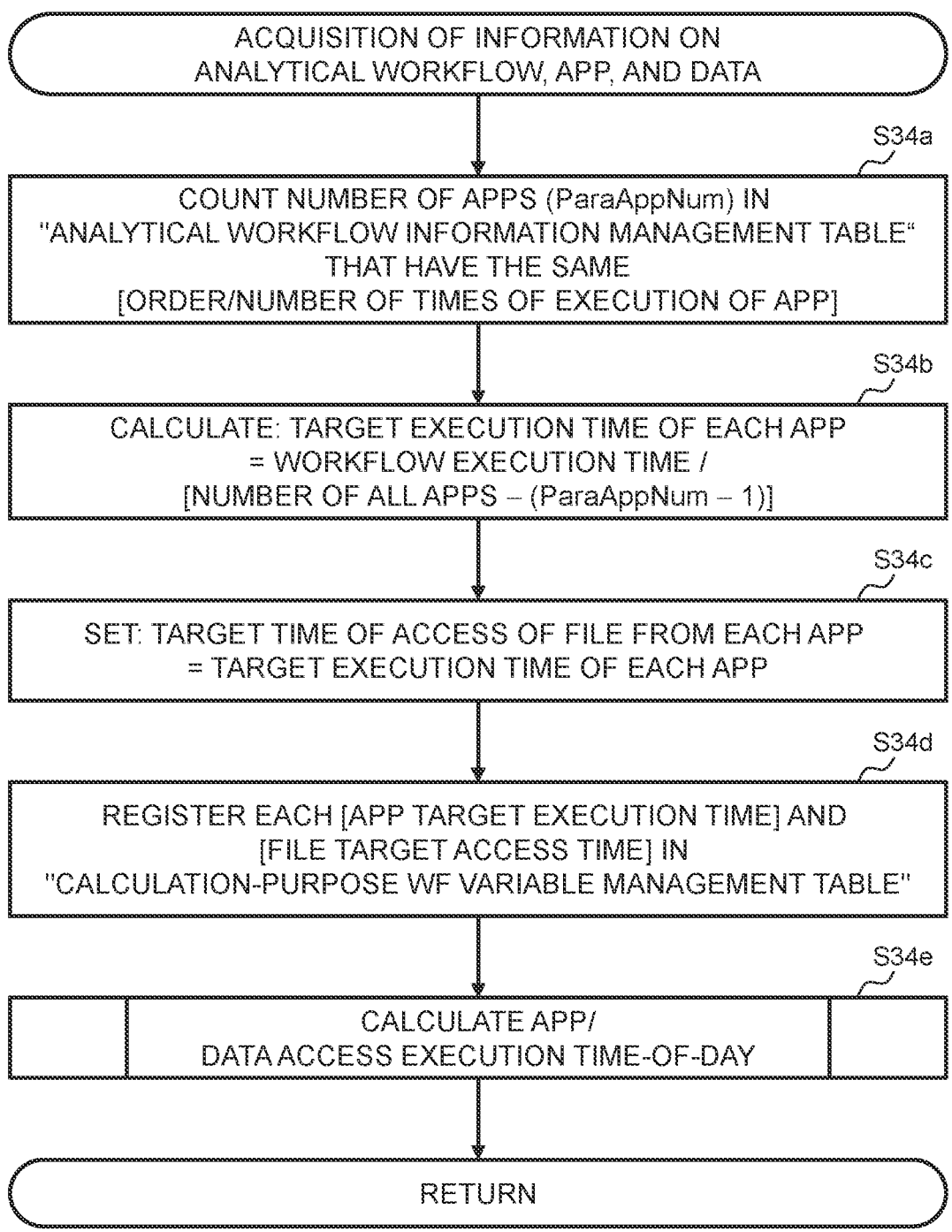
FIG. 36 is a flowchart showing an example of detailed processing of the setting of initial values of app/data.

FIG. 36 is a flowchart showing an example of the detailed processing of S34: setting of initial values of app/data.

In S34a, the app processing/data access execution time calculation unit 1213 counts the number of apps (ParaAppNum) in the analytical workflow information management table 1216 (FIG. 4) that have the same "order/number of times of execution of app."

Next, in S34b, the app processing/data access execution time calculation unit 1213 calculates: [target execution time] of each app=workflow execution time/{number of all apps−(ParaAppNum−1)}. As the workflow execution time, the value already stored in the calculation-purpose WF variable management table 1222 (FIGS. 10A and 10B) is used.

In S34b, the apps that can be executed at the same time are allotted the same execution time window, and the execution time of each app is found out from the execution time limit of the analytical workflow.

Next in S34c, the app processing/data access execution time calculation unit 1213 sets: target time of access of file from each app=target execution time of each app. The target execution time of each app is information calculated in S34b. In S34c, since it is difficult to predict at which timing the app will open and close the data, the target time of access of the file from the app is set to be the same as the target execution time of the app.

Next, in S34d, the app processing/data access execution time calculation unit 1213 registers [target execution time] of each app and [file target access time] in the calculation-purpose WF variable management table 1222 (FIGS. 10A and 10B).

Next, in S34e, the app processing/data access execution time calculation unit 1213 calculates the app/data access execution time-of-day. The detailed processing of S34e will be described later with reference to FIG. 37.

(Detailed Processing of S34e: Calculation of App/Data Access Execution Time-of-Day (FIG. 36))

Figure 37:
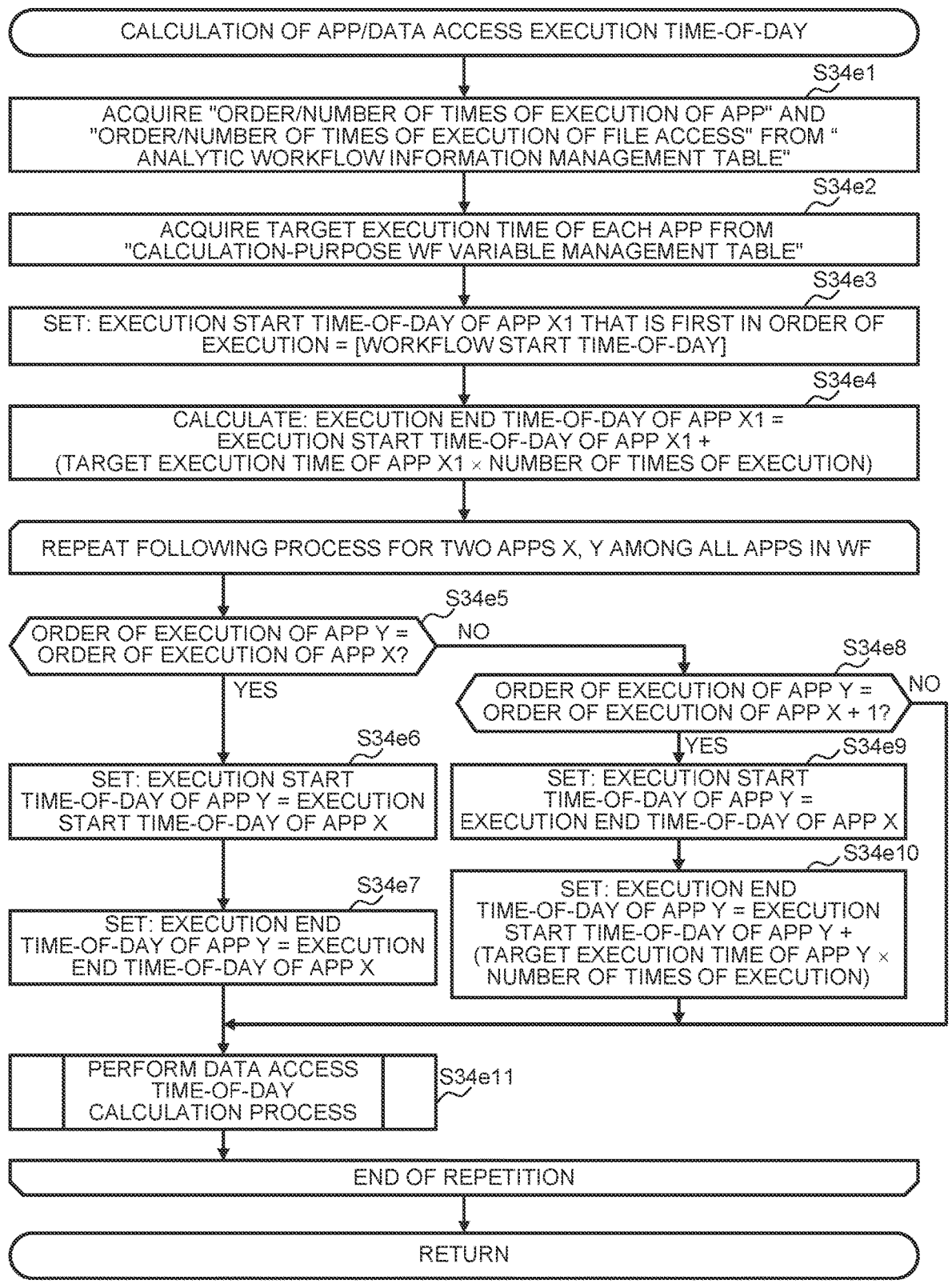
FIG. 37 is a flowchart showing an example of detailed processing of a calculation of app/data access execution time-of-day.

FIG. 37 is a flowchart showing an example of the detailed processing of S34e: calculation of app/data access execution time-of-day. In S34e: calculation of app/data access execution time-of-day, the app and data access execution time-of-day is calculated based on the following principle. On the time axis, apps in the same order of execution are concurrently executed and the other apps are executed in the order of execution. The start time-of-day of an app that is the first in the order of execution is set to be the same as the start time-of-day of the workflow including that app. The start time-of-day of the app that is the second in the order of execution is set to the end time-of-day of the preceding app. When apps are concurrently executed, the execution start times-of-day and the execution end times-of-day are set to the same times-of-day. Since the timing of data access cannot be known, the start time-of-day and the end time-of-day of data access are set to be the same as the execution start time-of-day and the execution end time-of-day of the app.

First, in S34e1, the app processing/data access execution time calculation unit 1213 acquires "order/number of times of execution of app" and "order/number of times of execution of file access" from the analytical workflow information management table 1216 (FIG. 4).

Next, in S34e2, the app processing/data access execution time calculation unit 1213 acquires "target execution time" of each app from the calculation-purpose WF variable management table 1222 (FIGS. 10A and 10B). Next, in S34e3, the app processing/data access execution time calculation unit 1213 sets: execution start time-of-day of app X1 that is first in order of execution=[workflow start time-of-day].

Next, in S34e4, the app processing/data access execution time calculation unit 1213 calculates: execution end time-of-day of app X1 that is first in order of execution=execution start time-of-day of app X1+(target execution time of app X1×number of times of execution).

Next, the app processing/data access execution time calculation unit 1213 executes the loop process of S34e5 to S34e11 for all pairs X, Y of apps in the workflow.

In S34e5, the app processing/data access execution time calculation unit 1213 determines whether order of execution of app Y=order of execution of app X. When order of execution of app Y=order of execution of app X (S34e5: YES), the app processing/data access execution time calculation unit 1213 proceeds with the processing to S34e6, and when order of execution of app Y*order of execution of app X (S34e5: NO), the app processing/data access execution time calculation unit 1213 proceeds with the processing to S34e8.

In S34e6, the app processing/data access execution time calculation unit 1213 sets: execution start time-of-day of app Y=execution start time-of-day of app X. Next, in S34e7, the app processing/data access execution time calculation unit 1213 sets: execution end time-of-day of app Y=execution end time-of-day of app X. When S34e7 ends, the app processing/data access execution time calculation unit 1213 proceeds with the processing to S34e11.

On the other hand, in S34e8, the app processing/data access execution time calculation unit 1213 determines whether order of execution of app Y=order of execution of app X+1. When order of execution of app Y=order of execution of app X+1 (S34e8: YES), the app processing/data access execution time calculation unit 1213 proceeds with the processing to S34e9, and when order of execution of app Y≠order of execution of app X+1 (S34e8: NO), the app processing/data access execution time calculation unit 1213 proceeds with the processing to S34e11.

In S34e9, the app processing/data access execution time calculation unit 1213 sets: execution start time-of-day of app Y=execution end time-of-day of app X. Next, in S34e10, the app processing/data access execution time calculation unit 1213 sets: execution start time-of-day of app Y=execution start time-of-day of app Y+(target execution time of app Y x number of times of execution). When S34e10 ends, the app processing/data access execution time calculation unit 1213 proceeds with the processing to S34e11.

In S34e11, the app processing/data access execution time calculation unit 1213 executes a data access time-of-day calculation process. The data access time-of-day calculation process will be described in detail later with reference to FIG. 38.

(Detailed Processing of S34e11: Calculation of Data Access Time-of-Day (FIG. 37))

Figure 38:
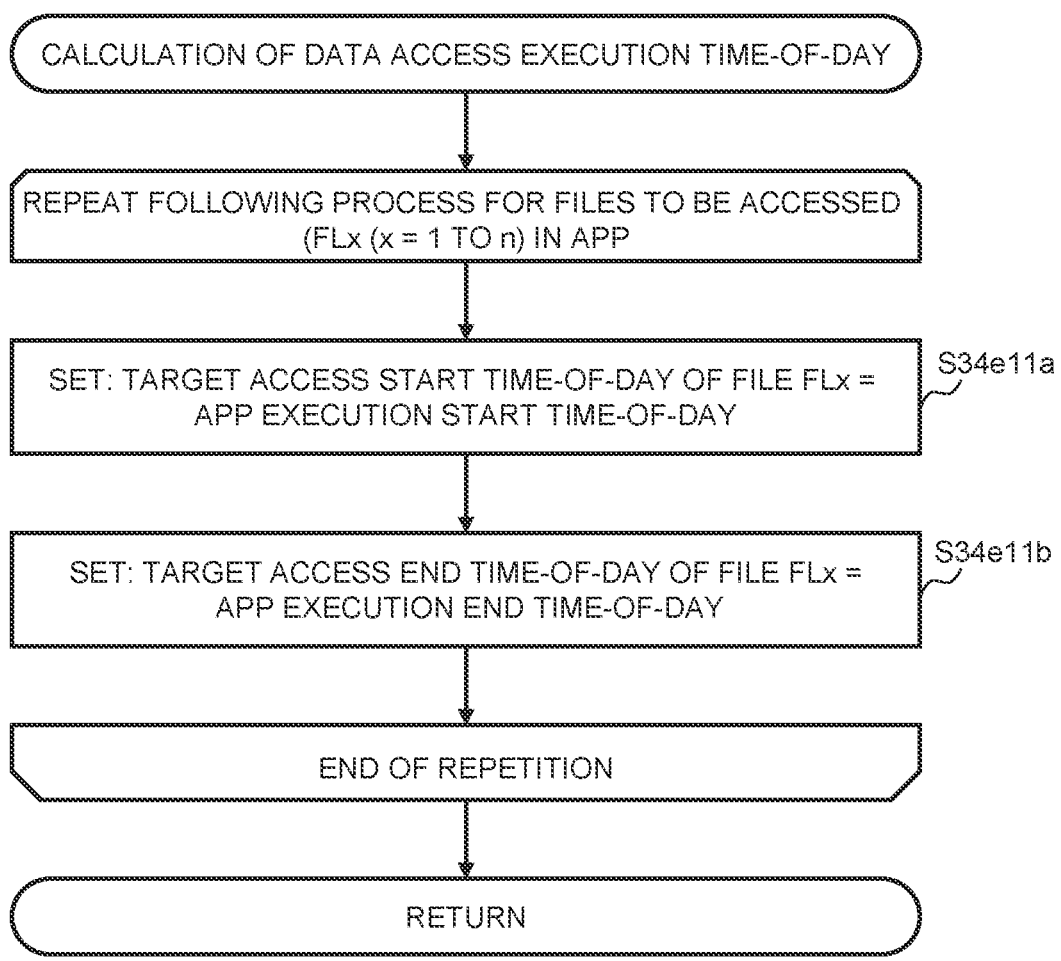
FIG. 38 is a flowchart showing an example of detailed processing of a calculation of data access execution time-of-day.

FIG. 38 is a flowchart showing an example of the detailed processing of S34e11: calculation of data access time-of-day.

The app processing/data access execution time calculation unit 1213 repeatedly executes the loop process of S34e11a to S34a11b for the files FLx (x=1 to n) to be accessed in the app.

In S34e11a, the app processing/data access execution time calculation unit 1213 sets: target access start time-of-day of file FLx=app execution start time-of-day. Next, in S34e11b, the app processing/data access execution time calculation unit 1213 sets: target access end time-of-day of file FLx=app execution end time-of-day.

(Overview of Processing of S22d2: Adjustment of Allocation Among Multiple Apps (FIG. 27))

Figure 39:
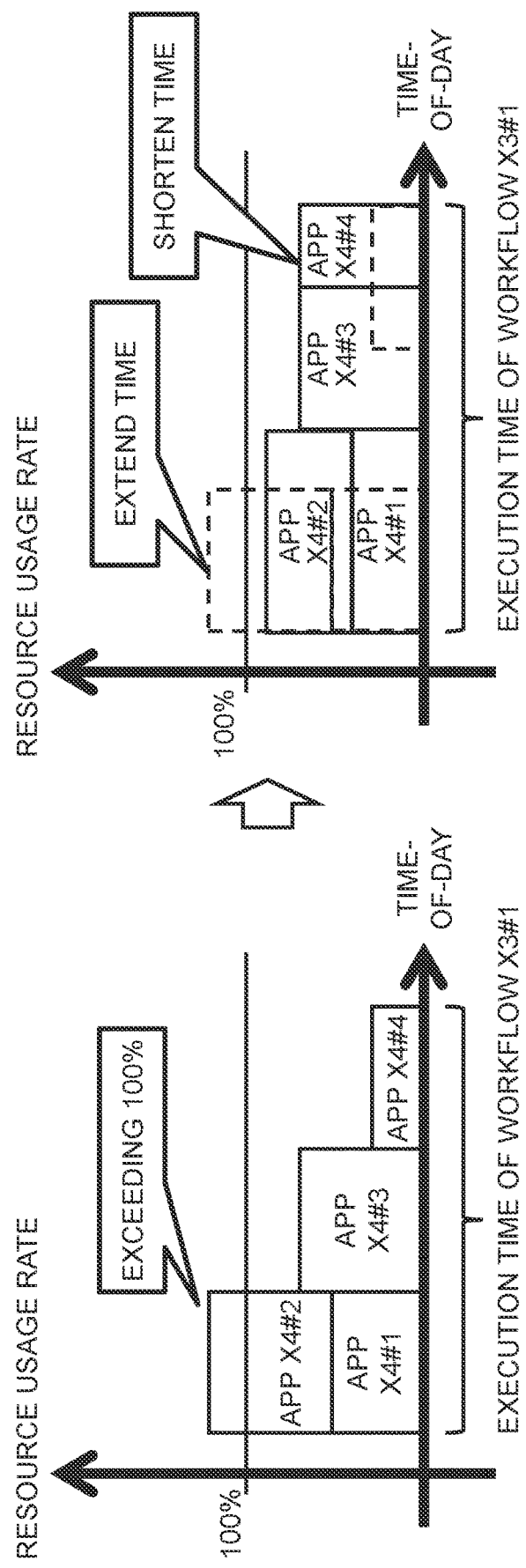
FIG. 39 is a chart for describing an overview of processing of an adjustment of allocation among multiple apps.

Before describing the detailed processing of S22d2: adjustment of allocation among multiple apps, an overview of the processing will be described. FIG. 39 is a chart for describing an overview of the processing of S22d2: adjustment of allocation among multiple apps.

In the example of FIG. 39, the resource usage rate of the apps X4#1 to #4 included in the workflow X3#1 exceeds 100% while the apps X4#1 and #2 are concurrently executed. Therefore, the execution time of the apps X4#1, #2 that are concurrently executed is extended and the execution end time-of-day thereof is postponed so as to lower the resource usage rate below 100%, while the execution time of the app X4#4 executed last is shortened and the execution start time-of-day thereof is postponed. In this case, the time by which the execution time of the apps X4#1, #2 is extended and the time by which the execution time of the app X4#4 is shortened are set to be equal so as not to change the execution time of the workflow X3#1.

(Detailed Processing of S22d2: Adjustment of Allocation Among Multiple Apps (FIG. 27))

Figure 40:
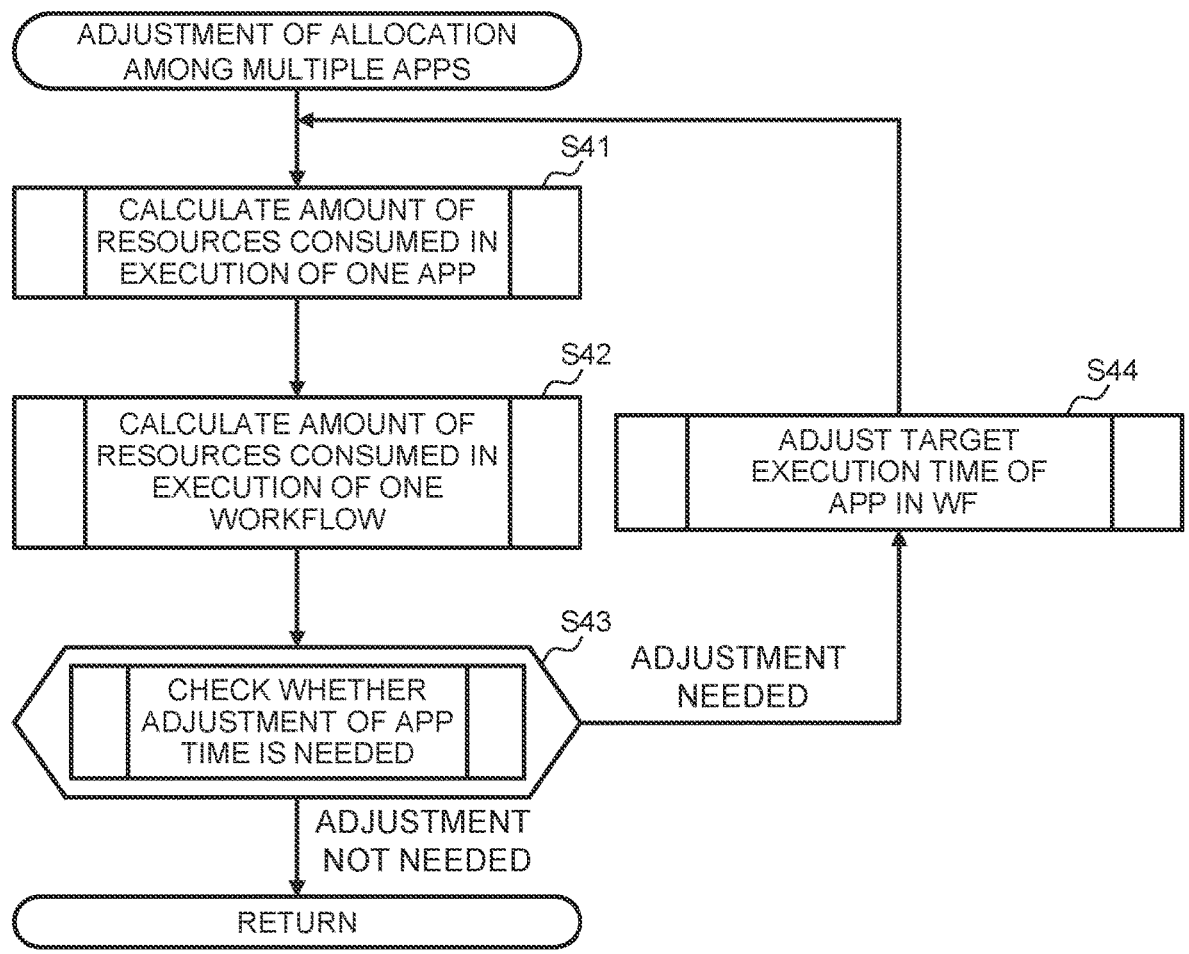
FIG. 40 is a flowchart showing an example of detailed processing of the adjustment of allocation among multiple apps.

FIG. 40 is a flowchart showing an example of the detailed processing of S22d2: adjustment of allocation among multiple apps.

First, in S41, the app processing/data access execution time calculation unit 1213 (FIG. 3) calculates an amount of resources consumed in execution of one app. The detailed processing of S41 will be described later with reference to FIG. 41. Next, in S42, the app processing/data access execution time calculation unit 1213 calculates an amount of resources consumed in one workflow. The detailed processing of S42 will be described later with reference to FIG. 46.

Next, in S43, the app processing/data access execution time calculation unit 1213 checks whether adjustment of app time is needed. When adjustment of app time is needed, the app processing/data access execution time calculation unit 1213 proceeds with the processing to S44, and when adjustment of app time is not needed, the app processing/data access execution time calculation unit 1213 ends S22d2: adjustment of allocation among multiple apps. The detailed processing of S43 will be described later with reference to FIG. 51.

In S44, the app processing/data access execution time calculation unit 1213 adjusts the target execution time of app in the WF. When S44 ends, the app processing/data access execution time calculation unit 1213 returns in the processing to S41. The detailed processing of S44 will be described later with reference to FIG. 52.

(Detailed Processing of S41: Calculation of Amount of Resources Consumed in Execution of One App (FIG. 40))

Figure 41:
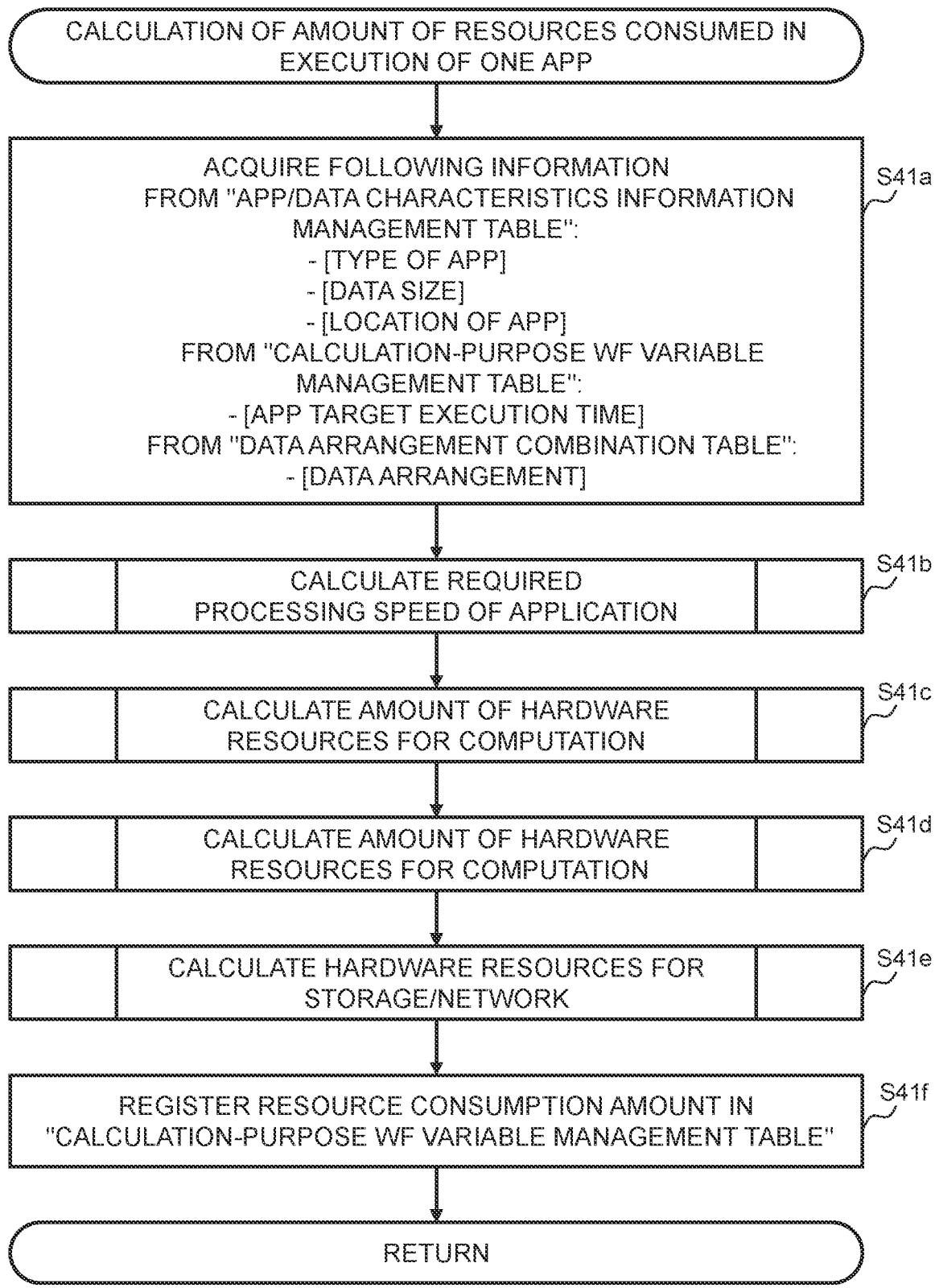
FIG. 41 is a flowchart showing an example of detailed processing of a calculation of an amount of resources consumed in execution of one app.

FIG. 41 is a flowchart showing an example of the detailed processing of S41: calculation of amount of resources consumed in execution of one app.

First, the app processing/data access execution time calculation unit 1213 acquires the following information. The app processing/data access execution time calculation unit 1213 acquires [type of app], [data size], and [location of app] from the app/data characteristics information management table 1217. Further, the app processing/data access execution time calculation unit 1213 acquires [app target execution time] from the calculation-purpose WF variable management table 1222 (FIGS. 10A and 10B). In addition, the app processing/data access execution time calculation unit 1213 acquires [data arrangement] from the data arrangement combination table 1221 (FIG. 9).

Next, in S41b, the app processing/data access execution time calculation unit 1213 calculates a required processing speed of the application. The calculation of the required processing speed of the application will be described in detail later with reference to FIG. 42.

Next, in S41c, the app processing/data access execution time calculation unit 1213 calculates an amount of hardware resources for computation. The calculation of the amount of hardware resources for computation will be described in detail later with reference to FIG. 43.

Next, in S41d, the app processing/data access execution time calculation unit 1213 calculates the required performance of the storage. The calculation of the required performance of the storage will be described in detail later with reference to FIG. 44.

Next, in S41e, the app processing/data access execution time calculation unit 1213 calculates an amount of hardware resources for storage/network. The calculation of the amount of hardware resources for storage/network will be described in detail later with reference to FIG. 45.

Next, in S41f, the app processing/data access execution time calculation unit 1213 registers the resource consumption amounts acquired in S41b to S41e in the calculation-purpose WF variable management table 1222.

(Detailed Processing of S41b: Calculation of Required Processing Speed of Application (FIG. 41))

Figure 42:
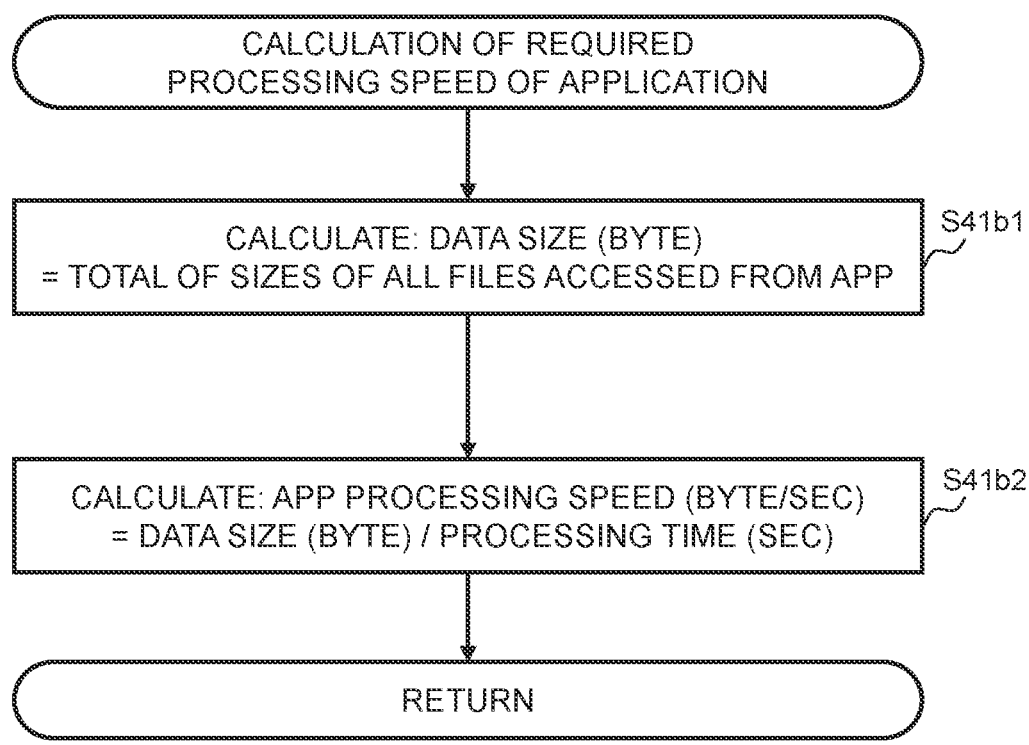
FIG. 42 is a flowchart showing an example of detailed processing of a calculation of required processing speed of an application.

FIG. 42 is a flowchart showing an example of the detailed processing of S41b: calculation of required processing speed of application.

First, in S41b1, the app processing/data access execution time calculation unit 1213 calculates: data size (byte)=total of sizes of all files accessed from app, with reference to the app/data characteristics information management table (FIG. 5). Next, in S41b2, the app processing/data access execution time calculation unit 1213 calculates: app processing speed (byte/sec)=data size (byte)/processing time (sec).

(Detailed Processing of S41c: Calculation of Amount of Hardware Resources for Computation (FIG. 41))

Figure 43:
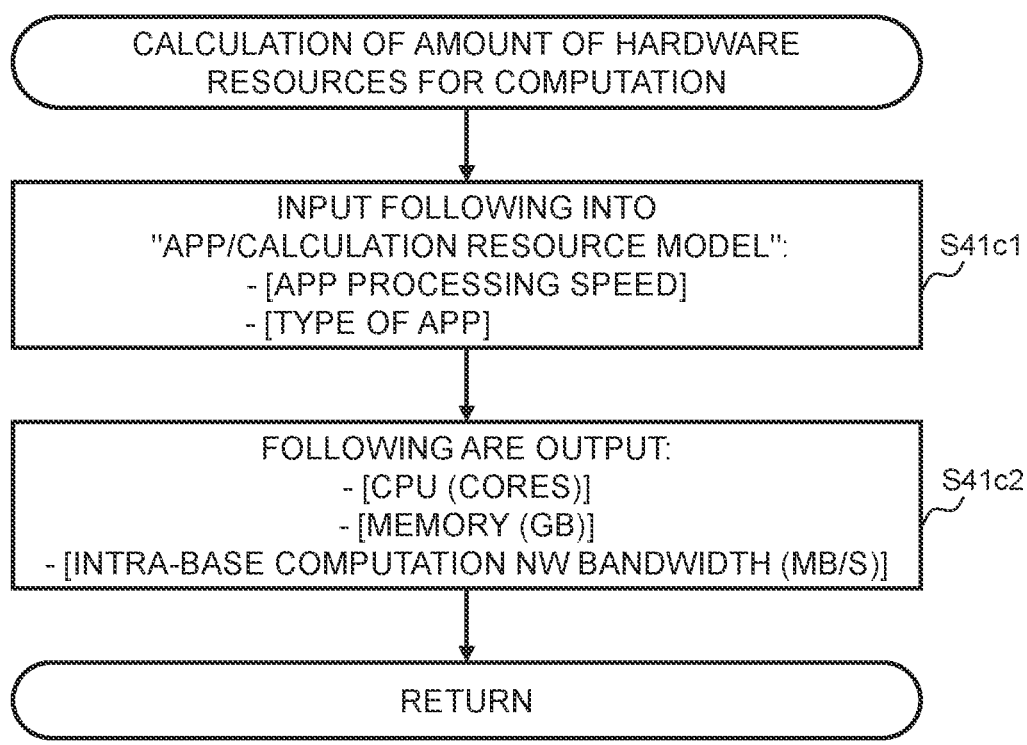
FIG. 43 is a flowchart showing an example of detailed processing of a calculation of an amount of hardware resources for computation.

FIG. 43 is a flowchart showing an example of the detailed processing of S41c: calculation of amount of hardware resources for computation.

First, in S41c1, the app processing/data access execution time calculation unit 1213 inputs [app processing speed] and [type of app] into the models classified as app/computational resource models with reference to the resource model management table 1218 (FIG. 6). Next, in S41c2, the app processing/data access execution time calculation unit 1213 obtains, in response to the input of S41c1, [CPU (cores)] (number of CPU cores), [memory (GB)] (memory capacity), and [intra-base computation NW bandwidth (MB/s)] as resource consumption amounts.

(Detailed Processing of S41d: Calculation of Required Performance of Storage (FIG. 41))

Figure 44:
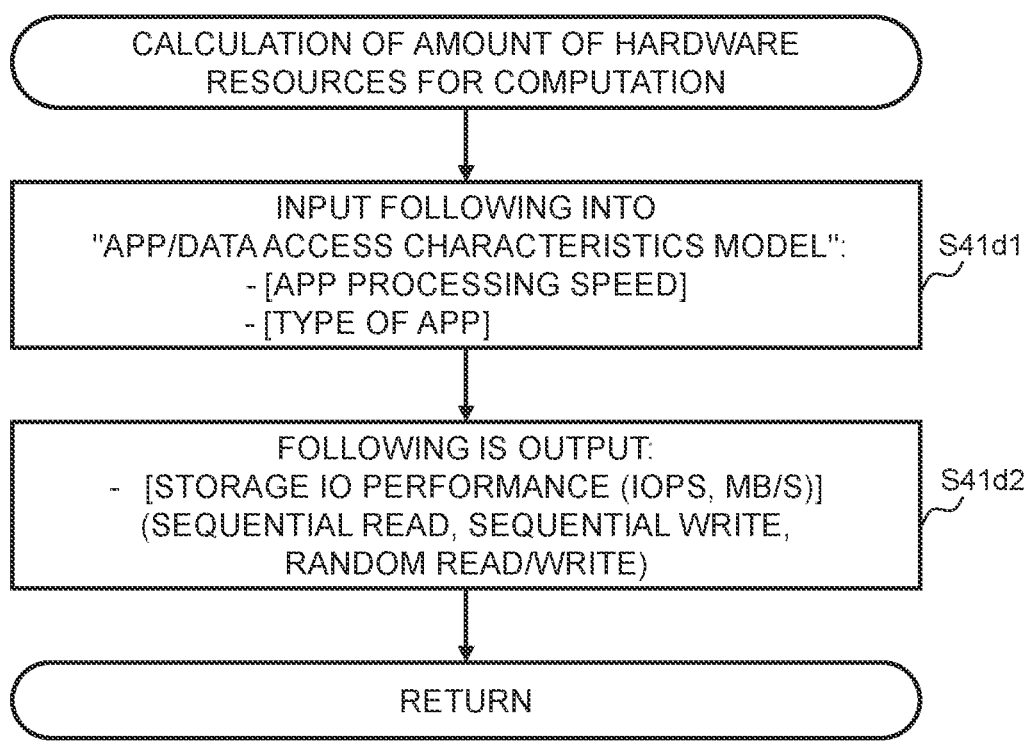
FIG. 44 is a flowchart showing an example of detailed processing of a calculation of required performance of storage.

FIG. 44 is a flowchart showing an example of the detailed processing of S41d: calculation of required performance of storage (FIG. 41).

First, in S41d1, the app processing/data access execution time calculation unit 1213 inputs [app processing speed] and [type of app] into the models classified as app/data access characteristics models with reference to the resource model management table 1218 (FIG. 6). Next, in S41d2, the app processing/data access execution time calculation unit 1213 acquires [storage IO performance (IOPS, MB/s)] for each of sequential read, sequential write, and random read/write in response to the input of S41d1.

(Detailed Processing of S41e: Calculation of Amount of Hardware Resources for Storage/Network (FIG. 41))

Figure 45:
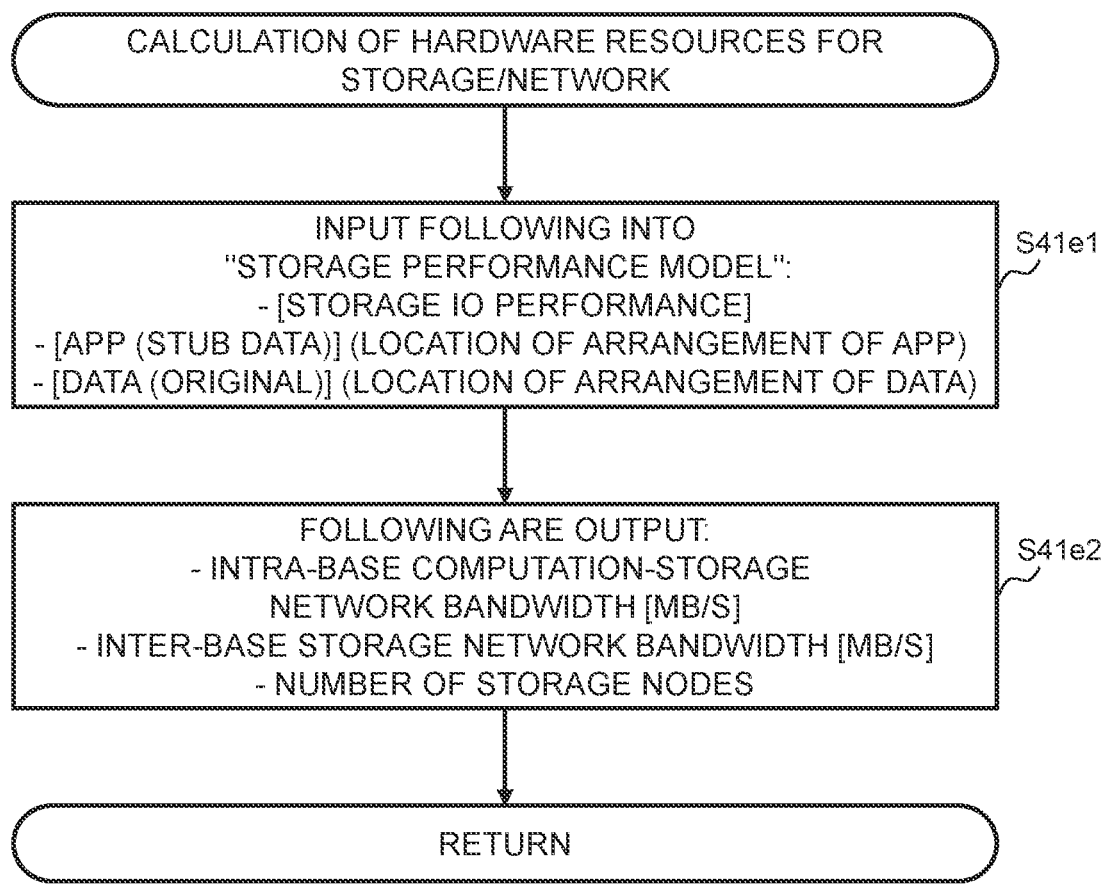
FIG. 45 is a flowchart showing an example of detailed processing of a calculation of an amount of hardware resources for storage/network.

FIG. 45 is a flowchart showing an example of the detailed processing of S41e: calculation of amount of hardware resources for storage/network.

First, in S41e1, the app processing/data access execution time calculation unit 1213 inputs [(storage) IO performance] (acquired in S41d1), and [app (stub data)] and [data (original data)] in the arrangement pattern into the models classified as storage performance models with reference to the resource model management table 1218 (FIG. 6). Then, in S41e2, the app processing/data access execution time calculation unit 1213 obtains, in response to the input of S41e1, an intra-base computation-storage network bandwidth [MB/s], an inter-base storage network bandwidth [MB/s], and a number of storage nodes as resource consumption amounts.

(Detailed Processing of S42: Calculation of Amount of Resources Consumed in Execution of One Workflow (FIG. 40))

Figure 46:
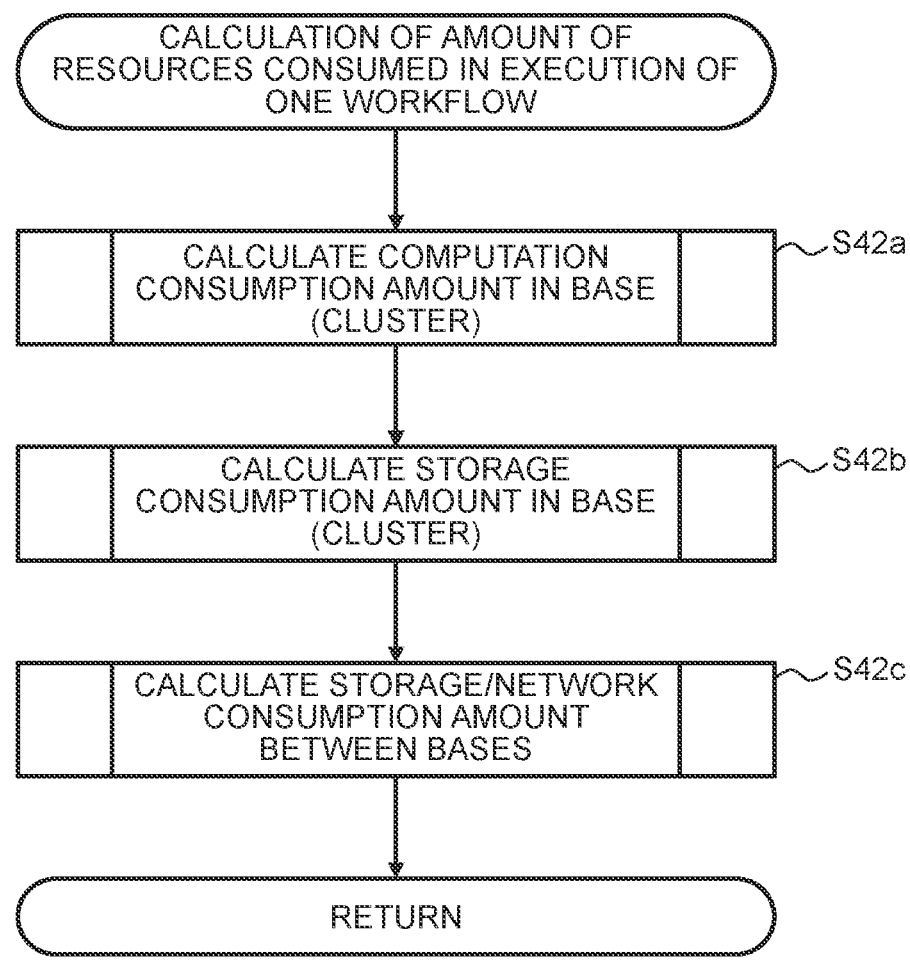
FIG. 46 is a flowchart showing an example of detailed processing of a calculation of an amount of resources consumed in execution of one workflow.

FIG. 46 is a flowchart showing an example of the detailed processing of S42: calculation of amount of resources consumed in execution of one workflow.

First, in S42a, the app processing/data access execution time calculation unit 1213 calculates a computation consumption amount in the base (cluster). The calculation of the computation consumption amount in the base (cluster) will be described in detail later with reference to FIG. 47.

Next, in S42b, the app processing/data access execution time calculation unit 1213 calculates a storage consumption amount in the base (cluster). The calculation of the storage consumption amount in the base (cluster) will be described in detail later with reference to FIG. 48.

Next, in S42c, the app processing/data access execution time calculation unit 1213 calculates a storage/network consumption amount between bases. When an app requests access to a stub file within the base where that app belongs, the data virtualization function unit 223 automatically transfers a cache from the original file of the stub file located in another base to the base of the stub file located at the origin of access. In the calculation of the storage/network consumption amount between bases, the amount of storage/network consumption between bases that occurs in this cache transfer is calculated. The calculation of the storage/network consumption amount between bases will be described in detail later with reference to FIG. 50.

(Detailed Processing of S42a: Calculation of Computation Consumption Amount in Base (Cluster) (FIG. 46))

Figure 47:
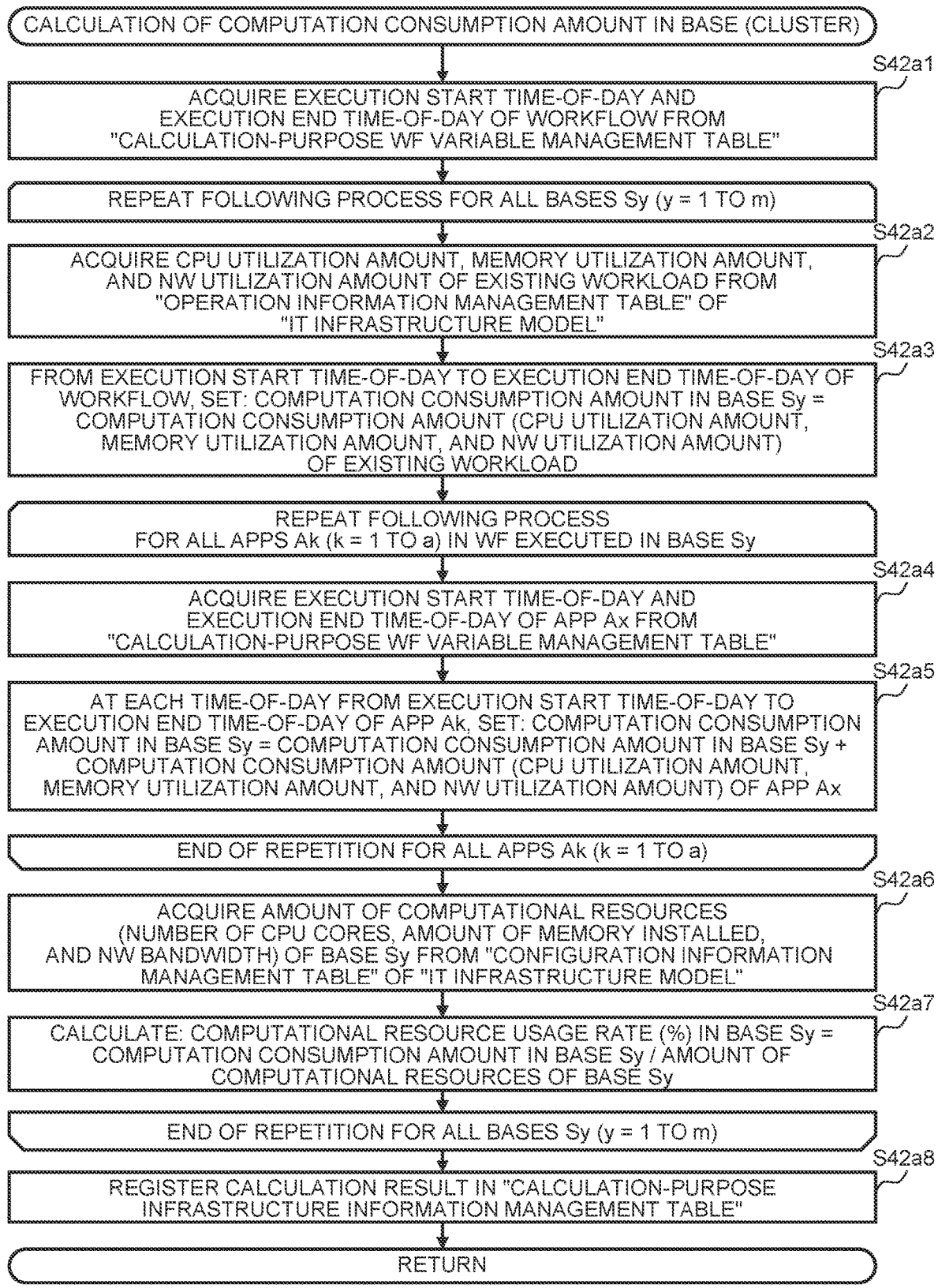
FIG. 47 is a flowchart showing an example of detailed processing of a calculation of a computation consumption amount in a base (cluster)

FIG. 47 is a flowchart showing an example of the detailed processing of S42a: calculation of computation consumption amount in base (cluster).

First, in S42a1, the app processing/data access execution time calculation unit 1213 acquires the workflow execution start time-of-day and the workflow execution end time-of-day from the calculation-purpose WF variable management table 1222 (FIGS. 10A and 10B).

Next, the app processing/data access execution time calculation unit 1213 executes the loop process of S42a2 to S42a7 for all the bases Sy (y=1 to m).

In S42a2, the app processing/data access execution time calculation unit 1213 acquires the CPU utilization amount, the memory utilization amount, and the NW utilization amount of the existing workload from the operation information management table 1220 (FIG. 8). Next, in S42a3, the app processing/data access execution time calculation unit 1213 sets, from the execution start time-of-day to the execution end time-of-day of the workflow: computation consumption amount in base Sy=computation consumption amount (CPU utilization amount, memory utilization amount, and NW utilization amount) of existing workload.

Next, the app processing/data access execution time calculation unit 1213 executes the loop process of S42a4 to S42a5 for all the apps Ak (k=1 to a) in the WF executed in all the bases Sy.

In S42a4, the app processing/data access execution time calculation unit 1213 acquires the execution start time-of-day and the execution end time-of-day of the app Ak from the calculation-purpose WF variable management table 1222. Next, in S42a5, the app processing/data access execution time calculation unit 1213 sets, from the execution start time-of-day to the execution end time-of-day of the app Ak: computation consumption amount in base Sy=computation consumption amount in base Sy+computation consumption amount (CPU utilization amount, memory utilization amount, and NW utilization amount) of app Ak.

When the loop process of S42a4 to S42a5 ends, in S42a6, the app processing/data access execution time calculation unit 1213 acquires the amount of computational resources (the number of CPU cores, the amount of memory installed, and the NW bandwidth) of the base Sy from the configuration information management table 1219.

Next, in S42a7, the app processing/data access execution time calculation unit 1213 calculates: computational resource usage rate (%) in base Sy=computation consumption amount in base Sy/amount of computational resources in base Sy.

When the loop process of S42a2 to S42a7 ends, in S42a8, the app processing/data access execution time calculation unit 1213 registers the calculation results of S42a3, S42a5, and S42a7 in the calculation-purpose infrastructure information management table 1224 (FIG. 12) along with the times-of-day of the calculations.

(Detailed Processing of S42b: Calculation of Storage Consumption Amount in Base (Cluster) (FIG. 46))

Figure 48:
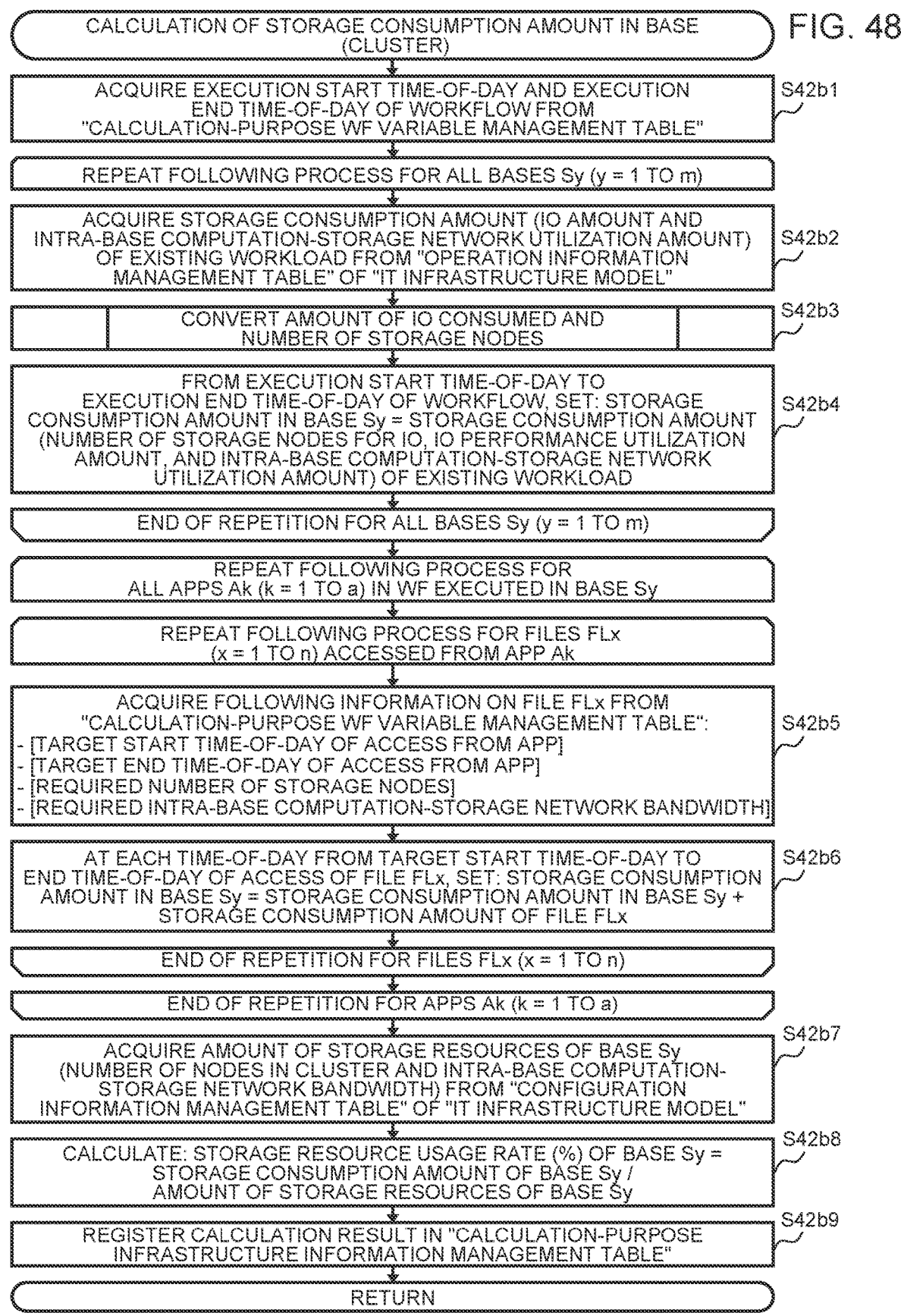
FIG. 48 is a flowchart showing an example of detailed processing of a calculation of a storage consumption amount in a base (cluster)

FIG. 48 is a flowchart showing an example of the detailed processing of S42b: calculation of storage consumption amount in base (cluster).

First, in S42b1, the app processing/data access execution time calculation unit 1213 acquires the workflow execution start time-of-day and the workflow execution end time-of-day from the calculation-purpose WF variable management table 1222 (FIGS. 10A and 10B).

Next, the app processing/data access execution time calculation unit 1213 executes the loop process of S42b2 to S42b4 for all the bases Sy (y=1 to m).

In S42b2, the app processing/data access execution time calculation unit 1213 acquires the storage consumption amount (the IO amount and the intra-base consumption-storage network utilization amount) of the existing workload from the operation information management table 1220 (FIG. 8).

Next, in S42b3, the app processing/data access execution time calculation unit 1213 executes a process of converting the amount of IO consumed and the number of storage nodes. The process of converting the amount of IO consumed and the number of storage nodes will be described in detail later with reference to FIG. 49.

Next, in S42*b*4, the app processing/data access execution time calculation unit 1213 sets, from the execution start time-of-day to the execution end time-of-day of the workflow: storage consumption amount in base Sy=storage consumption amount (number of storage nodes for IO, IO performance utilization amount, and intra-base consumption-storage network utilization amount) of existing workload.

When the loop process of S42*b*2 to S42*b*4 ends, the app processing/data access execution time calculation unit 1213 repeats the loop process of S42*b*5 to S42*b*6 for all the apps Ak (k=1 to a) in the WF executed in the base Sy and the files FLx (x=1 to n) accessed from the apps Ak.

In S42*b*5, the app processing/data access execution time calculation unit 1213 acquires the following information on the files FLx from the calculation-purpose WF variable management table 1222 (FIGS. 10A and 10B). The app processing/data access execution time calculation unit 1213 acquires [target start time-of-day of access from app], [target end time-of-day of access from app], [required number of storage nodes], and [required intra-base computation-storage network bandwidth].

Next, in S42*b*6, the app processing/data access execution time calculation unit 1213 calculates, from the target start time-of-day to the target end time-of-day of access of the file FLx: storage consumption amount in base Sy=storage consumption amount in base Sy+storage consumption amount of file FLx.

When the loop process of S42*b*5 to S42*b*6 ends, in S42*b*7, the app processing/data access execution time calculation unit 1213 acquires the amount of storage resources (the number of nodes in cluster and the intra-base computation-storage network bandwidth) of the base Sy from the configuration information management table 1219 (FIG. 7).

Next, in S42*b*8, the app processing/data access execution time calculation unit 1213 calculates: storage resource usage rate (%) of base Sy=storage consumption amount of base Sy/amount of storage resources of base Sy. Finally, in S42*b*9, the app processing/data access execution time calculation unit 1213 registers the calculation results of S42*b*4, S42*b*6, and S42*b*8 in the calculation-purpose infrastructure information management table 1224 along with the times-of-day of the calculations.

(Detailed Processing of S42*b*3: Conversion of Amount of IO Consumed and Number of Storage Nodes (FIG. 48))

Figure 49:
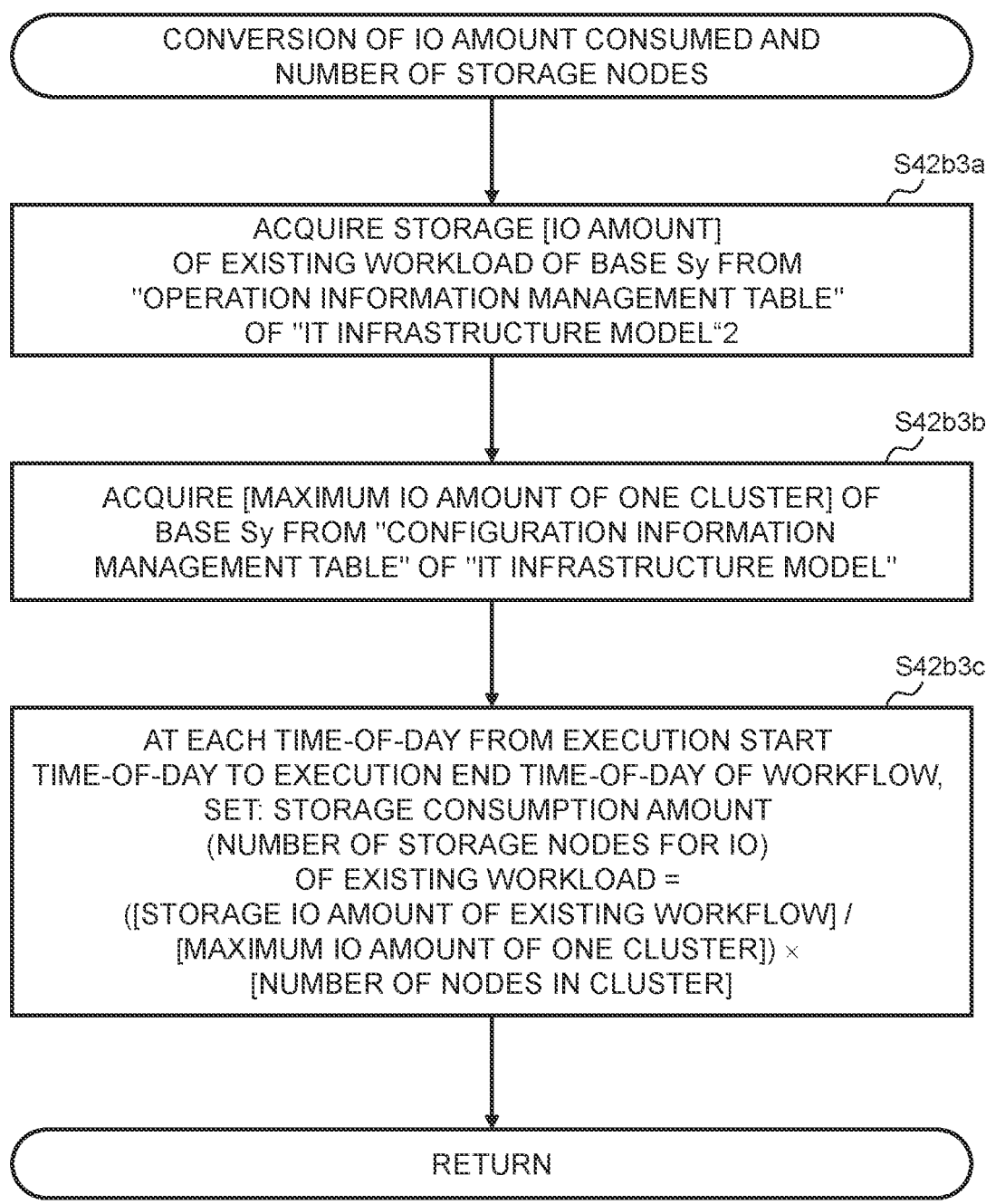
FIG. 49 is a flowchart showing an example of detailed processing of conversion of an IO consumption amount and a number of storage nodes.

FIG. 49 is a flowchart showing an example of the detailed processing of S42*b*3: conversion of amount of IO consumed and number of storage nodes.

First, in S42*b*3*a*, app processing/data access execution time calculation unit 1213 acquires [IO amount (in one cluster)] of the existing workload of the base Sy from the operation information management table 1220 (FIG. 8). Next, in S42*b*3*b*, the app processing/data access execution time calculation unit 1213 acquires [maximum IO amount of one cluster] of the base Sy from the configuration information management table 1219 (FIG. 7).

Next, in S42*b*3*c*, the app processing/data access execution time calculation unit 1213 sets, from the execution start time-of-day to the execution end time-of-day of the workflow: storage consumption amount (number of storage nodes for IO) of existing workload=([storage IO amount of existing workload]/[maximum IO amount of one cluster])×[number of nodes in cluster].

Figure 50:
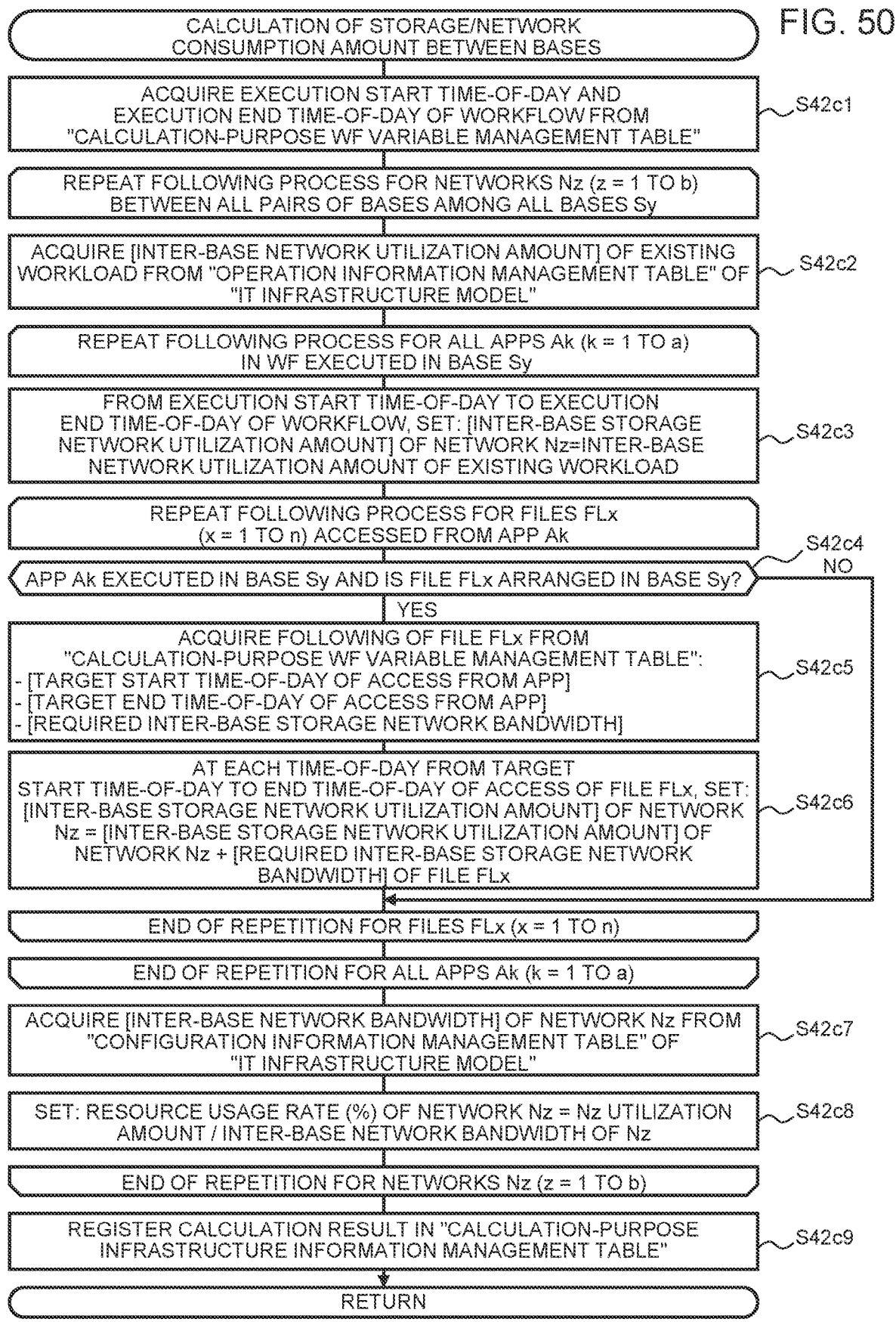
FIG. 50 is a flowchart showing an example of detailed processing of a calculation of an inter-base storage/network consumption amount.

FIG. 50 is a flowchart showing an example of the detailed processing of S42*c*: calculation of storage/network consumption amount between bases (FIG. 46).

First, in S42*c*1, the app processing/data access execution time calculation unit 1213 acquires the workflow execution start time-of-day and the workflow execution end time-of-day from the calculation-purpose WF variable management table 1222 (FIGS. 10A and 10B).

Next, the app processing/data access execution time calculation unit 1213 repeatedly executes the loop process of S42*c*2 to S42*c*8 for networks Nz (z=1 to b) between all pairs of bases among all the bases Sy.

In S42*c*2, the app processing/data access execution time calculation unit 1213 acquires [inter-base network utilization amount] of the existing workload from the operation information management table 1220 (FIG. 8). Next, in S42*c*3, the app processing/data access execution time calculation unit 1213 sets, from the workflow execution start time-of-day to the workflow execution end time-of-day: [inter-base storage network utilization amount] of network Nz=inter-base network utilization amount of existing workload.

Next, the app processing/data access execution time calculation unit 1213 executes the loop process of S42*c*4 to S42*c*6 for all the apps Ak (k=1 to a) in the WF executed in the base Sy and the files FLx (x=1 to n) accessed from the apps Ak.

In S42*c*4, the app processing/data access execution time calculation unit 1213 determines whether the app Ak is executed in the base Sy and whether the file FLx is arranged in the base Sy. When the app Ak is executed in the base Sy and the file FLx is arranged in the base Sy (S42*c*4: YES), the app processing/data access execution time calculation unit 1213 proceeds with the processing to S42*c*5. On the other hand, when the app Ak has been executed in the base Sy but the file FLx is not arranged in the base Sy (S42*c*4: NO), the app processing/data access execution time calculation unit 1213 continues the loop process for the next file FLx or app Ak or, when the loop process for all the files FLx and apps Ak has ended, proceeds with the processing to S42*c*7.

In S42*c*5, the app processing/data access execution time calculation unit 1213 acquires the following information on the file FLx from the calculation-purpose WF variable management table 1222 (FIGS. 10A and 10B). The app processing/data access execution time calculation unit 1213 acquires [target start time-of-day of access from app], [target end time-of-day of access from app], and [required inter-base storage network bandwidth].

In S42*c*6, the app processing/data access execution time calculation unit 1213 calculates, from the target start time-of-day to the target end time-of-day of access of the file FLx: [inter-base storage network utilization amount] of network Nz=[inter-base storage network utilization amount] of network Nz+[required inter-base storage network bandwidth] of file FLx.

When the loop process of S42*c*4 to S42*c*6 ends, in S42*c*7, the app processing/data access execution time calculation unit 1213 acquires [inter-base network bandwidth] of the network Nz from the configuration information management table 1219 (FIG. 7).

Next, in S42*c*8, the app processing/data access execution time calculation unit 1213 calculates: resource usage rate (%) of network Nz=utilization amount of network Nz/inter-base network bandwidth of network Nz.

When the loop process of S42*c*2 to S42*c*8 ends, in S42*c*9, the app processing/data access execution time calculation unit 1213 registers the calculation results of S42*c*3, S42*c*6, and S42c8 in the calculation-purpose infrastructure information management table 1224 (FIG. 12) along with the times-of-day of the calculations.

(Detailed Processing of S43: Check of Whether Time Adjustment of App is Needed (FIG. 40))

Figure 51:
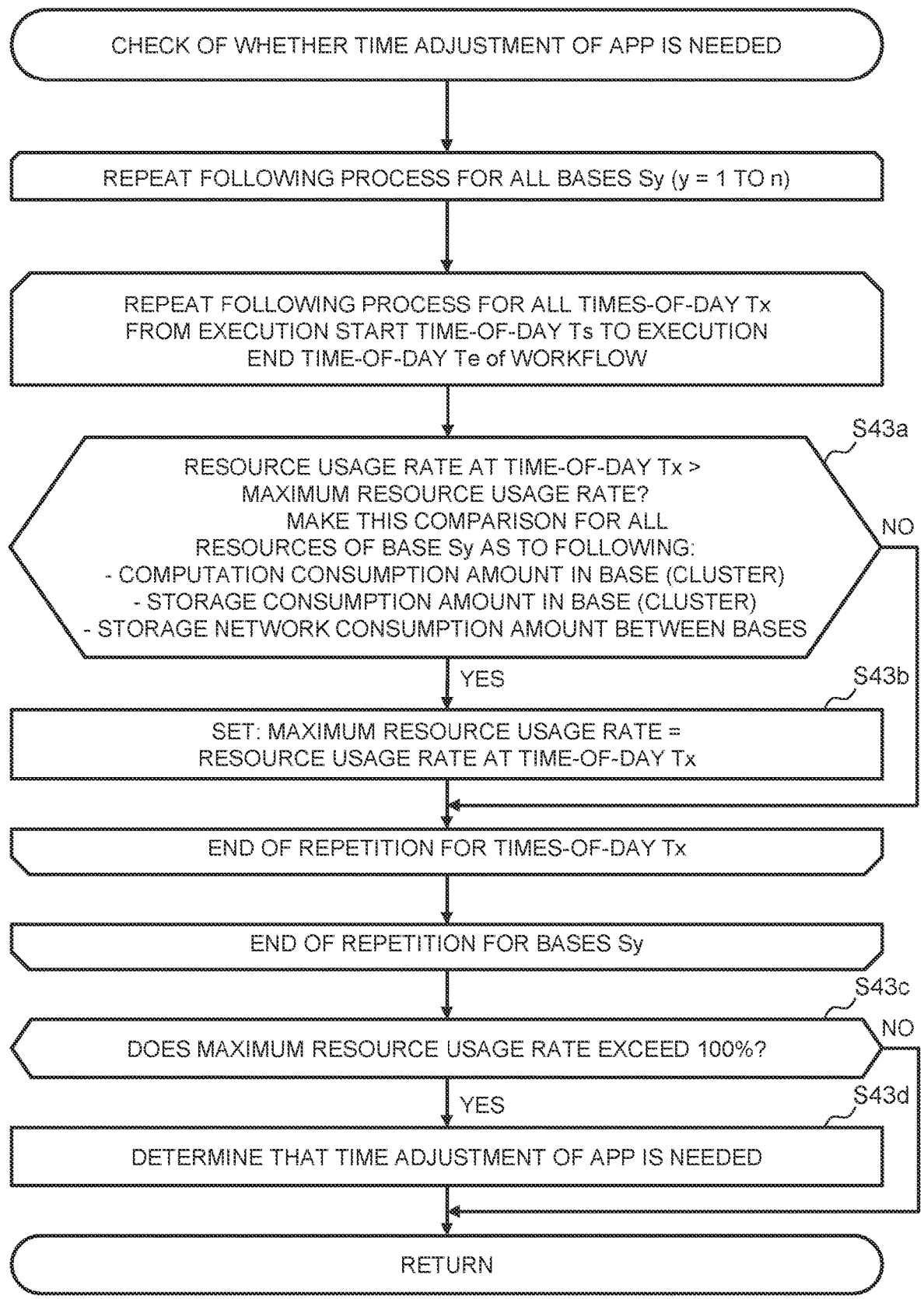
FIG. 51 is a flowchart showing an example of detailed processing of check of whether time adjustment of an app is needed.

FIG. 51 is a flowchart showing an example of the detailed processing of S43: check of whether time adjustment of app is needed.

First, the app processing/data access execution time calculation unit 1213 executes the loop process of S43a to S43b for all the bases Sy (y=1 to n) and all times-of-day Tx from an execution start time-of-day Ts to an execution end time-of-day Te of the workflow. The time-of-day Tx is a time-of-day based on a unit time (e.g., one second).

In S43a, the app processing/data access execution time calculation unit 1213 determines whether resource usage rate at time-of-day Tx>maximum resource usage rate. This comparison is made for all the resources of the base Sy as to the computation consumption amount in the base (cluster), the storage consumption amount in the base (cluster), and the storage network consumption amount between bases. When there is a resource that meets: resource usage rate at time-of-day Tx>maximum resource usage rate (S43a: YES), the app processing/data access execution time calculation unit 1213 proceeds with the processing to S43b. On the other hand, when all the resources meet: resource usage rate at time-of-day Tx ≤ maximum resource usage rate (S43a: NO), the app processing/data access execution time calculation unit 1213 continues the loop process for the next base Sy or time-of-day Tx or, when the loop process for all the bases Sy and the times-of-day Tx has ended, proceeds with the processing to S43c.

In S43b, the app processing/data access execution time calculation unit 1213 sets: maximum resource usage rate=resource usage rate at time-of-day Tx.

When the loop process of S43a to S43b ends, in S43c, the app processing/data access execution time calculation unit 1213 determines whether the maximum resource usage rate exceeds 100%. When the maximum resource usage rate exceeds 100% (S43c: YES), the app processing/data access execution time calculation unit 1213 proceeds with the processing to S43d, and When the maximum resource usage rate is equal to or lower than 100% (S43c: NO), the app processing/data access execution time calculation unit 1213 ends S43: check of whether time adjustment of app is needed.

In S43d, the app processing/data access execution time calculation unit 1213 determines that time adjustment of the app is needed.

(Detailed Processing of S44: Adjustment of Target Execution Time of App in WF (FIG. 40))

Figure 52:
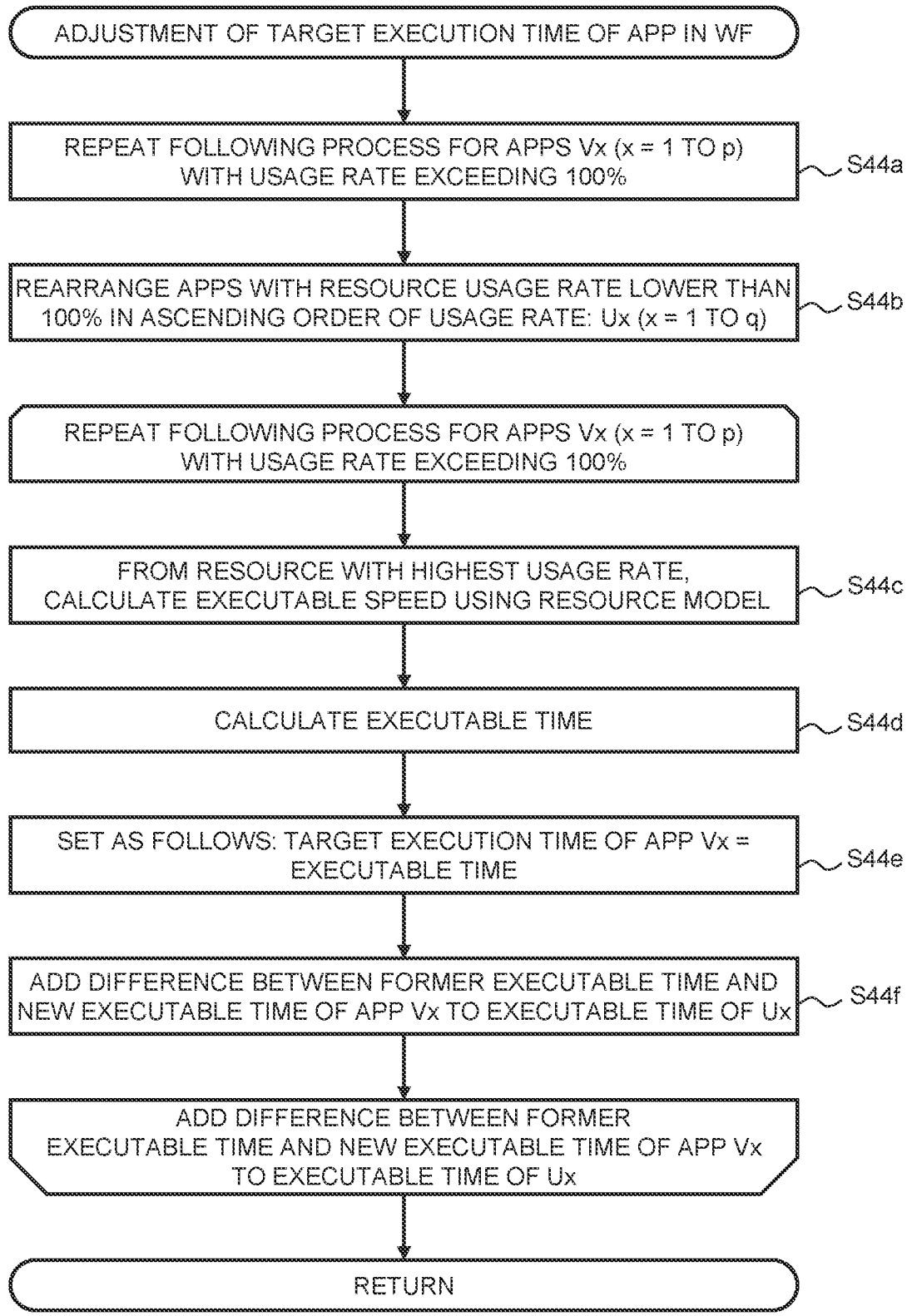
FIG. 52 is a flowchart showing an example of detailed processing of adjustment of a target execution time of an app in a WF.

FIG. 52 is a flowchart showing an example of the detailed processing of S44: adjustment of target execution time of app in WF. In S44: adjustment of target execution time of app in WF, the execution time of an app with a high resource usage rate (exceeding 100%) is extended and the execution time of an app with a low resource usage rate (lower than 100%) is shortened by an amount of time corresponding to the extension. Specifically, an executable time in the case where an app with the highest resource usage rate is executed with the resource usage rate kept equal to or lower than 100% is calculated, and this executable time is added to an executable time of an app with the lowest resource usage rate. Similarly, an executable time in the case where an app with the i-th highest resource usage rate is executed with the resource usage rate kept equal to or lower than 100% is calculated, and this executable time is added to an executable time of an app with the i-th lowest resource usage rate. This process is executed for all apps of which the resource usage rate exceed 100%. The executable time is calculated based on the resource model of a resource of the highest resource usage rate.

First, in S44a, the app processing/data access execution time calculation unit 1213 rearranges apps with the resource usage rate exceeding 100% in descending order of the resource usage rate. The apps rearranged in descending order of the resource usage rate will be denoted by Vx (x=1 to p).

Next, in S44b, the app processing/data access execution time calculation unit 1213 rearranges apps with the resource usage rate lower than 100% in ascending order of the resource usage rate. The apps rearranged in ascending order of the resource usage rate will be denoted by Ux (x=1 to q).

Next, the app processing/data access execution time calculation unit 1213 executes the loop process of S44c to S44f for the apps Vx (x=1 to p) of which the resource usage rate exceeds 100%.

In S44c, for the resource of the highest resource usage rate, the app processing/data access execution time calculation unit 1213 calculates [executable speed] of the app Vx using the resource model of the corresponding resource as described in (A) to (C) below according to the type of resource.

(A) when the Resource is Computation in the Base (Cluster):

The amount of computational resources (the number of CPU cores, the memory capacity, and the intra-cluster network bandwidth) of the corresponding base is acquired from the configuration information management table 1219 (FIG. 7).

The computation consumption amount (the CPU utilization amount, the memory utilization amount, and the intra-cluster network utilization amount) of the existing workload is acquired from the operation information management table 1220 (FIG. 8).

The following is calculated: amount of available computational resource=amount of computational resource in base—computation consumption amount of existing workload.

The amount of available computational resource (amount of computational resources (CPU [core], memory [byte], and intra-base computation network bandwidth [byte/sec])) is input into each model of "app/computational resource model" (see the resource model management table 1218 (FIG. 6)) to calculate an executable app processing speed ("executable speed") (byte/sec).

(B) When the Resource is Storage in the Base (Cluster):

The amount of storage resources (the number of nodes in the cluster and the intra-base computation-storage network bandwidth) of the corresponding base is acquired from the configuration information management table 1219 (FIG. 7).

The storage consumption amount (the IO amount and the intra-base computation-storage network utilization amount) of the existing workload is acquired from the operation information management table 1220 (FIG. 8).

The following is calculated: amount of available storage resources=amount of storage resources in base—storage consumption amount of existing workload.

The amount of available storage resource (amount of storage resources (number of storage nodes and the intra-base computation-storage network bandwidth (byte/sec))) is input into each model of "storage performance model" (see the resource model management table 1218 (FIG. 6)) to calculate achievable storage IO performance (byte/sec, IOPS).

The achievable storage IO performance is input into each model of "app/data access characteristics model" (see the resource model management table 1218 (FIG. 6)) to calculate an executable app processing speed ("executable speed") (byte/sec).

(C) When the Resource is Storage/Network Between Bases:

[Inter-base network bandwidth] of the target network is acquired from the configuration information management table 1219 (FIG. 7).

[Inter-base network utilization amount] of the existing workload is acquired from the operation information management table 1220 (FIG. 8).

The following is calculated: amount of available network resources=[inter-base network bandwidth] of target network−[inter-base network utilization amount] of existing workload.

The amount of available network resource (inter-base network bandwidth (byte/sec)) is input into each model of "storage performance model" (see the resource model management table 1218 (FIG. 6)) to calculate achievable storage IO performance.

From the achievable storage IO performance, achievable storage performance (byte/sec, IOPS) is used as an input to calculate an executable app processing speed ("executable speed") (byte/sec).

Next, in S44d, the app processing/data access execution time calculation unit 1213 calculates the executable time of the app Vx using the following Formula (2) based on the executable speed of the app Vx calculated in S44c:

$$\text{Executable time (sec)}=\text{data size (byte)}/\text{executable speed (byte/sec)} \quad (2)$$

Here, the data size (byte) is a total of data sizes of files accessed by the app Vx.

Next, in S44e, the app processing/data access execution time calculation unit 1213 sets a changed new executable time of the app Vx as the executable time calculated in S44e (new executable time=executable time). Next, in S44f, the app processing/data access execution time calculation unit 1213 adds the difference between the former executable time before the change and the new executable time of the app Vx to the executable time of the app Ux.

Thus adjusting the execution start time-of-day of each app within the workflow using the execution time of the app as a minimum unit can reduce the amount of calculation compared with calculating by, for example, shifting the execution start times-of-day of apps in units of minutes.

(Overview of Processing of S22d3: Adjustment of Allocation Among Multiple Workflows (FIG. 27))

Figure 53:
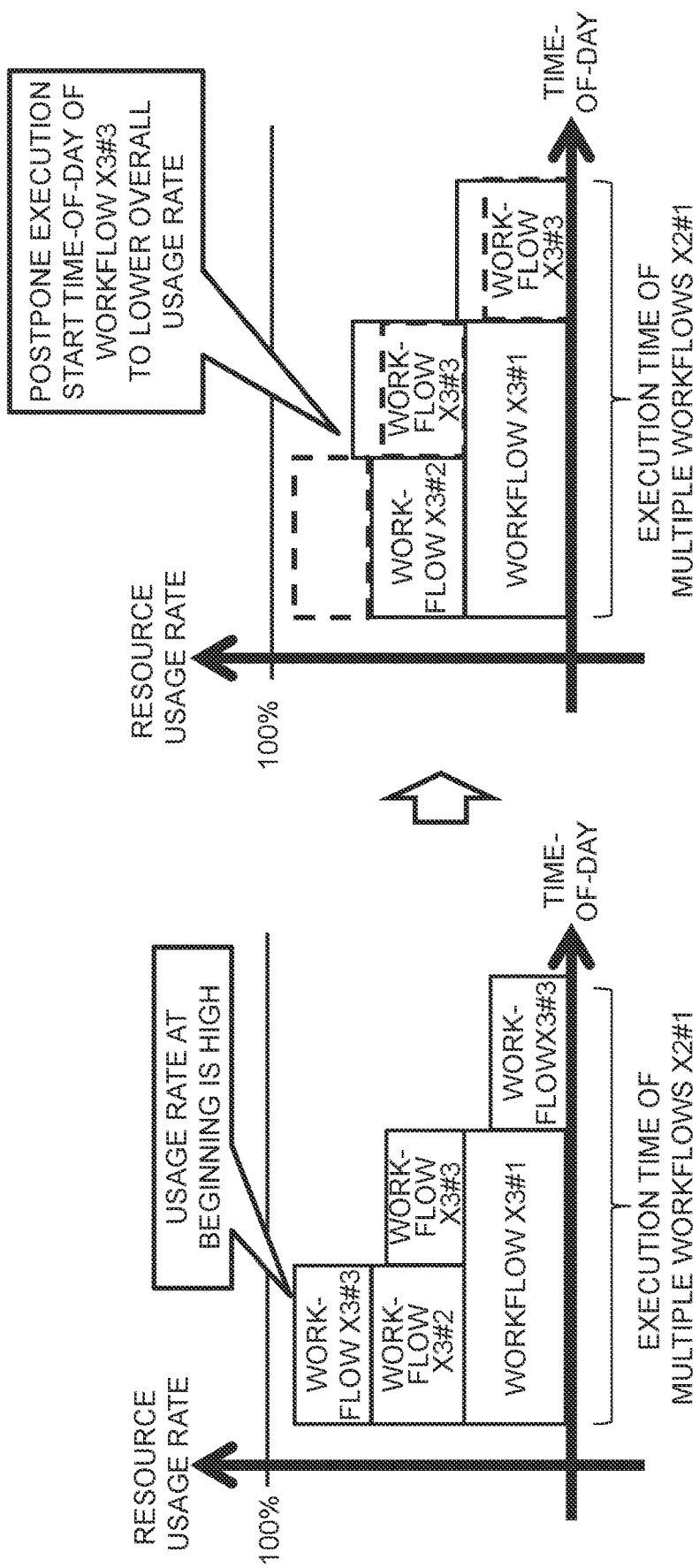
FIG. 53 is a chart for describing an overview of processing of adjustment of allocation among multiple workflows.

Before describing the detailed processing of S22d3: adjustment of allocation among multiple workflows, an overview of the processing will be described. FIG. 53 is a chart for describing an overview of the processing of S22d3: adjustment of allocation among multiple workflows.

In S22d3: adjustment of allocation among multiple workflows, to lower the resource usage rate, concurrent execution of workflows is reduced and the execution start time-of-day is postponed (the execution time is shortened). As shown in FIG. 53, in the multiple workflow X2#1, the workflows X3#1 to #3 are concurrently executed at an early stage after the start of execution, and the resource usage rate becomes close to 100%. Therefore, the execution start time-of-day of the workflow X3#3 is postponed and the execution time thereof is shortened. Meanwhile, the execution time of the entire multiple workflows X2#1 is not changed. Then, the resource usage rate during execution of the workflow X3#3 rises but is lower than 100%, and moreover, the state where the resource usage rate exceeds 100% at the early stage after the start of execution of the multiple workflow X2#1 is eliminated.

(Detailed Processing of S22d3: Adjustment of Allocation Among Multiple Workflows)

Figure 54:
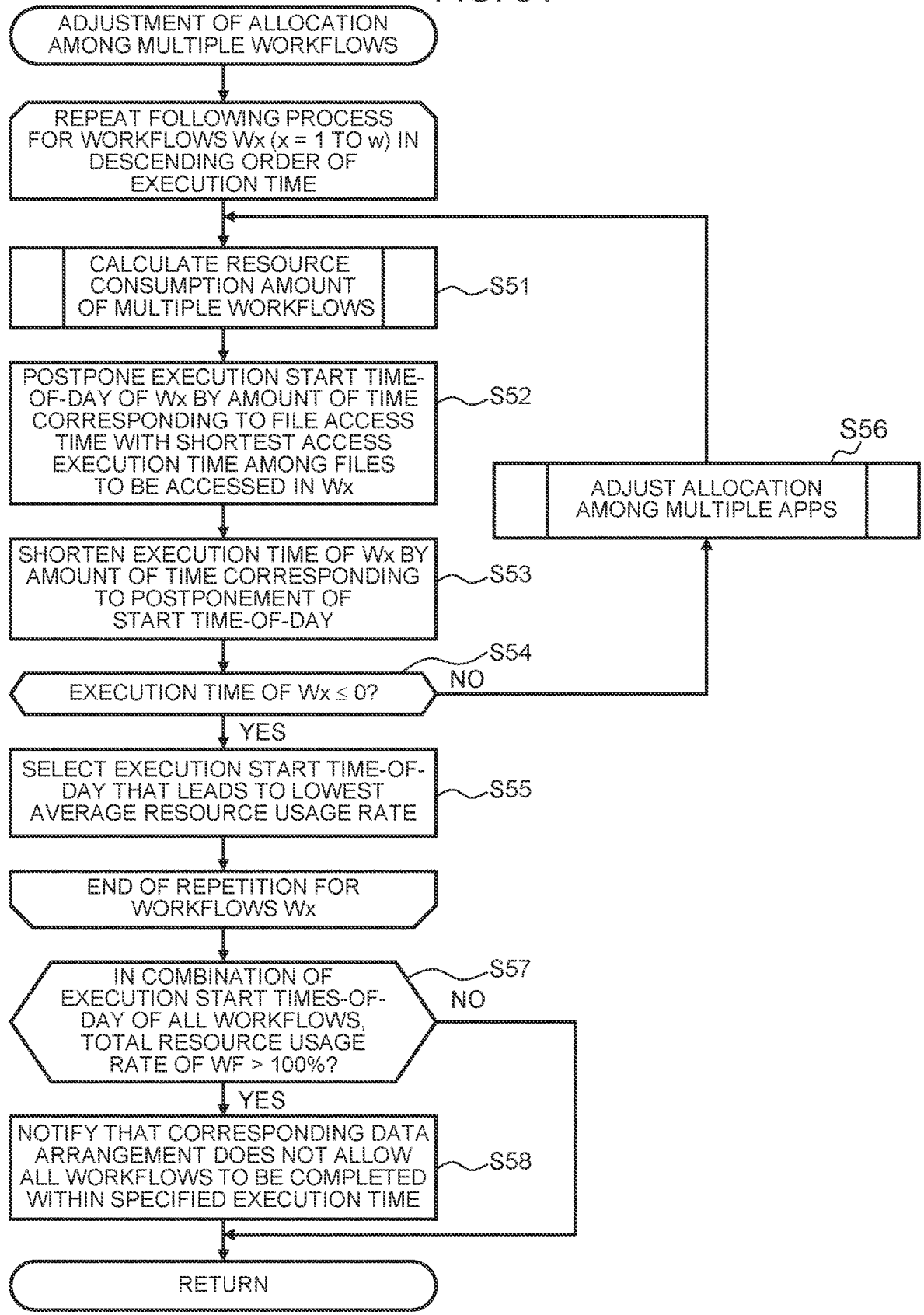
FIG. 54 is a flowchart showing an example of detailed processing of the adjustment of allocation among multiple workflows.

FIG. 54 is a flowchart showing an example of the detailed processing of S22d3: adjustment of allocation among multiple workflows (FIG. 27 and also S62 (FIG. 59)). In S22d3: adjustment of allocation among multiple workflows, while allocation of the execution time of the multiple workflows as a whole is not changed, the start times-of-day of individual workflows are postponed (the execution times of the workflows are shortened) to thereby reduce concurrence of the workflows. Following the change in the start time-of-day of each workflow, the execution time of an app in the workflow and the time of data access are adjusted such that the resource usage rate does not exceed 100%.

In S22d3: adjustment of allocation among multiple workflows, from among arrangement patterns in which multiple workflows end within an execution time limit, a combination of execution start times of the workflows that leads to the lowest average resource usage rate is selected to thereby level the usage rates of the respective resources during the execution period of the multiple workflows. When a time-of-day is found at which the resource usage rate is lowest in a workflow of which the execution start time-of-day is to be postponed, the execution start time-of-day of that workflow is regarded as determined. When postponing the execution start time-of-day of the next workflow, the execution start time-of-day of the workflow of which the execution start time-of-day has been determined is not moved.

First, the app processing/data access execution time calculation unit 1213 repeats the loop process of S51 to S56 for workflows Wx (x=1 to w) in descending order of execution time.

In S51, the app processing/data access execution time calculation unit 1213 calculates the resource consumption amounts of multiple workflows. The calculation of the resource consumption amounts of multiple workflows will be described in detail later with reference to FIG. 55.

Next, in S52, the app processing/data access execution time calculation unit 1213 postpones the execution start time-of-day of a workflow Wx in units of an access time of a file with the shortest access time among the files to be accessed in the workflow Wx.

Next, in S53, the app processing/data access execution time calculation unit 1213 shortens the execution time of the workflow Wx by an amount of time corresponding to the postponement of the execution start time-of-day of the workflow Wx. Next, in S54, the app processing/data access execution time calculation unit 1213 determines whether execution time of workflow Wx≤0. When execution time of workflow Wx≤0 (S54: YES), the app processing/data access execution time calculation unit 1213 proceeds with the processing to S55, and when execution time of workflow Wx>0 (S54: NO), the app processing/data access execution time calculation unit 1213 proceeds with the processing to S56.

In S55, the app processing/data access execution time calculation unit 1213 selects, as the execution start time-of-day of the workflow Wx, a time-of-day at which the average resource usage rate in the bases expressed by the following Formula (3) is lowest:

$$\text{Average resource usage rate} = \Sigma\text{resource usage rate}/ \text{(number of resource types} \times \text{number of bases)} \quad (3)$$

Here, the $\Sigma$ resource usage rate is the sum of the resource usage rates of all the types of resources in all the bases.

On the other hand, in S56, the app processing/data access execution time calculation unit 1213 adjusts allocation among multiple apps (FIG. 40). When S56 ends, the app processing/data access execution time calculation unit 1213 proceeds with the processing to S51.

When the loop process of S51 to S56 ends, in S57, the app processing/data access execution time calculation unit 1213 determines whether total resource usage rate of all workflows >100% in a combination of execution start times-of-day of all workflows. The total resource usage rate of all workflows is expressed by the following Formula (4):

$$\text{Total resource usage rate of all workflows} = \Sigma\text{resource usage amount/amount of all resources} \quad (4)$$

Here, $\Sigma$ represents the sum of resource usage amounts of the respective types of corresponding resources of all the workflows Wx (x=1 to w) in the corresponding base, and the amount of all resources is the amount of all resources in the corresponding base.

When total resource usage rate of all workflows >100% (S57: YES), the app processing/data access execution time calculation unit 1213 proceeds with the processing to S58, and when total resource usage rate of all workflows ≤100% (S57: NO), the app processing/data access execution time calculation unit 1213 ends S22$d$3: adjustment of allocation among multiple workflows.

In S58, the app processing/data access execution time calculation unit 1213 outputs a notification that the corresponding data arrangement does not allow all workflows to be completed within the specified execution time.

Thus adjusting the execution start time-of-day of each workflow using, as a minimum unit, the execution time of file access that can change the resource consumption amount within the workflow can reduce the amount of calculation compared with calculating by, for example, shifting the execution start time-of-day of the workflow in units of minutes.

(Detailed Processing of S51: Calculation of Resource Consumption Amount of Multiple Workflows (FIG. 54))

Figure 55:
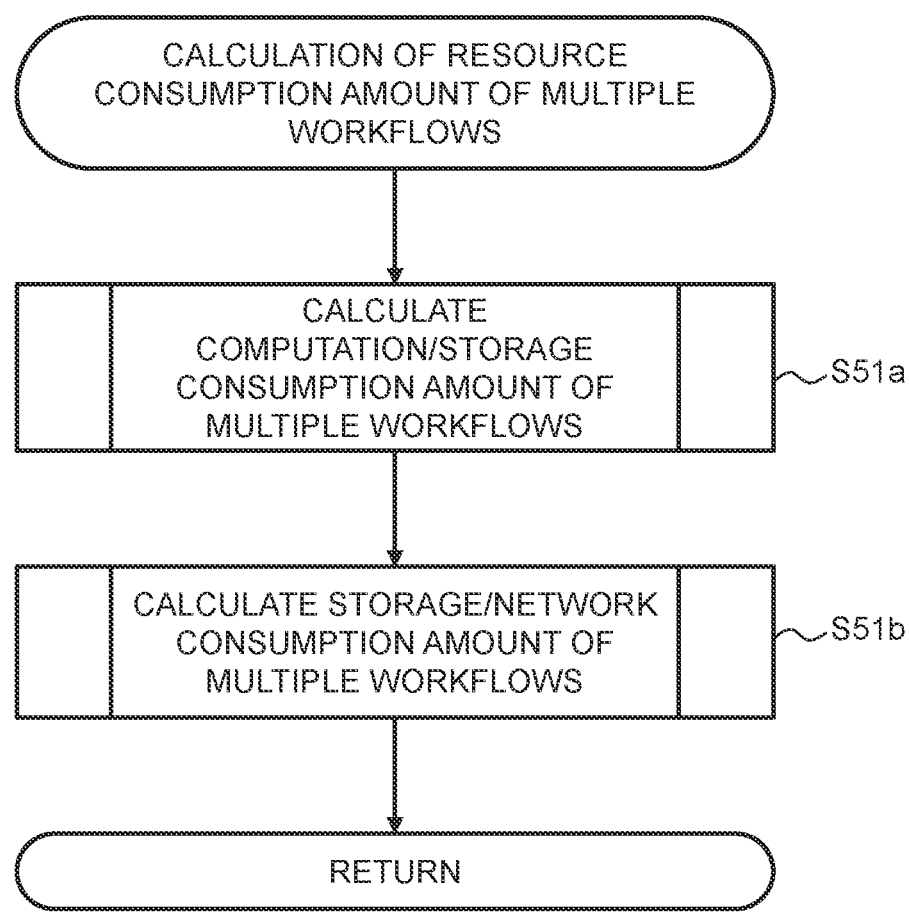
FIG. 55 is a flowchart showing an example of detailed processing of a calculation of a resource consumption amount of multiple workflows.

FIG. 55 is a flowchart showing an example of the detailed processing of S51: calculation of resource consumption amount of multiple workflows. In S51: calculation of resource consumption amount of multiple workflows, the resource consumption amount is calculated in accordance with the execution start time-of-day and the execution end time-of-day of each workflow. In the first time of calculation, the resource consumption amount is calculated on the assumption that all workflows are concurrently executed at the same time.

First, in S51$a$, the app processing/data access execution time calculation unit 1213 calculates a computation/storage consumption amount of multiple workflows. The calculation of the computation/storage consumption amount of multiple workflows will be described in detail later with reference to FIG. 56.

Next, in S51$b$, the app processing/data access execution time calculation unit 1213 calculates a storage/network consumption amount of multiple workflows. The calculation of the storage/network consumption amount of multiple workflows will be described in detail later with reference to FIG. 57.

(Detailed Processing of S51$a$: Calculation of Computation/Storage Consumption Amount of Multiple Workflows)

Figure 56:
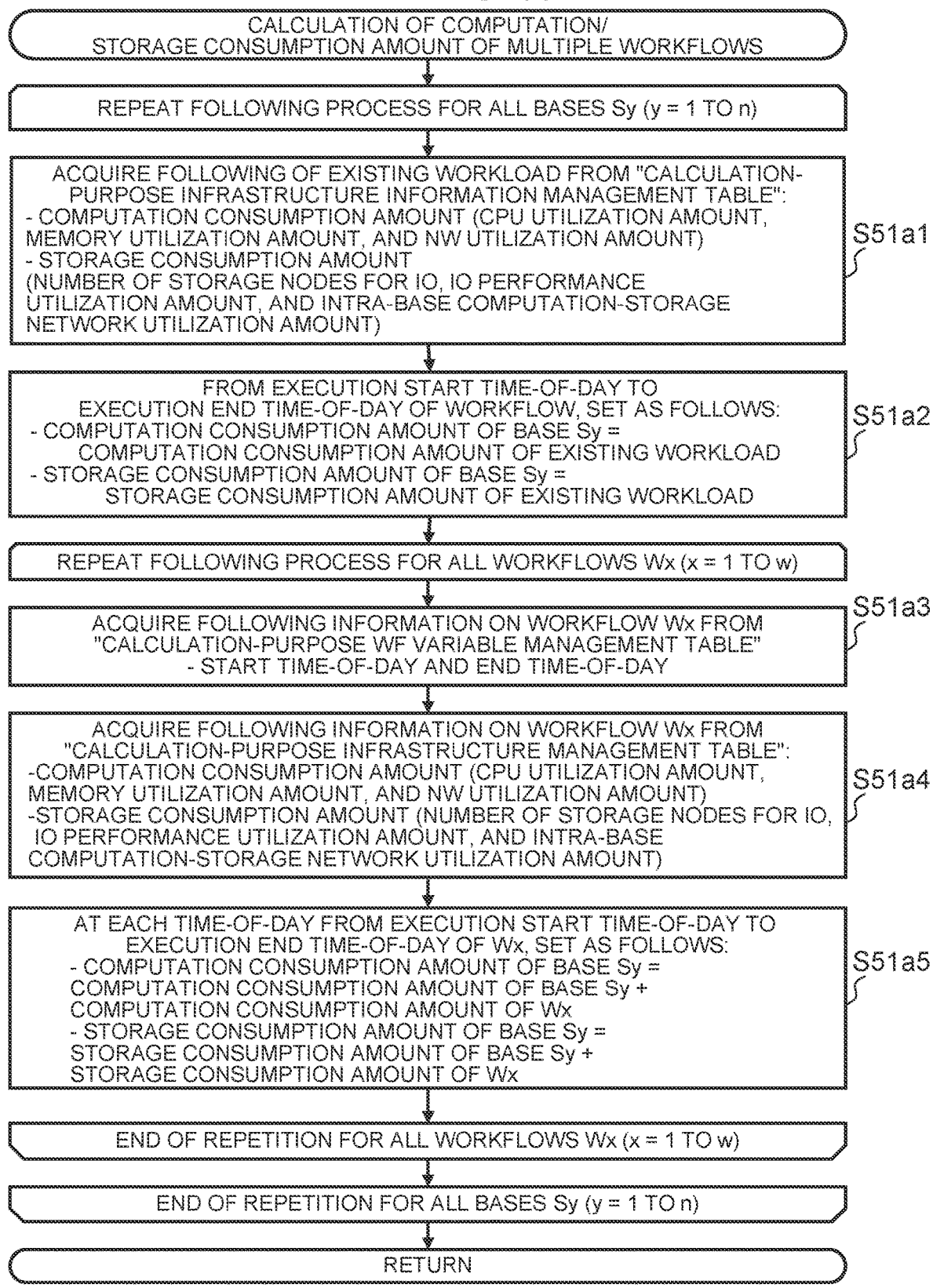
FIG. 56 is a flowchart showing an example of detailed processing of a calculation of a computation/storage consumption amount of multiple workflows.

FIG. 56 is a flowchart showing an example of the detailed processing of S51$a$: calculation of computation/storage consumption amount of multiple workflows (FIG. 55).

First, the app processing/data access execution time calculation unit 1213 repeats the loop process of S51$a$1 to S51$a$5 for all the bases Sy (y=1 to n).

In S51$a$1, the app processing/data access execution time calculation unit 1213 acquires the following information on the existing workload from the calculation-purpose infrastructure information management table 1224 (FIG. 12). The app processing/data access execution time calculation unit 1213 acquires the computation consumption amount (the CPU utilization amount, the memory utilization amount, and the NW utilization amount) and the storage consumption amount (the number of storage nodes for IO, the IO performance utilization amount, and the intra-base computation-storage network utilization amount).

Next, in S51$a$2, the app processing/data access execution time calculation unit 1213 sets as follows from the execution start time-of-day to the execution end time-of-day of the workflow. Computation consumption amount of base Sy=computation consumption amount of existing workload; and storage consumption amount of base Sy=storage consumption amount of existing workload.

Next, the app processing/data access execution time calculation unit 1213 repeats the loop process of S51$a$3 to S51$a$5 for all workflows Wx (x=1 to w).

In S51$a$3, the app processing/data access execution time calculation unit 1213 acquires information on the start time-of-day and the end time-of-day of the workflow Wx from the calculation-purpose WF variable management table 1222 (FIGS. 10A and 10B). Next, in S51$a$4, the app processing/data access execution time calculation unit 1213 acquires the following information on the workflow Wx from the calculation-purpose infrastructure information management table 1224 (FIG. 12). The app processing/data access execution time calculation unit 1213 acquires the computation consumption amount (the CPU utilization amount, the memory utilization amount, and the NW utilization amount) and the storage consumption amount (the number of storage nodes for IO, the IO performance utilization amount, and the intra-base computation-storage network utilization amount).

Next, in S51$a$5, the app processing/data access execution time calculation unit 1213 sets, from the execution start time-of-day to the execution end time-of-day of the workflow Wx: computation consumption amount of base Sy=computation consumption amount of base Sy+computation consumption amount of workflow Wx; and storage consumption amount of base Sy=storage consumption amount of base Sy+storage consumption amount of workflow Wx.

(Detailed Processing of S51$b$: Calculation of Storage/Network Consumption Amount of Multiple Workflows (FIG. 55))

Figure 57:
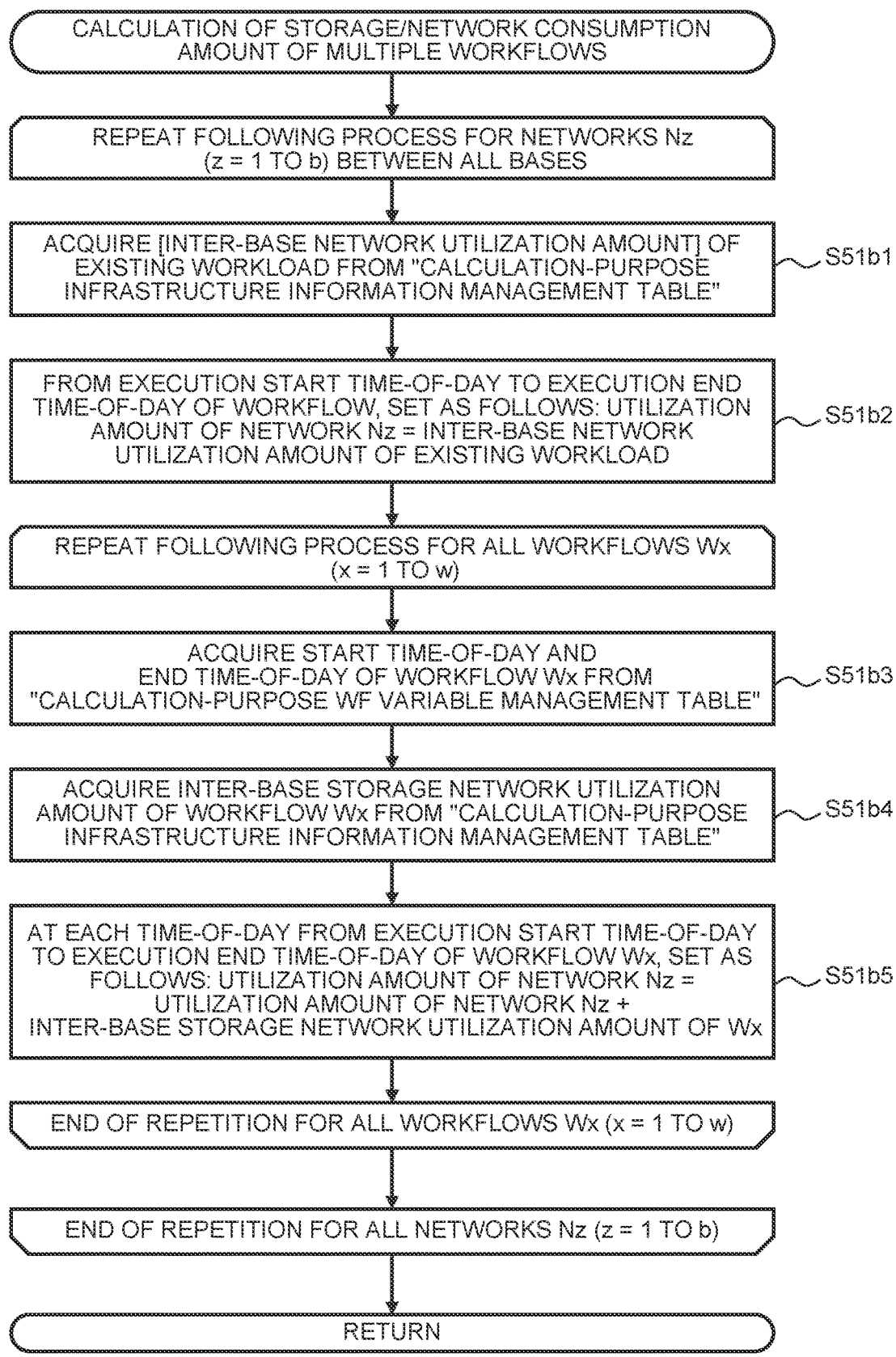
FIG. 57 is a flowchart showing an example of detailed processing of a calculation of a storage/network consumption amount of multiple workflows.

FIG. 57 is a flowchart showing an example of the detailed processing of S51$b$: calculation of storage/network consumption amount of multiple workflows.

First, the app processing/data access execution time calculation unit 1213 repeats the loop process of S51$b$1 to S51$b$5 for networks Nz (z=1 to b) between all pairs of bases among all the bases Sy (y=1 to n).

In S51$b$1, the app processing/data access execution time calculation unit 1213 acquires [inter-base network utilization amount] of the existing workload between two bases being currently processed from the calculation-purpose infrastructure information management table 1224 (FIG. 12).

Next, in S51*b*2, the app processing/data access execution time calculation unit 1213 sets, from the execution start time-of-day to the execution end time-of-day of the workflow: utilization amount of network Nz=inter-base network utilization amount of existing workload.

Next, the app processing/data access execution time calculation unit 1213 repeats the loop process of S51*b*3 to S51*b*5 for all workflows Wx (x=1 to w).

In S51*b*3, the app processing/data access execution time calculation unit 1213 acquires the workflow start time-of-day and the workflow end time-of-day of the workflow Wx from the calculation-purpose WF variable management table 1222 (FIGS. 10A and 10B). Next, in S51*b*4, the app processing/data access execution time calculation unit 1213 acquires the inter-base storage network utilization amount of the workflow Wx from the calculation-purpose infrastructure information management table 1224 (FIG. 12).

Next, in S51*b*5, the app processing/data access execution time calculation unit 1213 sets, from the execution start time-of-day to the execution end time-of-day of the workflow Wx: utilization amount of network Nz=utilization amount of network Nz+inter-base storage network utilization amount of workflow Wx.

(Overview of Processing of S22*d*4: Adjustment of Allocation for Data Rearrangement/Workflow (FIG. 27))

Figure 58:
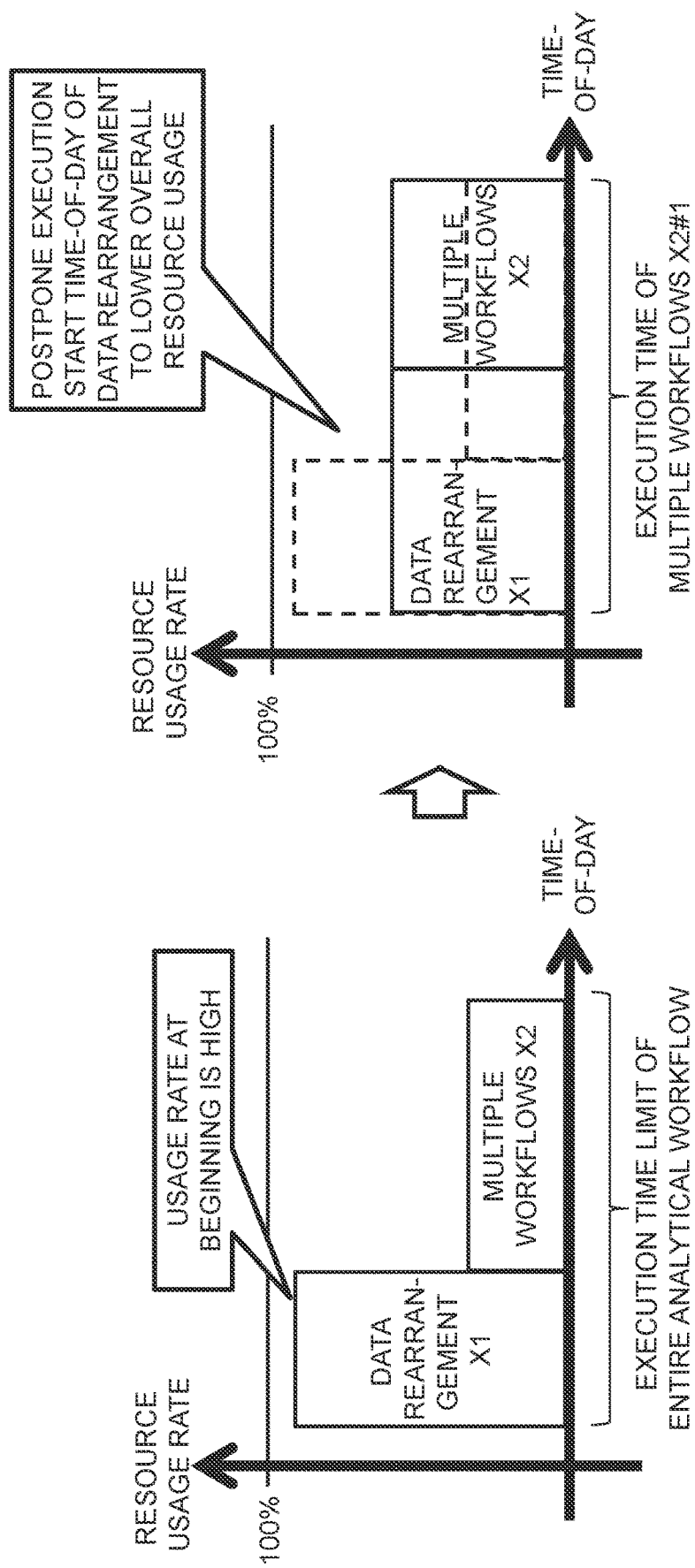
FIG. 58 is a chart for describing an overview of processing of adjustment of allocation for data rearrangement/workflow.

Before describing the detailed processing of S22*d*4: adjustment of allocation for data rearrangement/workflow, an overview of the processing will be described. FIG. 58 is a chart for describing an overview of the processing of S22*d*4: adjustment of allocation for data rearrangement/workflow.

In S22*d*4: adjustment of allocation for data rearrangement/workflow, the execution end time-of-day of the data rearrangement X1 is postponed (the execution time thereof is extended) to lower the resource usage rate. As shown in FIG. 58, in the analytical workflow as a whole, the resource usage rate is close to 100% and high due to execution of the data rearrangement X1. Therefore, the execution end time-of-day of the data rearrangement X1 is postponed and the execution time thereof is shortened, and at the same time the execution start time-of-day of the multiple workflows X2 is postponed as with the execution end time-of-day of the data rearrangement X1. Meanwhile, the execution time limit of the entire analytical workflow is observed. Then, the resource usage rate during execution of the multiple workflows X2 rises but is lower than 100%, and moreover, the resource usage rate during execution of the data rearrangement X1 that has been close to 100% and high is lowered. Thus, the resource usage rate is leveled within the execution time limit of the analytical workflow.

(Detailed Processing of S22*d*4: Adjustment of Allocation for Data Rearrangement/Workflow (FIG. 27))

Figure 59:
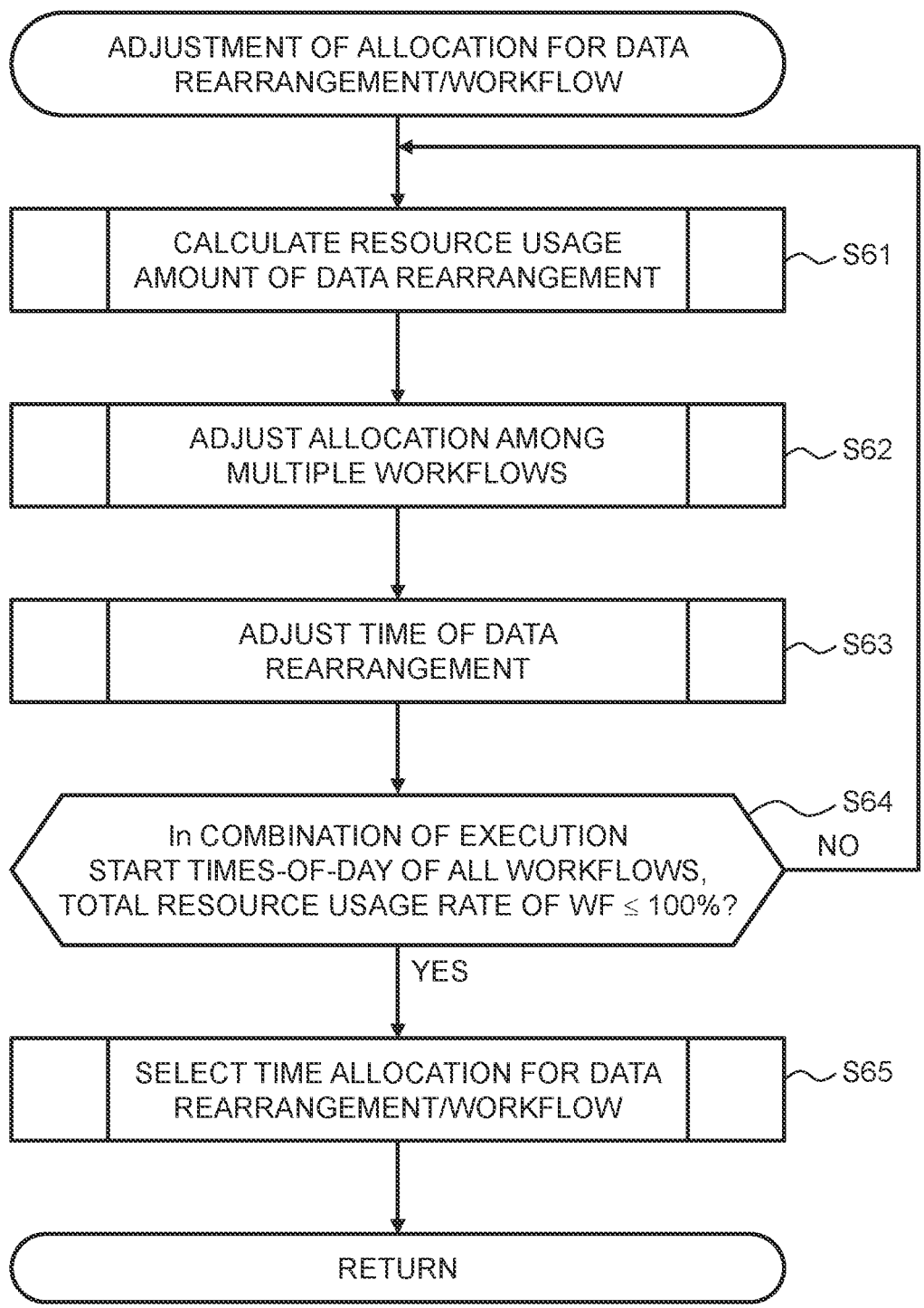
FIG. 59 is a flowchart showing an example of detailed processing of the adjustment of allocation for data rearrangement/workflow.

FIG. 59 is a flowchart showing an example of the detailed processing of S22*d*4: adjustment of allocation for data rearrangement/workflow.

First, in S61, the app processing/data access execution time calculation unit 1213 calculates the resource usage amount of data rearrangement. The calculation of the resource usage amount of data rearrangement will be described in detail later with reference to FIG. 60. Next, in S62, the app processing/data access execution time calculation unit 1213 adjusts allocation for multiple workflows. The adjustment of allocation for multiple workflows have been described in detail with reference to FIG. 54. Next, in S63, the app processing/data access execution time calculation unit 1213 adjusts the time of data rearrangement. The adjustment of the time of data rearrangement will be described in detail later with reference to FIG. 61.

Next, in S64, the app processing/data access execution time calculation unit 1213 determines whether total resource usage rate of workflows ≤100% in a combination of the execution start times-of-day of all workflows. When total resource usage rate of workflows S 100% in the combination of the execution start times-of-day of all workflows (S64: YES), the app processing/data access execution time calculation unit 1213 proceeds with the processing to S65, and when total resource usage rate of workflows >100% (S64: NO), the app processing/data access execution time calculation unit 1213 returns in the processing to S61.

In S65, the app processing/data access execution time calculation unit 1213 selects a time allocation for data rearrangement/workflow. The selection of time allocation for data rearrangement/workflow will be described in detail later with reference to FIG. 62.

(Detailed Processing of S61: Calculation of Resource Usage Amount of Data Rearrangement (FIG. 59))

Figure 60:
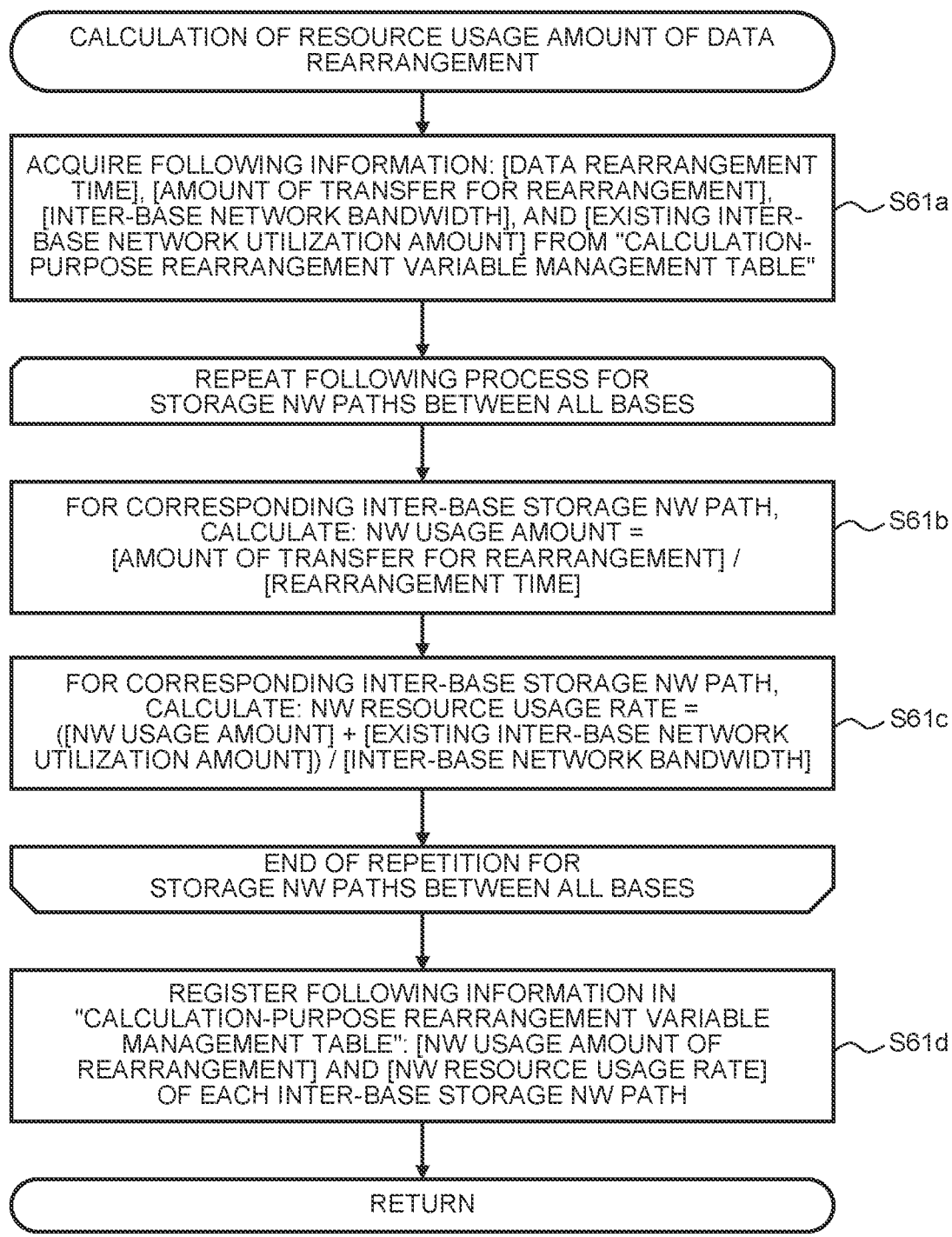
FIG. 60 is a flowchart showing an example of detailed processing of a calculation of a resource usage amount of data rearrangement.

FIG. 60 is a flowchart showing an example of the detailed processing of S61: calculation of resource usage amount of data rearrangement.

First, in S61*a*, the app processing/data access execution time calculation unit 1213 acquires information [data rearrangement time], [amount of transfer for rearrangement], [inter-base network bandwidth], and [existing inter-base network utilization amount] from the calculation-purpose rearrangement variable management table 1223 (FIG. 11).

Next, the app processing/data access execution time calculation unit 1213 repeats the loop process of S61*b* to S61*c* for storage NW paths between all pairs of bases. In S61*b*, the app processing/data access execution time calculation unit 1213 calculates, for the corresponding network Nz: NW usage amount=[amount of transfer for rearrangement]/[rearrangement time]. Next, in S61*c*, the app processing/data access execution time calculation unit 1213 calculates, for the corresponding network Nz: NW resource usage rate= ([NW usage amount]+[existing inter-base network utilization amount])/[inter-base network bandwidth].

When the loop process of S61*b* to S61*c* ends, in S61*d*, the app processing/data access execution time calculation unit 1213 registers [NW usage amount of rearrangement] (calculated in S61*a*) and [NW resource usage rate] (calculated in S61*c*) of each inter-base storage NW path in the calculation-purpose rearrangement variable management table 1223 (FIG. 11).

(Detailed Processing of S63: Time Adjustment of Data Rearrangement (FIG. 59))

Figure 61:
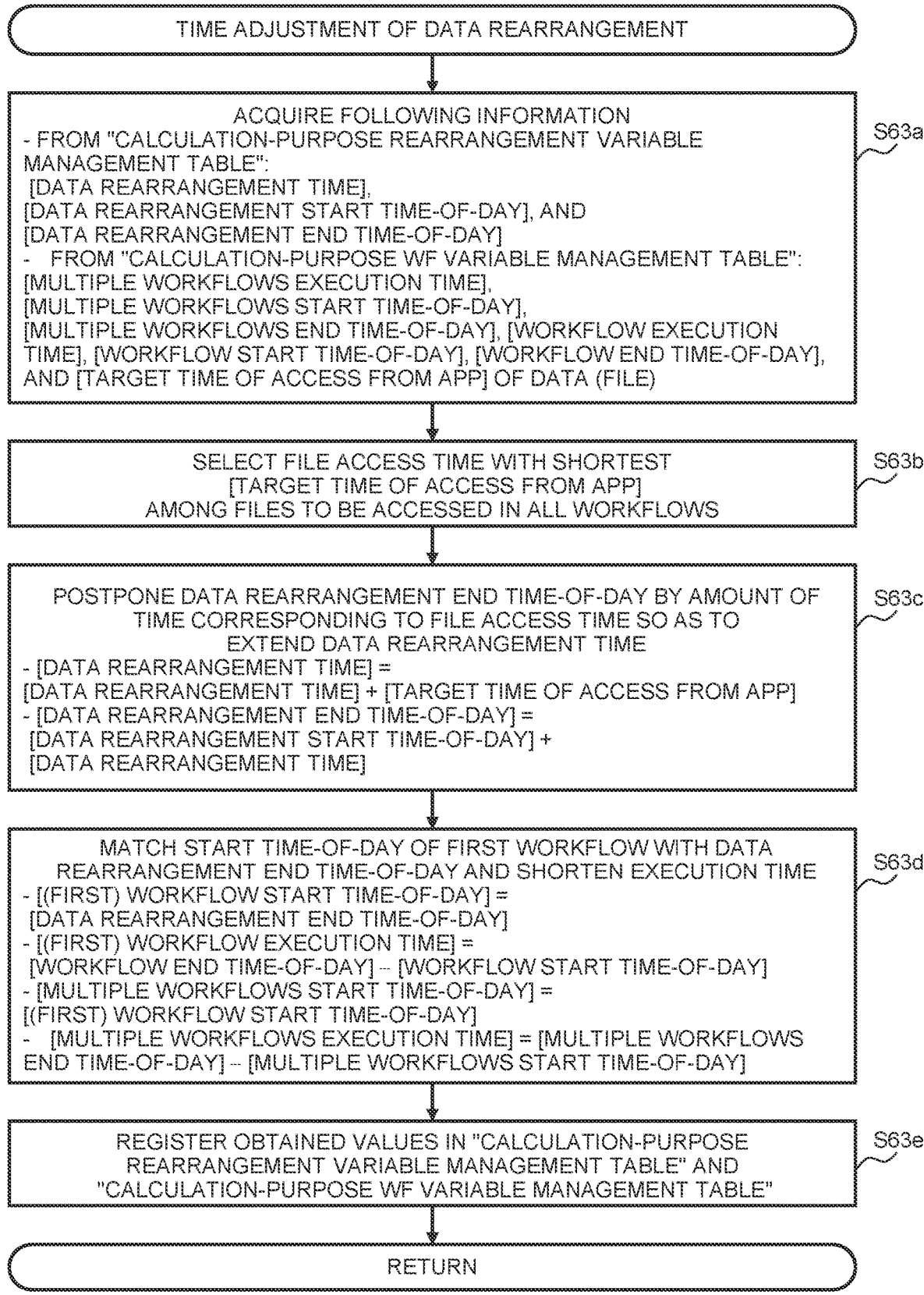
FIG. 61 is a flowchart showing an example of detailed processing of time adjustment of data rearrangement.

FIG. 61 is a flowchart showing an example of the detailed processing of S63: time adjustment of data rearrangement.

First, in S63*a*, the app processing/data access execution time calculation unit 1213 acquires the following information. The app processing/data access execution time calculation unit 1213 acquires [data rearrangement time], [data rearrangement start time-of-day], and [data rearrangement end time-of-day] from the calculation-purpose rearrangement variable management table 1223 (FIG. 11), and [multiple workflows execution time], [multiple workflows start time-of-day], [multiple workflows end time-of-day], [workflow execution time], [workflow start time-of-day], [workflow end time-of-day], and [target time of access from app] of data (file) from the calculation-purpose WF variable management table 1222 (FIGS. 10A and 10B).

Next, in S63b, the app processing/data access execution time calculation unit 1213 selects a file access time with the shortest [target time of access from app] among files to be accessed in all workflows with reference to the calculation-purpose WF variable management table 1222 (FIGS. 10A and 10B). Next, in S63c, the app processing/data access execution time calculation unit 1213 postpones the data rearrangement end time-of-day in units of the shortest file access time selected in S63b so as to extend the data rearrangement time. Specifically, the app processing/data access execution time calculation unit 1213 sets: [data rearrangement time]=[data rearrangement time]+[target time of access from app], and then sets: [data rearrangement end time-of-day]=[data rearrangement start time-of-day]+ [data rearrangement time].

Next, in S63d, the app processing/data access execution time calculation unit 1213 matches the start time-of-day of the first workflow among all the workflows with the data rearrangement end time-of-day and shortens the execution time of the first workflow. Specifically, the app processing/ data access execution time calculation unit 1213 sets: [(first) workflow start time-of-day]=[data rearrangement end time-of-day], and then sets: [(first) workflow execution time]= [workflow end time-of-day]−[workflow start time-of-day]; [multiple workflows start time-of-day]=[(first) workflow start time-of-day]; and [multiple workflows execution time] =[multiple workflows end time-of-day]−[multiple workflows start time-of-day].

Next, in S63e, the app processing/data access execution time calculation unit 1213 registers the calculation result of S63c in the calculation-purpose rearrangement variable management table 1223 (FIG. 11) and registers the calculation result of S63d in the calculation-purpose WF variable management table 1222 (FIGS. 10A and 10B).

(Detailed Processing of S65: Selection of Time Allocation for Data Rearrangement/Workflow (FIG. 59))

Figure 62:
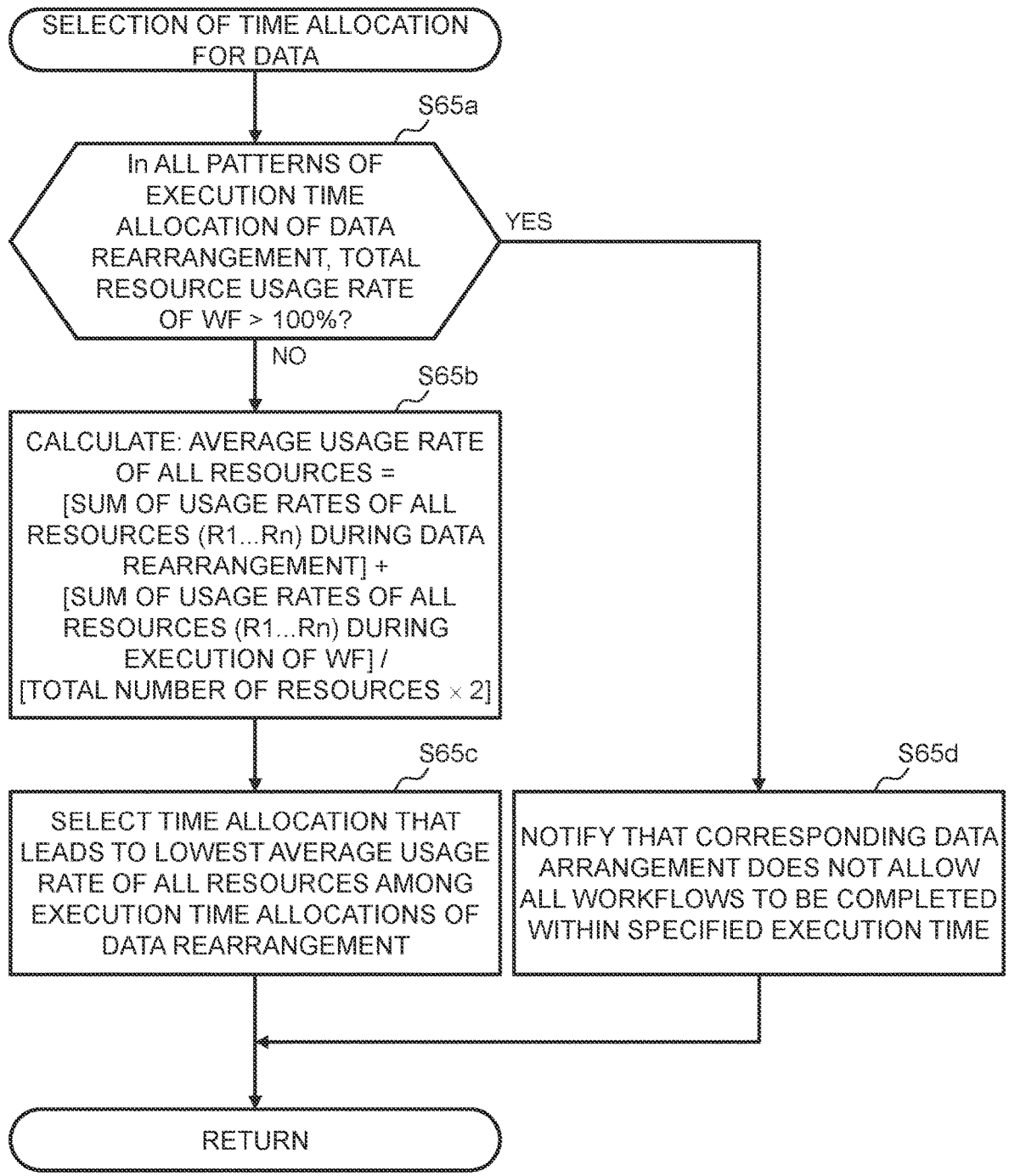
FIG. 62 is a flowchart showing an example of detailed processing of selection of time allocation for data rearrangement/workflow

FIG. 62 is a flowchart showing an example of the detailed processing of S65: selection of time allocation for data rearrangement/workflow.

First, in S65a, the app processing/data access execution time calculation unit 1213 determines whether total resource usage rate of workflows >100% in all patterns of execution time allocation of data rearrangement. When total resource usage rate of workflows >100% in all patterns of execution time allocation of data rearrangement (S65a: YES), the app processing/data access execution time calculation unit 1213 proceeds with the processing to S65d, and when total resource usage rate of workflows ≤100% in at least one pattern of execution time allocation of data rearrangement (S65a: NO), the app processing/data access execution time calculation unit 1213 proceeds with the processing to S65b.

In S65b, the app processing/data access execution time calculation unit 1213 calculates the average usage rate of all resources by the following Formula (5):

$$\text{Average usage rate of all resources}=\Sigma(R1j+\Sigma R2j)/(\text{number of all resources}\times 2) \quad (5)$$

Here, Σ represents the sum of the resource usage rates of all resources j; R1j represents the resource usage rates of the resources j during data rearrangement; and R2j represents the resource usage rates of the resources j during execution of workflows.

Next, in S65c, the app processing/data access execution time calculation unit 1213 selects the time allocation that leads to the lowest average usage rate of all the resources calculated in S65b among the execution time allocations of data rearrangement.

On the other hand, in S65d, the app processing/data access execution time calculation unit 1213 outputs a notification that the corresponding data arrangement does not allow all the workflows to be completed within the specified execution time.

(Detailed Processing of S26: Execution of Arrangement Change (FIG. 22))

Figure 63:
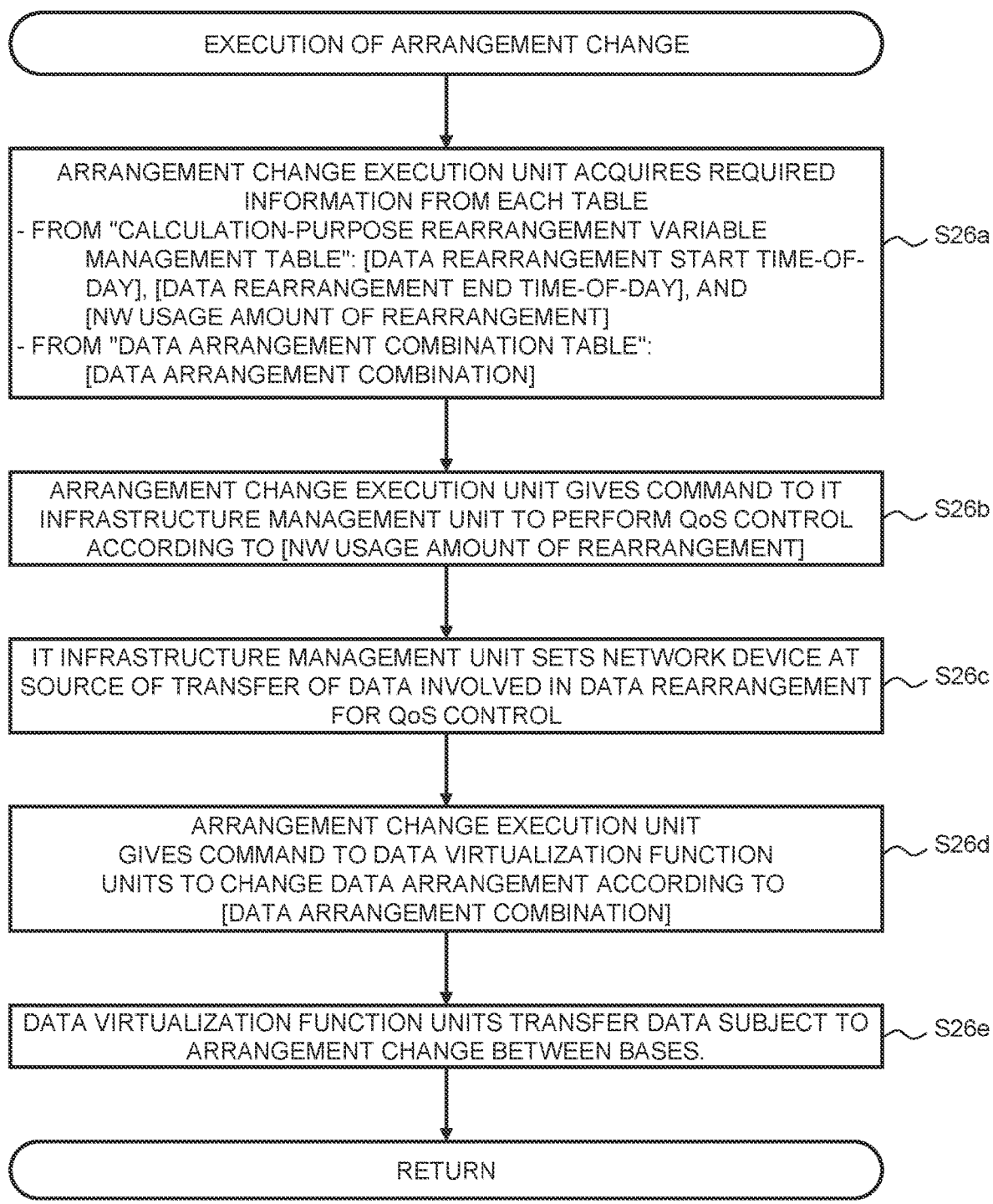
FIG. 63 is a flowchart showing an example of detailed processing of execution of an arrangement change.

FIG. 63 is a flowchart showing an example of the detailed processing of S26: execution of arrangement change.

First, in S26a, the arrangement change execution unit 1214 (FIG. 3) of the allocation control unit 121 acquires required information from tables. The arrangement change execution unit 1214 acquires [data rearrangement start time-of-day], [data rearrangement end time-of-day], and [NW usage amount of rearrangement] from the calculation-purpose rearrangement variable management table 1223 (FIG. 11), and [data arrangement combination] corresponding to the data arrangement selected in S22e of the calculation of data arrangement combination (FIG. 23) from the data arrangement combination table 1221 (FIG. 9).

Next, in S26b, the arrangement change execution unit 1214 gives a command to the IT infrastructure management unit 123 (FIG. 1) of the management server 10 to perform quality of service (QoS) control of the inter-base storage/ network according to [NW usage amount of rearrangement] acquired from the calculation-purpose rearrangement variable management table 1223 (FIG. 11) in S26a. Next, in S26c, the IT infrastructure management unit 123 sets network equipment (including the storage NW-SW 200b) in the base that is the source of transfer of data involved in data rearrangement for QoS control in accordance with the command in S26b.

Next, in S26d, after completion of setting for QoS, the arrangement change execution unit 1214 gives a command to the data virtualization function units 223, 323 in the bases involved in data rearrangement to execute a change in the data arrangement according to [data arrangement combination] acquired from the data arrangement combination table 1221 (FIG. 9) in S26a. Next, in S26e, the data virtualization function units 223, 323 in the bases involved in data rearrangement transfer the data subject to the arrangement change between the bases according to the command of S26d.

(Detailed Processing of S27: Execution of Analytical Workflow (FIG. 22))

Figure 64:
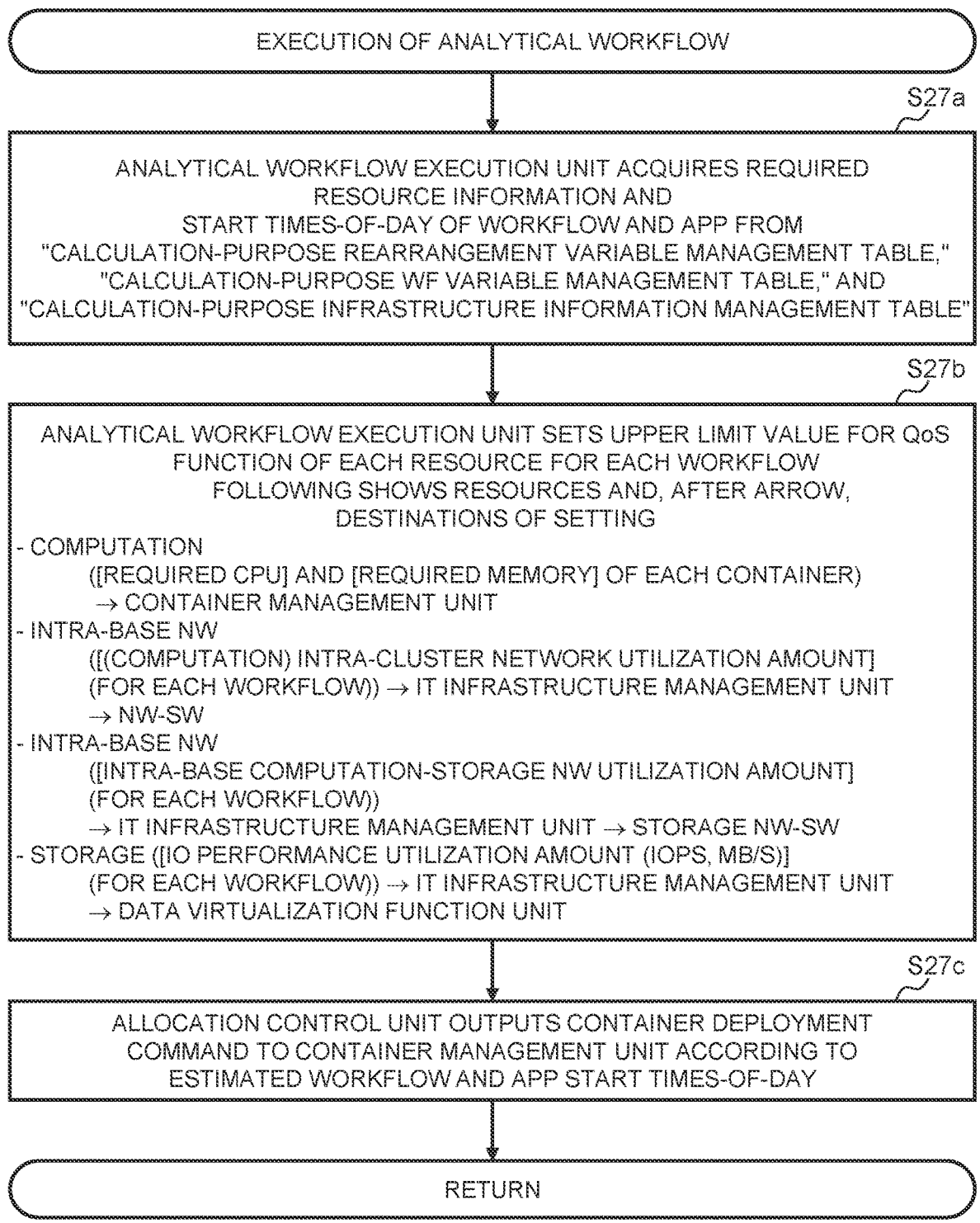
FIG. 64 is a flowchart showing an example of detailed processing of execution of an analytical workflow.

FIG. 64 is a flowchart showing an example of the detailed processing of S27: execution of analytical workflow.

First, in S27a, the analytical workflow execution unit 1215 (FIG. 3) of the allocation control unit 121 acquires resource information required for execution of the analytical workflow and the start times-of-day of the workflows and the apps from the calculation-purpose rearrangement variable management table 1223 (FIG. 11), the calculation-purpose WF variable management table 1222 (FIGS. 10A and 10B), and the calculation-purpose infrastructure information management table 1224 (FIG. 12).

Next, in S27b, the analytical workflow execution unit 1215 gives a command to the IT infrastructure management unit 123 to set upper limit values for the QoS function of each resource for each workflow. Specifically, for computation ([required CPU] and [required memory] of each container), upper limit values of QoS are set for the container management units 222, 322. For the intra-base computation NW ([(computation) intra-cluster network utilization amount] (for each workflow) (see FIG. 8, FIG. 12)), an upper limit value of QoS is set for the NW-SW 200a through the IT infrastructure management unit 123. For the intra-base computation-storage NW ([intra-base computation-storage network utilization amount] (for each workflow) (see FIG. 8, FIG. 12)), an upper limit value of QoS is set for the storage NW-SW 200b through the IT infrastructure management unit 123. For storage ([IO performance utilization amount (IOPS, MB/s)] (for each workflow) (see FIG. 10A, FIG. 10B, FIG. 12), upper limit values of QoS are set for the data virtualization function units 223, 323 through the IT infrastructure management unit 123. For the inter-base storage NW, an upper limit value of QoS is set for the storage NW-SW 200b through the IT infrastructure management unit 123.

Next, in S27c, after completion of setting for QoS, the allocation control unit 121 outputs a container deployment command to the container management units 222, 322 according to the start times-of-day of the workflows and the apps acquired in S27a.

In the above-described embodiment, the execution time of each app and data access is calculated based on the order of execution and the number of times of execution of each app and data access acquired from the workflow editor (flow-based programing function unit 122) Among all patterns of data arrangement combinations of data to the bases that allow execution of all the workflows to be completed within the specified time, a data arrangement that leads to the lowest average of usage rates of all resources in all the bases is determined. Further, QoS control (specification of maximum performance and minimum performance) is performed such that individual apps and data accesses do not excessively consume a certain resource. Under these preconditions, the execution time of all the workflows is estimated.

It has been hitherto impossible to predict the execution time of running multiple apps in an infrastructure (an on-premise, a cloud) due to lack of sharing of information on the execution start and end and the execution time of apps and data access between the apps and the infrastructure. This inconvenience is more significant in a situation where apps are executed across multiple infrastructures as in a multi-cloud or a hybrid cloud. With this in mind, in the above-described embodiment, information on apps is acquired on the infrastructure side and the execution times of workflows are predicted to thereby efficiently deploy the apps and the data in each infrastructure and promptly streamline the resource processing.

Thus, the above-described embodiment offers advantages in that an analysis ends within a user-specified time as data arrangement is optimized for the analytical workflow, and in that an opening is created in the utilization situation of infrastructure resources, allowing the infrastructure to be effectively utilized for other workloads.

Although the present disclosure has been described with reference to example embodiments, those skilled in the art will recognize that various changes and modifications may be made in form and detail without departing from the spirit and scope of the claimed subject matter. For example, the foregoing embodiment has been described in detail to describe the present disclosure in an easily understandable manner, and is not necessarily limited to an embodiment that includes all the components described. As long as no inconsistency arises, some of the components of one embodiment can be substituted by components of another embodiment, or components of one embodiment can be added to components of another embodiment. For some of the components of each embodiment, the components can be increased in number, omitted, substituted, integrated, or dispersed. In addition, the components and the processes shown in the embodiment can be dispersed, integrated, or exchanged as necessary based on processing efficiency or implementation efficiency.

What is claimed is:

1. An information infrastructure management method that manages a computing machine having a computational resource for executing a workflow and a storage resource communicably coupled to the computing machine, wherein:
a management server having a processor and a memory has a workflow editing function of creating the workflow based on an order of execution and a number of times of execution of applications executed in the workflow, an order of execution and a number of times of execution of data access from the applications to data stored in the storage resource, and a result of editing of an execution time limit of the workflow by a user;
the method comprises the following processes executed by the management server:
acquiring, from the workflow editing function, an order of execution and a number of times of execution of the applications and an order of execution and a number of times of execution of data access from the applications; and
for each of the applications:
calculating a processing speed of the application by dividing a total data size of the data access by a processing time of the application;
inputting the calculated processing speed into a computational resource model that models a relationship between the processing speed and an amount of the computational resource used, to thereby calculate a required amount of the computational resource required to execute the application;
when a usage rate of the computational resource based on the required amount and an existing load on the computational resource within the execution time limit exceeds a computational resource upper limit, inputting an available capacity of the computational resource obtained by subtracting the existing load from an upper limit amount of the computational resource into the computational resource model, to thereby calculate a first executable time during which the application is executable based on the available capacity of the computational resource; and
setting a target execution time of the application in executing the workflow as the first executable time, and making an adjustment of adding an extension time of the target execution time according to the first executable time to a target execution time of another of the applications that does not exceed the computational resource upper limit so as to postpone an end time-of-day of the application and postpone a start time-of-day of the other application.

2. The information infrastructure management method according to claim 1, comprising the following processes executed by the management server for each of the applications:
inputting the calculated processing speed into an access characteristics model that models a relationship between the processing speed and access performance of the storage resource, to thereby calculate required access performance of the storage resource required to execute the application;

when a usage rate of the storage resource based on the required access performance and an existing load on the storage resource within the execution time limit exceeds a storage resource upper limit, inputting an available capacity of the storage resource obtained by subtracting the existing load from an upper limit amount of the storage resource into the access characteristics model, to thereby calculate a second executable time during which the application is executable based on achievable access performance of the storage resource; and setting a target execution time of the application in executing the workflow as the second executable time, and making an adjustment of adding an extension time of the target execution time according to the second executable time to a target execution time of another of the applications that does not exceed the storage resource upper limit so as to postpone the end time-of-day and postpone the start time-of-day.

3. The information infrastructure management method according to claim 2, wherein:

a plurality of computing machines is arranged at a plurality of bases, and the storage resources in the respective bases are coupled to one another through a network; and the method comprises the following processes executed by the management server:

acquiring base information on the computational resource in which applications to be executed in the workflow are arranged and on the storage resource in which data to be accessed by the applications is arranged; and creating a plurality of arrangement patterns for arranging the data in the storage resources of the respective bases based on an order of execution and a number of times of execution of the applications, an order of execution and a number of times of execution of the data access, and the base information; and as for all those of the plurality of arrangement patterns that allow execution of the workflow to be completed within the execution time limit, for each of the bases and each of the storage resources:

inputting the required access performance, the base information on the applications, and the base information on the storage resource in which the data is stored into a storage resource performance model that models a relationship between access performance of the storage resource between two of the bases through the network and each of a network bandwidth of the network between these bases and a number of nodes of the storage resource, to thereby calculate a required bandwidth of the network between the bases and a required number of nodes of the storage resource that are required to execute the applications;

when a usage rate of a network bandwidth of the storage resource based on the required bandwidth and an existing load on the storage resource within the execution time limit exceeds a bandwidth upper limit, inputting an available capacity of the network bandwidth obtained by subtracting the existing load from an upper limit amount of the network bandwidth into the storage resource performance model, to thereby calculate a third executable time during which the application is executable based on achievable access performance of the network; and setting a target execution time of the application in executing the workflow as the third executable time, and making an adjustment of adding an extension time of the target execution time according to the third executable time to a target execution time of another of the applications that does not exceed the bandwidth upper limit so as to postpone the end time-of-day and postpone the start time-of-day.

4. The information infrastructure management method according to claim 3, wherein:

the workflow includes a plurality of workflows; and the method comprises the following process executed by the management server: repeating a process of postponing an execution start time-of-day of each of the plurality of workflows in units of a shortest data access execution time and shortening an execution time of each workflow by an amount of time corresponding to the postponement of the execution start time-of-day, and then selecting the execution time that leads to a lowest average of all usage rates of resources including at least one of the computational resource, the storage resource, and the network during execution of the plurality of workflows.

5. The information infrastructure management method according to claim 4, comprising the following processes executed by the management server for each of the plurality of arrangement patterns:

calculating a usage rate of the network bandwidth in a case where rearrangement of the data is executed between two of the bases through the network during a rearrangement time from a rearrangement start time-of-day to a rearrangement end time-of-day according to the arrangement pattern; and when the usage rate exceeds an upper limit, repeating a process of postponing the rearrangement end time-of-day in units of a shortest access time of access from the application to the data executed in the plurality of workflows and extending the rearrangement time by an amount of time corresponding to the postponement of the rearrangement end time-of-day, and then selecting the rearrangement time that leads to a lowest average of all usage rates of the resources during execution of rearrangement of the data and during execution of the plurality of workflows.

6. The information infrastructure management method according to claim 5, comprising the following process executed by the management server: selecting a predetermined arrangement pattern from among the plurality of arrangement patterns that leads to a lowest average of all usage rates of the resources.

7. The information infrastructure management method according to claim 6, wherein:

the management server has:

a virtualization function of the computing machine that performs virtualization of data in the storage resource in each of the bases coupled to one another through the network; and a management function of managing the resource; and the method comprises the following processes executed by the management server:

giving a command to the management function to set the resource for quality of service (QOS) in rearranging the data; and after the resource has been set for QoS, giving a command to the virtualization function to execute rearrangement of the data according to the predetermined arrangement pattern.

8. The information infrastructure management method according to claim 7, comprising the following processes executed by the management server:
after the data has been rearranged according to the predetermined arrangement pattern, giving a command to the management function to set the resource for QoS for each of the plurality of workflows; and
after the resource has been set for QoS for each of the plurality of workflows, starting to execute the workflow.

9. A management server of an information infrastructure that manages a computing machine having a computational resource for executing a workflow and a storage resource communicably coupled to the computing machine, the management server being configured to:
create the workflow based on an order of execution and a number of times of execution of applications executed in the workflow, an order of execution and a number of times of execution of data access from the applications to data stored in the storage resource, and a result of editing of an execution time limit of the workflow by a user;
acquire an order of execution and a number of times of execution of the applications and an order of execution and a number of times of execution of data access from the applications; and
for each of the applications:
calculate a processing speed of the application by dividing a total data size of the data access by a processing time of the application;
input the calculated processing speed into a computational resource model that models a relationship between the processing speed and an amount of the computational resource used, to thereby calculate a required amount of the computational resource required to execute the application;
when a usage rate of the computational resource based on the required amount and an existing load on the computational resource within the execution time limit exceeds a computational resource upper limit, input an available capacity of the computational resource obtained by subtracting the existing load from an upper limit amount of the computational resource into the computational resource model, to thereby calculate a first executable time during which the application is executable based on the available capacity of the computational resource; and
set a target execution time of the application in executing the workflow as the first executable time, and make an adjustment of adding an extension time of the target execution time according to the first executable time to a target execution time of another of the applications that does not exceed the computational resource upper limit so as to postpone an end time-of-day of the application and postpone a start time-of-day of the other application.

10. The management server according to claim 9, wherein the management server is further configured to, for each of the applications:
input the calculated processing speed into an access characteristics model that models a relationship between the processing speed and access performance of the storage resource, to thereby calculate required access performance of the storage resource required to execute the application;
when a usage rate of the storage resource based on the required access performance and an existing load on the storage resource within the execution time limit exceeds a storage resource upper limit, input an available capacity of the storage resource obtained by subtracting the existing load from an upper limit amount of the storage resource into the access characteristics model, to thereby calculate a second executable time during which the application is executable based on achievable access performance of the storage resource; and
set a target execution time of the application in executing the workflow as the second executable time, and make an adjustment of adding an extension time of the target execution time according to the second executable time to a target execution time of another of the applications that does not exceed the storage resource upper limit so as to postpone the end time-of-day and postpone the start time-of-day.

11. The management server according to claim 10, wherein:
a plurality of computing machines is arranged at a plurality of bases, and the storage resources in the respective bases are coupled to one another through a network;
the management server is further configured to:
acquire base information on the computational resource in which applications to be executed in the workflow are arranged and on the storage resource in which data to be accessed by the applications is arranged, and create a plurality of arrangement patterns for arranging the data in the storage resources of the respective bases based on an order of execution and a number of times of execution of the applications, an order of execution and a number of times of execution of the data access, and the base information;
as for all those of the plurality of arrangement patterns that allow execution of the workflow to be completed within the execution time limit, execute the following processes for each of the bases and each of the storage resources:
input the required access performance, the base information on the applications, and the base information on the storage resource in which the data is stored into a storage resource performance model that models a relationship between access performance of the storage resource between two of the bases through the network and each of a network bandwidth of the network between these bases and a number of nodes of the storage resource, to thereby calculate a required bandwidth of the network between the bases and a required number of nodes of the storage resource that are required to execute the applications;
when a usage rate of a network bandwidth of the storage resource based on the required bandwidth and an existing load on the storage resource within the execution time limit exceeds a bandwidth upper limit, input an available capacity of the network bandwidth obtained by subtracting the existing load from an upper limit amount of the network bandwidth into the storage resource performance model, to thereby calculate a third executable time during which the application is executable based on achievable access performance of the network; and set a target execution time of the application in executing the workflow as the third executable time, and make an adjustment of adding an extension time of the target execution time according to the third executable time to a target execution time of another of the applications that does not exceed the bandwidth upper limit so as to postpone the end time-of-day and postpone the start time-of-day.

12. The management server according to claim 11, wherein:
the workflow includes a plurality of workflows; and
the management server is further configured to execute the following processes:
repeating a process of postponing an execution start time-of-day of each of the plurality of workflows in units of a shortest data access execution time and shortening an execution time of each workflow by an amount of time corresponding to the postponement of the execution start time-of-day; and
selecting the execution time that leads to a lowest average of all usage rates of resources including at least one of the computational resource, the storage resource, and the network during execution of the plurality of workflows.

13. The management server according to claim 12, wherein the management server is further configured to execute the following processes for each of the plurality of arrangement patterns:
calculating a usage rate of the network bandwidth in a case where rearrangement of the data is executed between two of the bases through the network during a rearrangement time from a rearrangement start time-of-day to a rearrangement end time-of-day according to the arrangement pattern;
when the usage rate exceeds an upper limit, repeating a process of postponing the rearrangement end time-of-day in units of a shortest access time of access from the applications to the data executed in the plurality of workflows and extending the rearrangement time by an amount of time corresponding to the postponement of the rearrangement end time-of-day; and
selecting the rearrangement time that leads to a lowest average of all usage rates of the resources during execution of rearrangement of the data and during execution of the plurality of workflows.

14. The management server according to claim 13, wherein the management server is further configured to execute a process of selecting a predetermined arrangement pattern from among the plurality of arrangement patterns that leads to a lowest average of all usage rates of the resources.

15. A non-transitory computer-readable recording medium for storing an information infrastructure management program for causing a computer to be configured to function as a management server of an information infrastructure that manages a computing machine having a computational resource for executing a workflow and a storage resource communicably coupled to the computing machine,
the program causing the computer to be configured to:
create the workflow based on an order of execution and a number of times of execution of applications executed in the workflow, an order of execution and a number of times of execution of data access from the applications to data stored in the storage resource, and a result of editing of an execution time limit of the workflow by a user;
acquire an order of execution and a number of times of execution of the applications and an order of execution and a number of times of execution of data access from the applications; and
for each of the applications:
calculate a processing speed of the application by dividing a total data size of the data access by a processing time of the application;
input the calculated processing speed into a computational resource model that models a relationship between the processing speed and an amount of the computational resource used, to thereby calculate a required amount of the computational resource required to execute the application;
when a usage rate of the computational resource based on the required amount and an existing load on the computational resource within the execution time limit exceeds a computational resource upper limit, input an available capacity of the computational resource obtained by subtracting the existing load from an upper limit amount of the computational resource into the computational resource model, to thereby calculate a first executable time during which the application is executable based on the available capacity of the computational resource; and
set a target execution time of the application in executing the workflow as the first executable time, and make an adjustment of adding an extension time of the target execution time according to the first executable time to a target execution time of another of the applications that does not exceed the computational resource upper limit so as to postpone an end time-of-day of the application and postpone a start time-of-day of the other application.

16. The non-transitory computer-readable recording medium according to claim 15, wherein the program causes the computer to be further configured to:
execute the following processes for each of the applications:
inputting the calculated processing speed into an access characteristics model that models a relationship between the processing speed and access performance of the storage resource, to thereby calculate required access performance of the storage resource required to execute the application;
when a usage rate of the storage resource based on the required access performance and an existing load on the storage resource within the execution time limit exceeds a storage resource upper limit, inputting an available capacity of the storage resource obtained by subtracting the existing load from an upper limit amount of the storage resource into the access characteristics model, to thereby calculate a second executable time during which the application is executable based on achievable access performance of the storage resource; and
setting a target execution time of the application in executing the workflow as the second executable time, and making an adjustment of adding an extension time of the target execution time according to the second executable time to a target execution time of another of the applications that does not exceed the storage resource upper limit so as to postpone the end time-of-day and postpone the start time-of-day.

17. The non-transitory computer-readable recording medium according to claim 16, wherein:
- a plurality of computing machines is arranged at a plurality of bases, and the storage resources in the respective bases are coupled to one another through a network;
- the program causes the computer to be further configured to acquire base information on the computational resource in which applications to be executed in the workflow are arranged and on the storage resource in which data to be accessed by the applications is arranged, and create a plurality of arrangement patterns for arranging the data in the storage resources of the respective bases based on an order of execution and a number of times of execution of the applications, an order of execution and a number of times of execution of the data access, and the base information; and
- as for all those of the plurality of arrangement patterns that allow execution of the workflow to be completed within the execution time limit, execute the following processes for each of the bases and each of the storage resources:
  - inputting the required access performance, the base information on the applications, and the base information on the storage resource in which the data is stored into a storage resource performance model that models a relationship between access performance of the storage resource between two of the bases through the network and each of a network bandwidth of the network between these bases and a number of nodes of the storage resource, to thereby calculate a required bandwidth of the network between the bases and a required number of nodes of the storage resource that are required to execute the applications;
  - when a usage rate of a network bandwidth of the storage resource based on the required bandwidth and an existing load on the storage resource within the execution time limit exceeds a bandwidth upper limit, inputting an available capacity of the network bandwidth obtained by subtracting the existing load from an upper limit amount of the network bandwidth into the storage resource performance model, to thereby calculate a third executable time during which the application is executable based on achievable access performance of the network; and
  - setting a target execution time of the application in executing the workflow as the third executable time, and making an adjustment of adding an extension time of the target execution time according to the third executable time to a target execution time of another of the applications that does not exceed the bandwidth upper limit so as to postpone the end time-of-day and postpone the start time-of-day.

18. The non-transitory computer-readable recording medium according to claim 17, wherein:
- the workflow includes a plurality of workflows; and
- the program causes the computer to be further configured to execute the following processes:
  - repeating a process of postponing an execution start time-of-day of each of the plurality of workflows in units of a shortest data access execution time and shortening an execution time of each workflow by an amount of time corresponding to the postponement of the execution start time-of-day; and
  - selecting the execution time that leads to a lowest average of all usage rates of resources including at least one of the computational resource, the storage resource, and the network during execution of the plurality of workflows.

19. The non-transitory computer-readable recording medium according to claim 18, wherein the program causes the computer to be further configured to execute the following processes for each of the plurality of arrangement patterns:
- calculating a usage rate of the network bandwidth in a case where rearrangement of the data is executed between two of the bases through the network during a rearrangement time from a rearrangement start time-of-day to a rearrangement end time-of-day according to the arrangement pattern;
- when the usage rate exceeds an upper limit, repeating a process of postponing the rearrangement end time-of-day in units of a shortest access time of access from the applications to the data executed in the plurality of workflows and extending the rearrangement time by an amount of time corresponding to the postponement of the rearrangement end time-of-day; and
- selecting the rearrangement time that leads to a lowest average of all usage rates of the resources during execution of rearrangement of the data and during execution of the plurality of workflows.

20. The non-transitory computer-readable recording medium according to claim 19, wherein the program causes the computer to be further configured to execute a process of selecting a predetermined arrangement pattern from among the plurality of arrangement patterns that leads to a lowest average of all usage rates of the resources.

* * * * *